(12) United States Patent
Kishigami et al.

(10) Patent No.: US 11,933,875 B2
(45) Date of Patent: Mar. 19, 2024

(54) RADAR APPARATUS

(71) Applicant: Panasonic Intellectual Property Management Co., Ltd., Osaka (JP)

(72) Inventors: Takaaki Kishigami, Tokyo (JP); Kenta Iwasa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 356 days.

(21) Appl. No.: 17/202,941

(22) Filed: Mar. 16, 2021

(65) Prior Publication Data

US 2021/0293946 A1     Sep. 23, 2021

(30) Foreign Application Priority Data

Mar. 18, 2020   (JP) ................................ 2020-047722

(51) Int. Cl.
   *G01S 13/28*   (2006.01)
   *G01S 7/02*    (2006.01)
   (Continued)

(52) U.S. Cl.
   CPC .......... *G01S 13/288* (2013.01); *G01S 7/0234* (2021.05); *G01S 7/282* (2013.01); *G01S 7/2883* (2021.05);
   (Continued)

(58) Field of Classification Search
   None
   See application file for complete search history.

(56) References Cited

U.S. PATENT DOCUMENTS

| 2009/0224960 A1* | 9/2009 | Ishii ..................... G01S 13/345 |
| | | 342/104 |
| 2010/0076312 A1* | 3/2010 | Katsuyama ......... G01S 7/52049 |
| | | 600/443 |

(Continued)

FOREIGN PATENT DOCUMENTS

| JP | 2016-050778 | 4/2016 |
| JP | 2019-113481 | 7/2019 |

(Continued)

OTHER PUBLICATIONS

Li et al., "MIMO Radar with Colocated Antennas", IEEE Signal Processing Magazine, vol. 24, Issue: 5, Sep. 2007, pp. 106-114.
(Continued)

*Primary Examiner* — Whitney Moore
(74) *Attorney, Agent, or Firm* — Greenblum & Bernstein, P.L.C.

(57) ABSTRACT

The target detection accuracy of a radar apparatus is improved. The radar apparatus includes transmission circuitry, which, in operation, transmits a transmission signal using a plurality of transmit antennas, and reception circuitry, which, in operation, receives using a plurality of receive antennas a reflected wave signal that is the transmission signal reflected by an object, in which the plurality of transmit antennas include at least one first transmit antenna and a plurality of second transmit antennas, and, in a first direction, an absolute value of a difference between, on one hand, a spacing between the at least one first transmit antenna and a phase center of those of the plurality of second transmit antennas which are used for beam synthesis, and, on another hand, a spacing between adjacent receive antennas of the plurality of receive antennas is a defined value based on a wavelength of the plurality of transmission signals.

7 Claims, 27 Drawing Sheets

(51) Int. Cl.
    *G01S 7/282*     (2006.01)
    *G01S 7/288*     (2006.01)
    *G01S 13/931*     (2020.01)
    *H04B 7/0413*     (2017.01)

(52) U.S. Cl.
    CPC .......... *G01S 13/282* (2013.01); *G01S 13/931* (2013.01); *H04B 7/0413* (2013.01)

(56) References Cited

U.S. PATENT DOCUMENTS

| | | | |
|---|---|---|---|
| 2015/0253419 A1* | 9/2015 | Alland | G01S 13/42 342/385 |
| 2017/0254879 A1 | 9/2017 | Tokieda, I et al. | |
| 2019/0379137 A1* | 12/2019 | Ohguchi | G01S 7/352 |
| 2020/0326421 A1 | 10/2020 | Aoki | |

FOREIGN PATENT DOCUMENTS

| | | |
|---|---|---|
| JP | 2019-164114 | 9/2019 |
| JP | 2019-211388 | 12/2019 |

OTHER PUBLICATIONS

Hasch et al., "Millimeter-Wave Technology for Automotive Radar Sensors in the 77 GHz Frequency Band", IEEE Transactions on Microwave Theory and Techniques, vol. 60, No. 3, Mar. 2012, pp. 845-860.

Murad et al., "Requirements for Next Generation Automotive Radars", IEEE Radar Conference (RadarCon13), Ottawa, ON, 2013, pp. 1-6.

Wenger et al., "Long Range and Ultra-Wideband Short Range Automotive Radar", 2007 IEEE International Conference on Ultra-Wideband, Singapore, 2007, pp. 518-522.

Kronauge et al., "Fast Two-Dimensional CFAR Procedure", IEEE Transactions on Aerospace and Electronic Systems, vol. 49, No. 3, Jul. 2013, pp. 1817-1823.

Cadzow, "Direction-of-Arrival Estimation Using Signal Subspace Modeling", IEEE Transactions on Aerospace and Electronic Systems, vol. 28, No. 1, Jan. 1992, pp. 64-79.

English language translation of Offfice Action from Japan Patent Office (JPO) in Japanese Patent Appl. No. 2020-047722, dated Jun. 6, 2023.

* cited by examiner

FIG. 3A
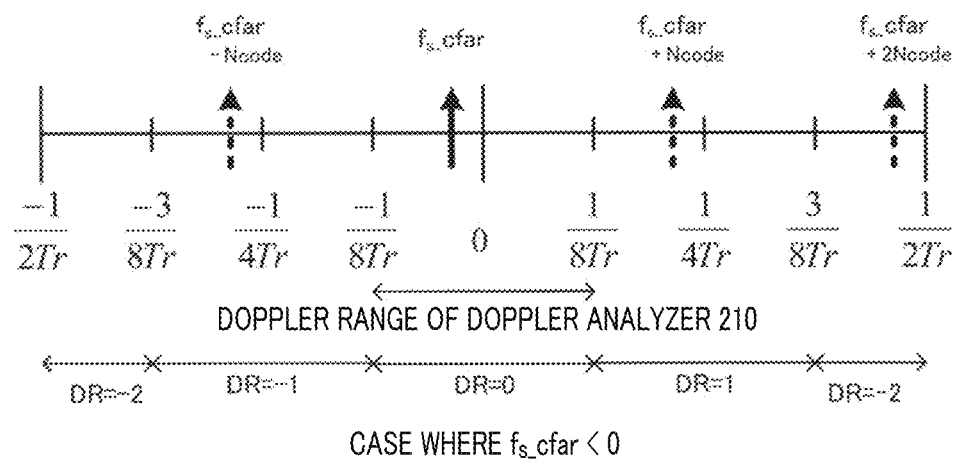
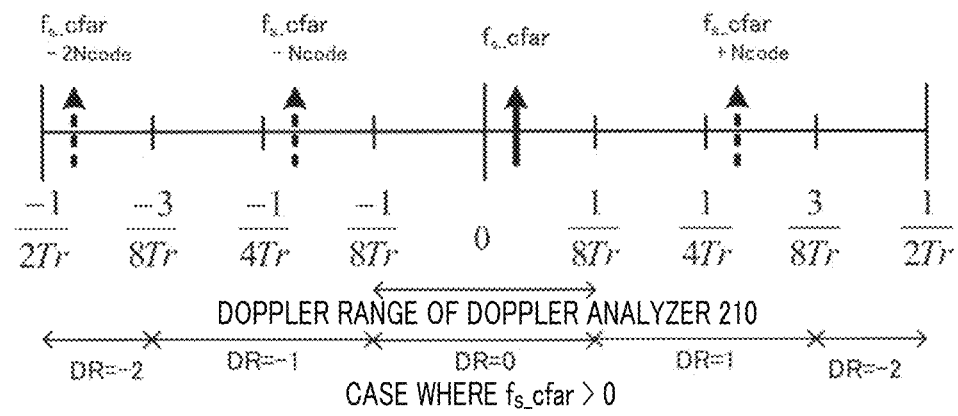
FIG. 3B

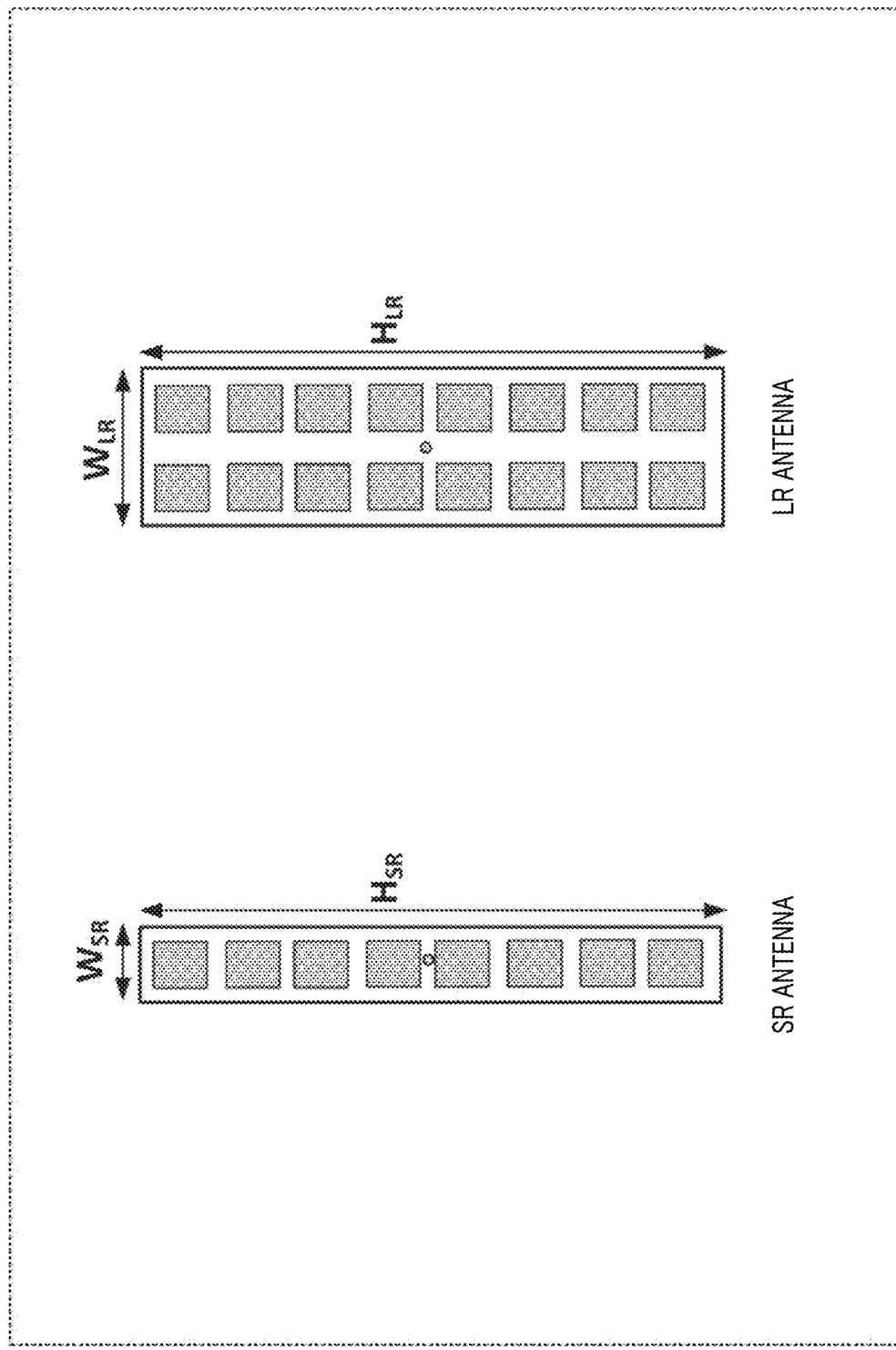

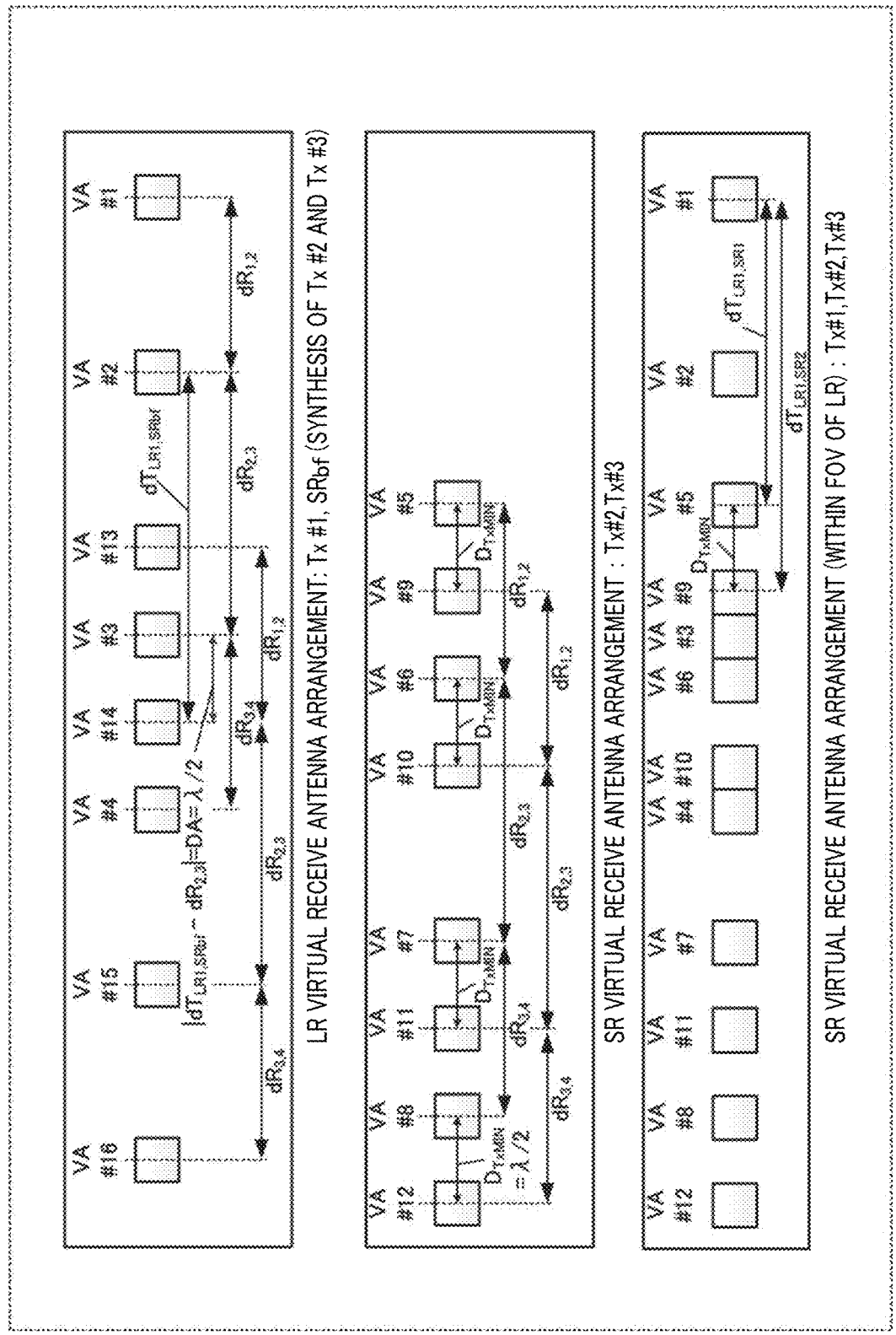

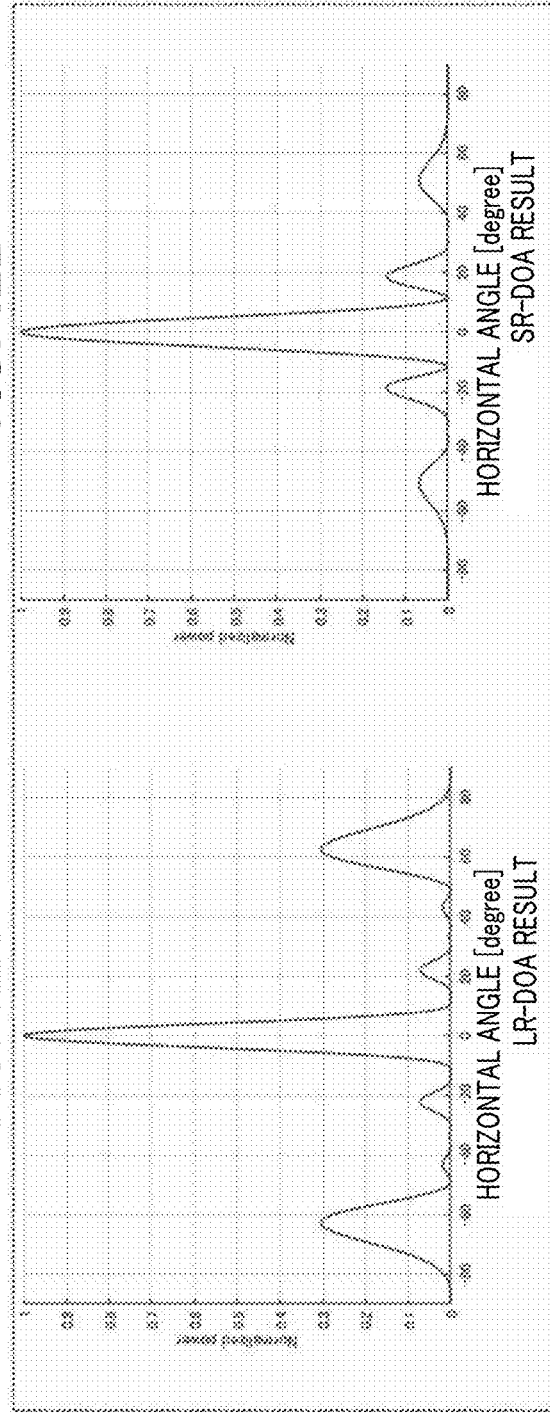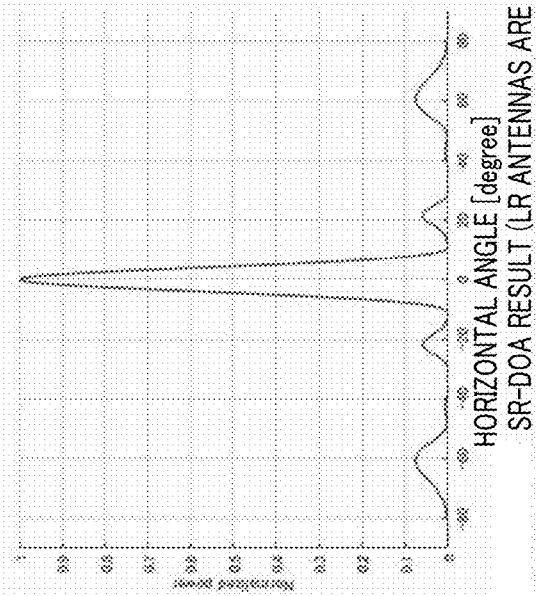
FIG. 12A
FIG. 12B
FIG. 12C

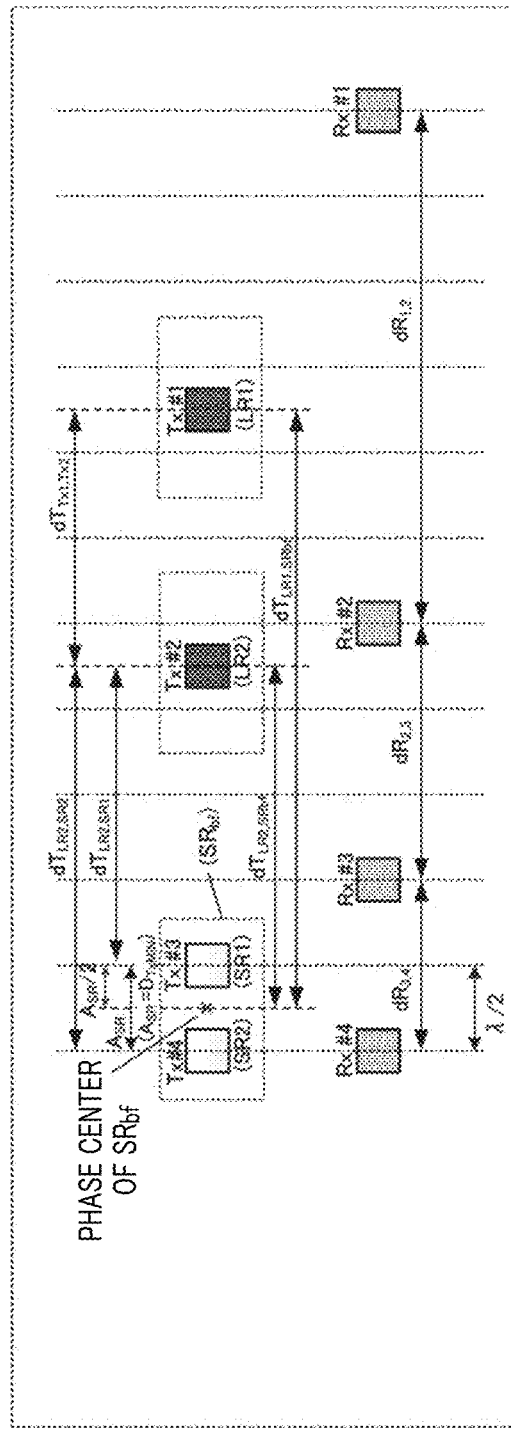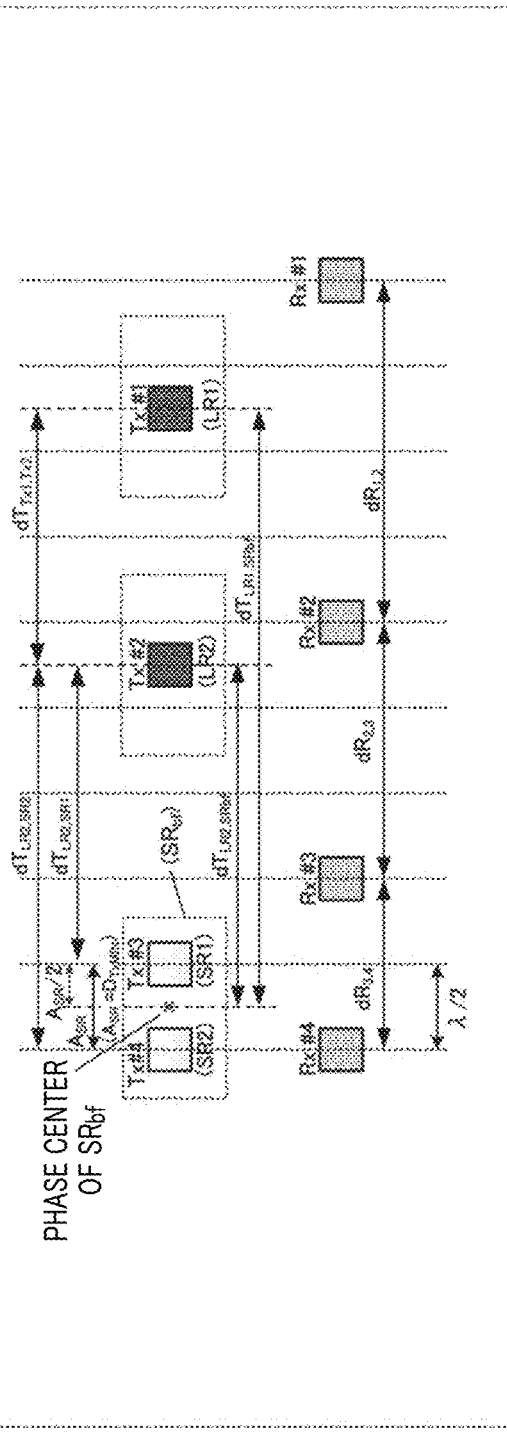

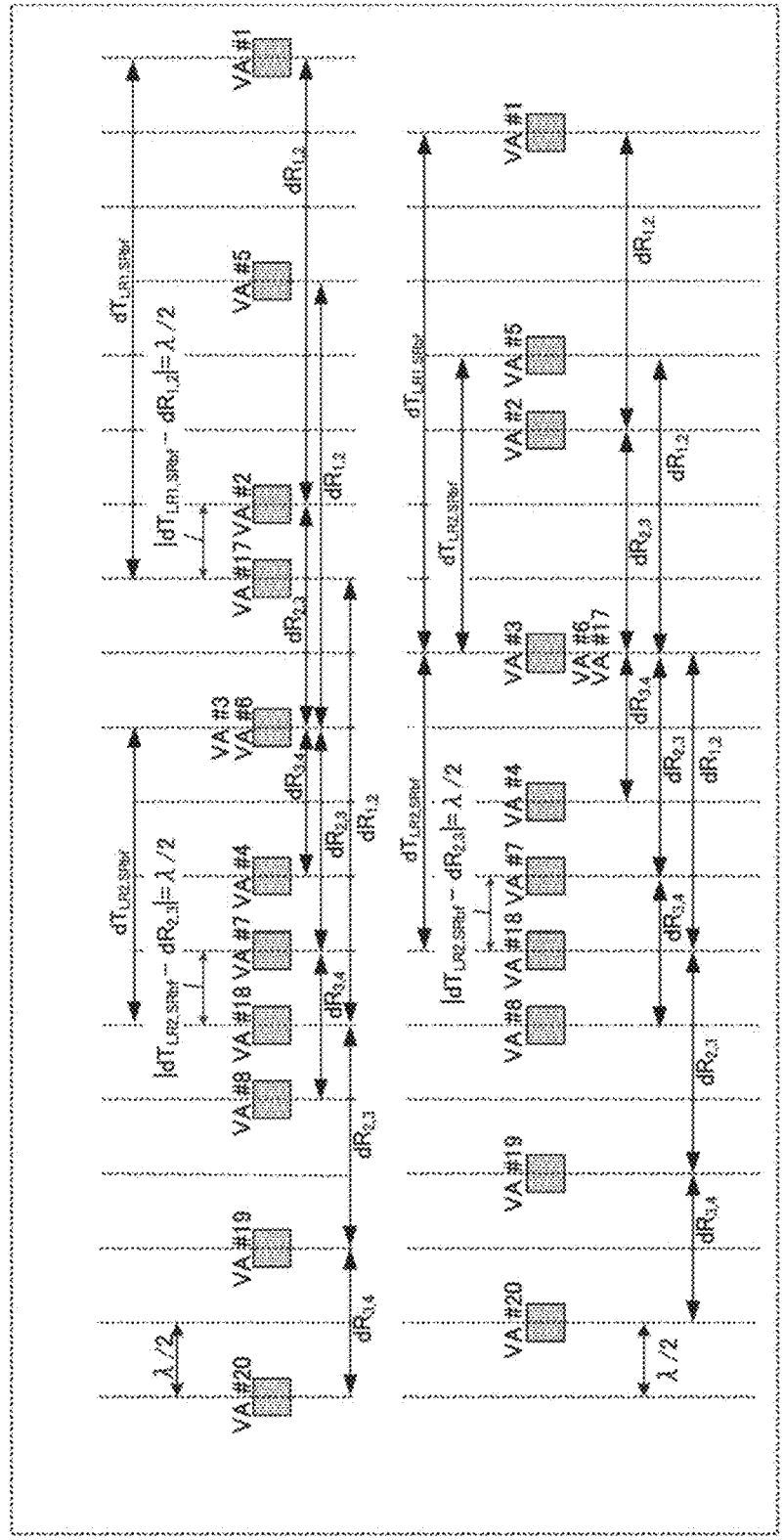

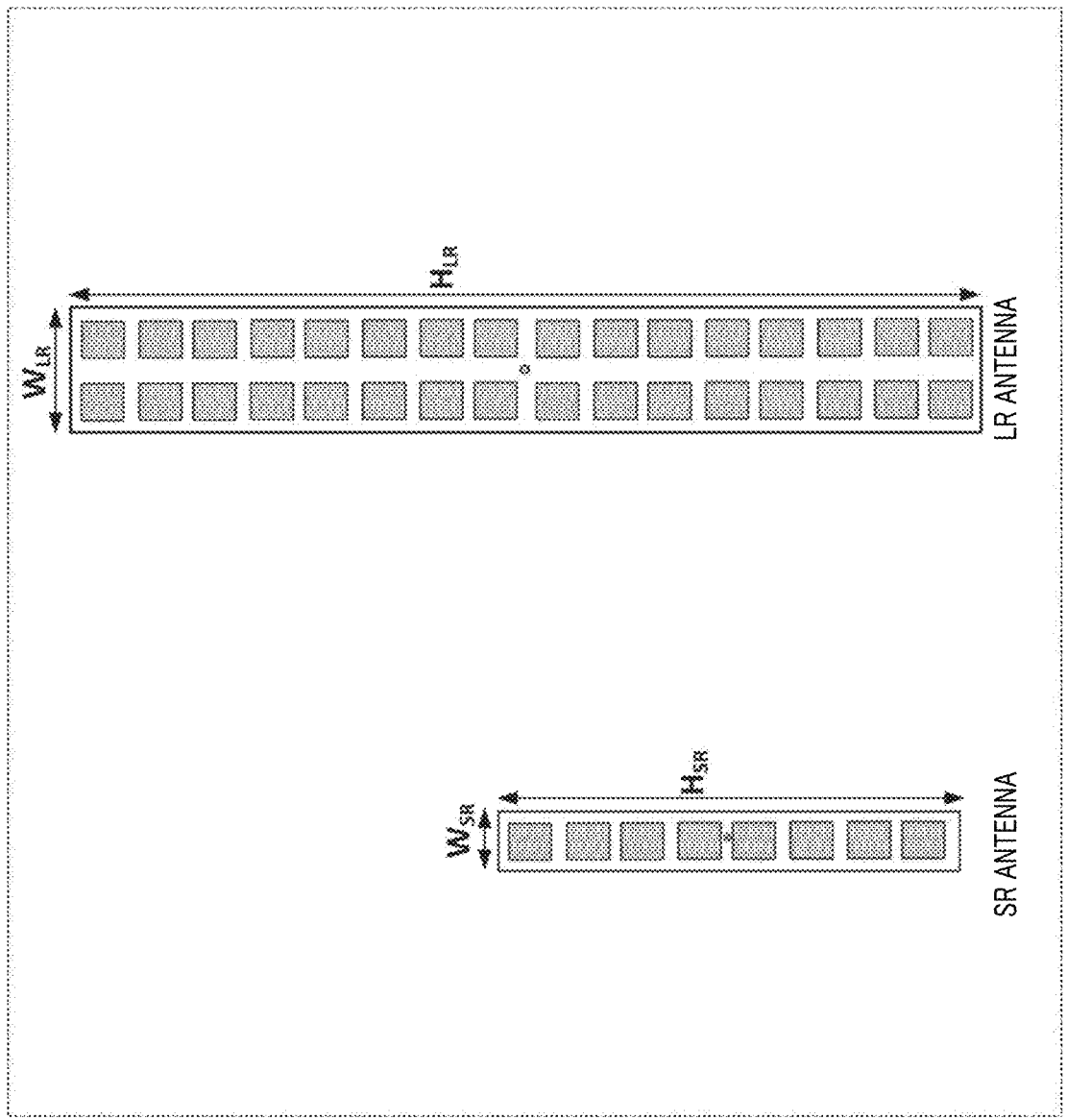

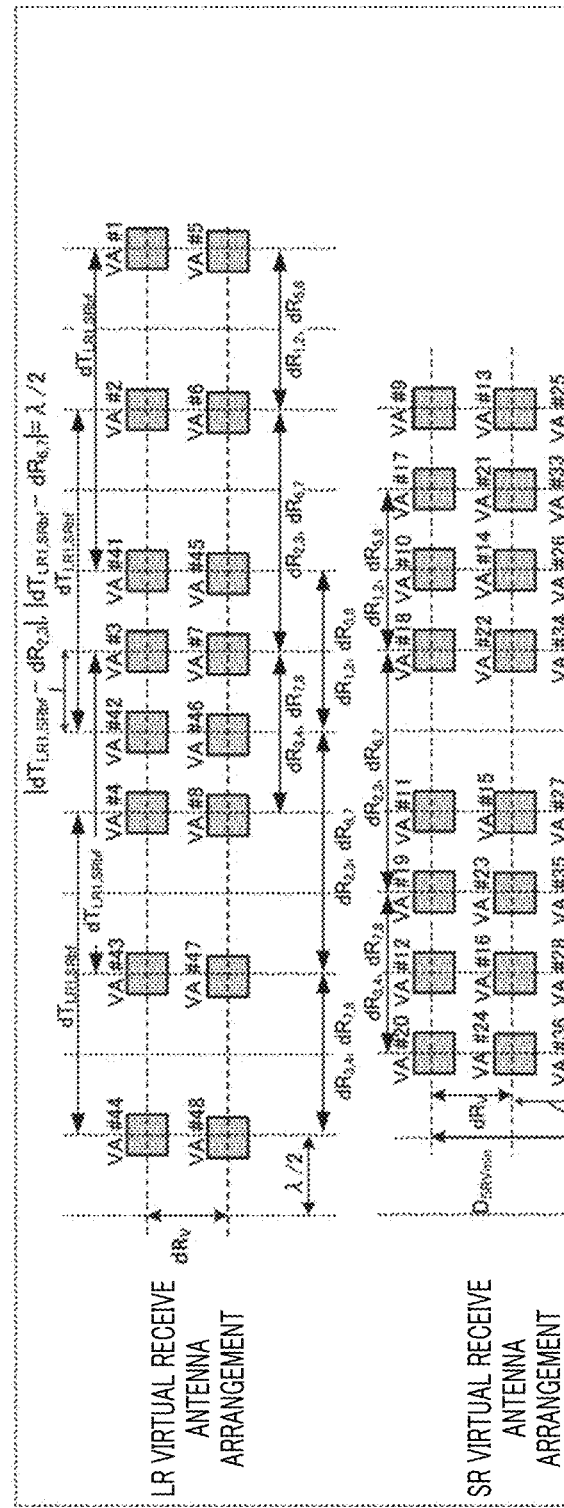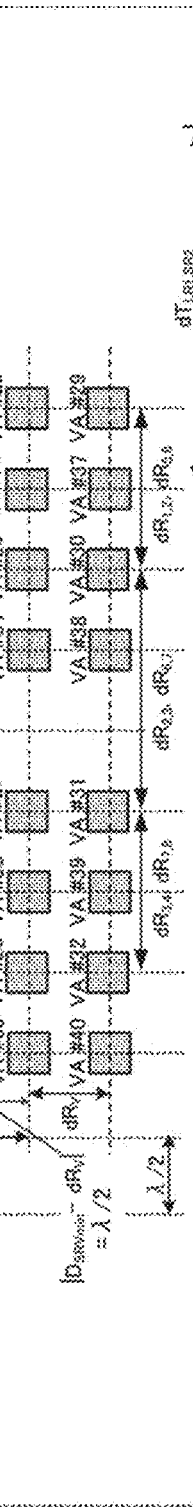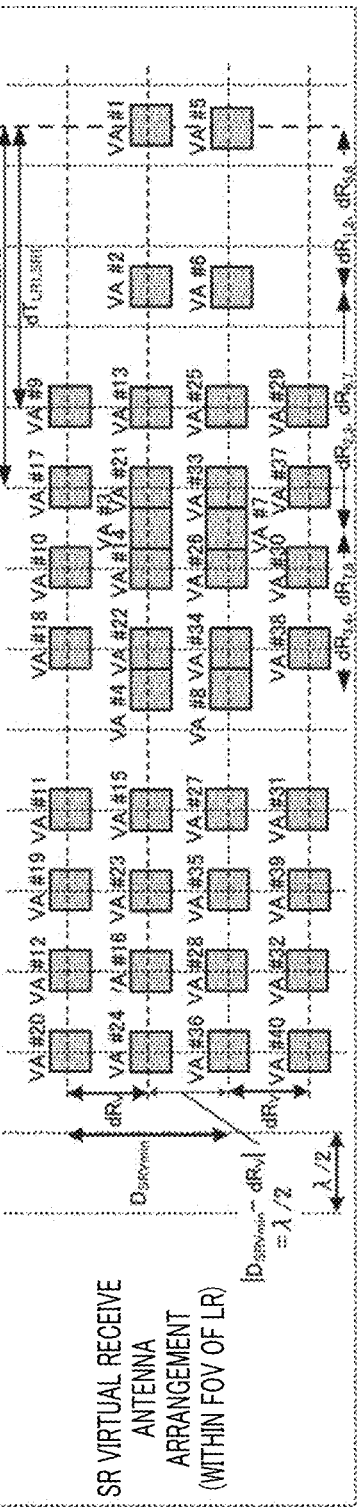

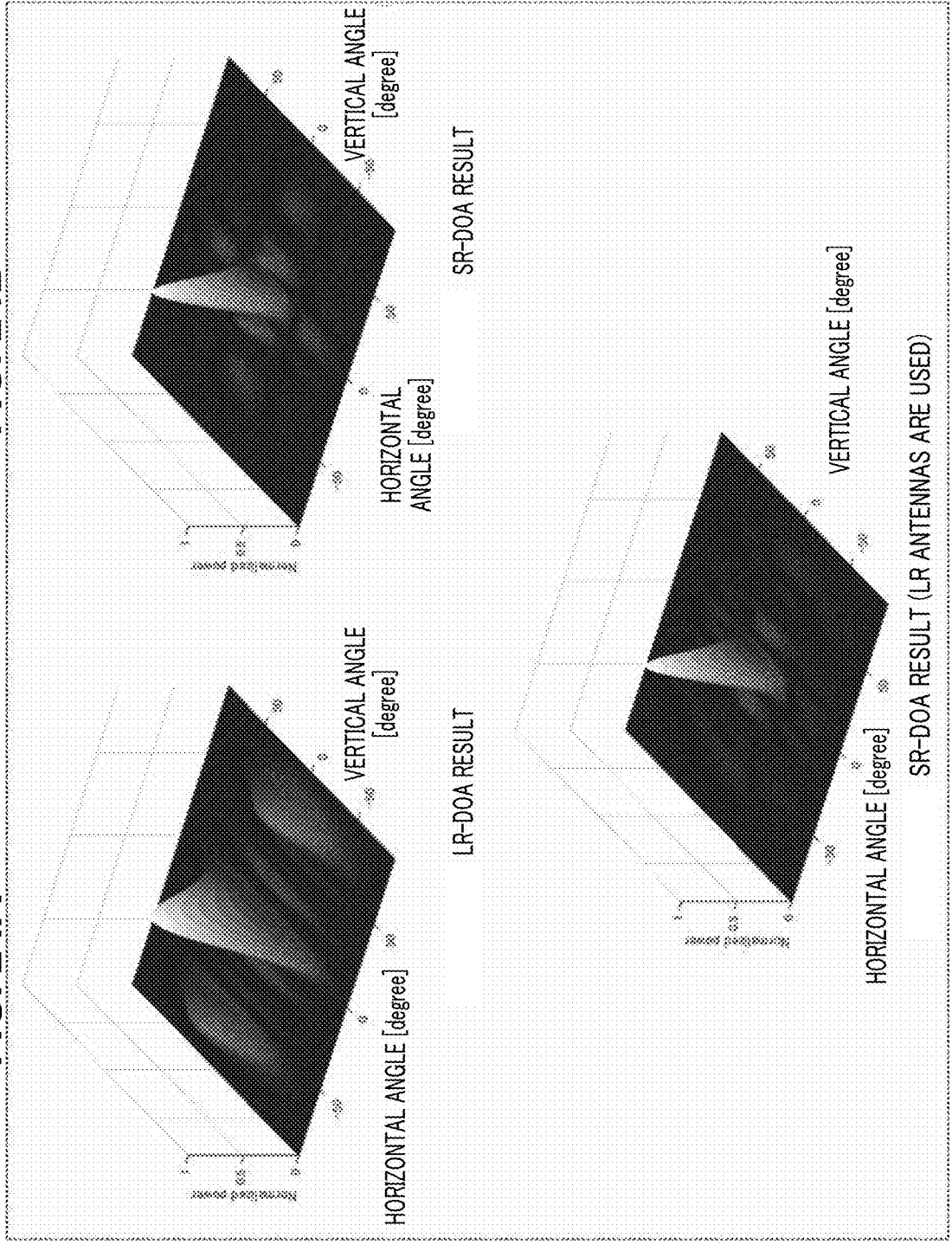

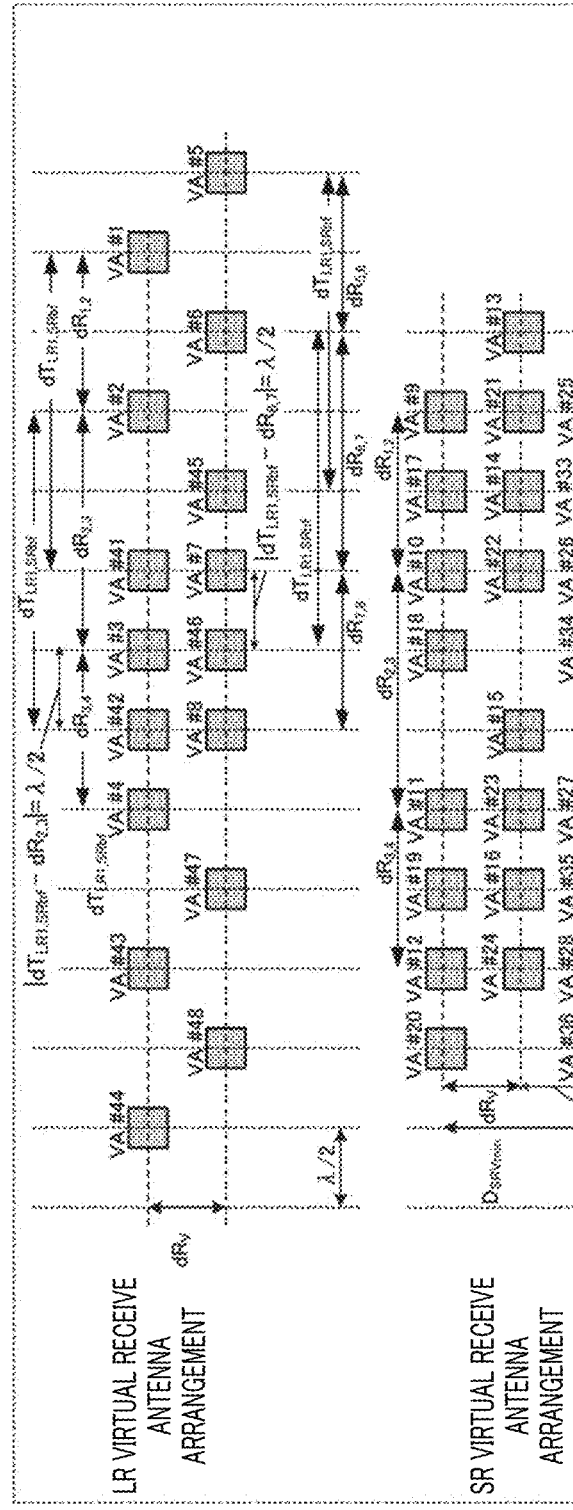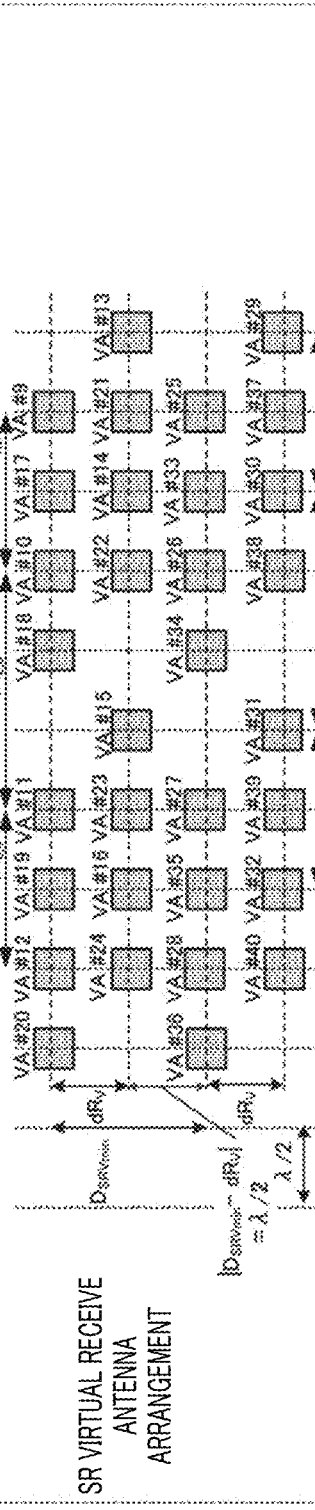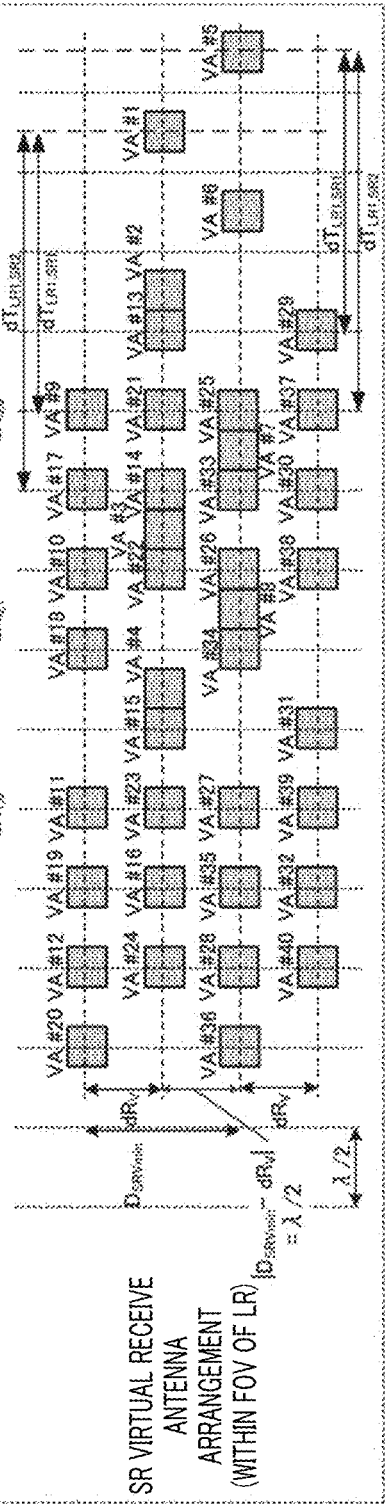

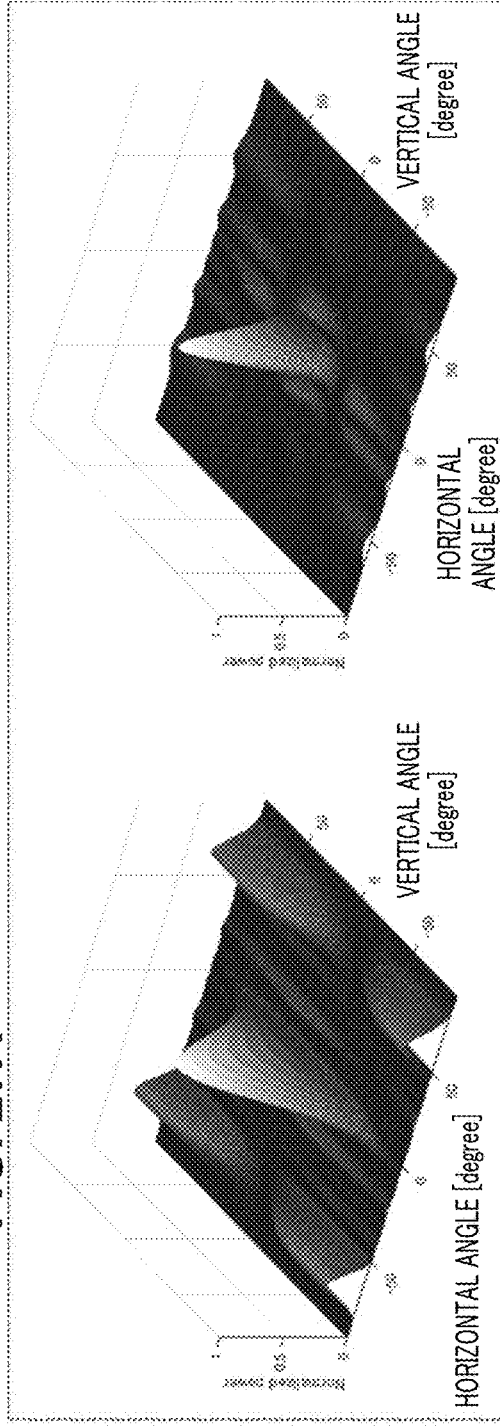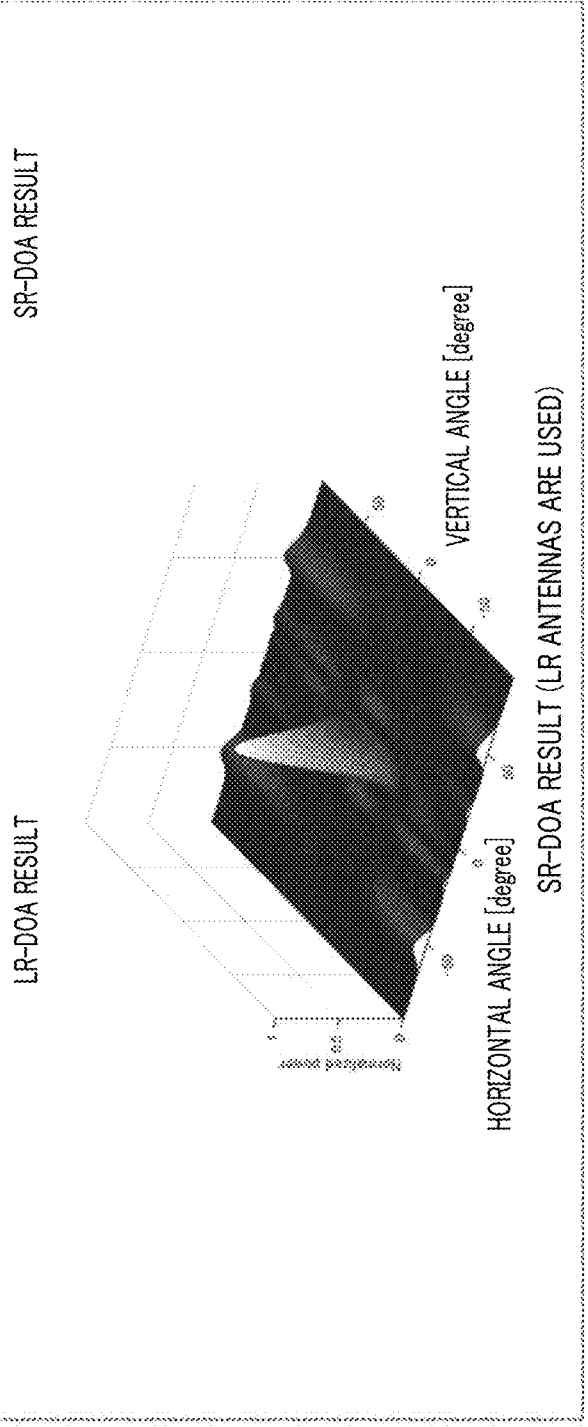
FIG. 27A LR-DOA RESULT
FIG. 27B SR-DOA RESULT
FIG. 27C SR-DOA RESULT (LR ANTENNAS ARE USED)

RADAR APPARATUS

TECHNICAL FIELD

The present disclosure relates to a radar apparatus.

BACKGROUND ART

Recently, studies have been developed on radar apparatuses that use a radar transmission signal of a short wavelength including microwaves or millimeter waves allowing high resolution. Further, it has been required to develop a radar apparatus which detects not only vehicles but also small objects such as pedestrians in a wide-angle range (e.g., referred to as "wide-angle radar apparatus") in order to improve the outdoor safety.

Examples of the configuration of the radar apparatus having a wide-angle detection range include a configuration using a technique of receiving a reflected wave from a target (or target object) by an array antenna composed of a plurality of antennas (or also referred to as antenna elements), and estimating the direction of arrival of the reflected wave (or referred to as the angle of arrival) based on received phase differences with respect to element spacings (antenna spacings) (Direction of Arrival (DOA) estimation).

Examples of the DOA estimation include a Fourier method (Fast Fourier Transform (FFT) method), and, methods allowing higher resolution, such as a Capon method, Multiple Signal Classification (MUSIC), and Estimation of Signal Parameters via Rotational Invariance Techniques (ESPRIT).

There is also a proposed radar apparatus, for example, having a configuration in which a radar transmitter as well as a radar receiver is provided with a plurality of antennas (array antenna), and beam scanning is performed through signal processing using the transmit and receive array antennas (also referred to as Multiple Input Multiple Output (MIMO) radar) (e.g., see Non-Patent Literature (hereinafter referred to as "NPL") 1).

CITATION LIST

Patent Literature

PTL 1
Japanese Patent Application Laid-Open No. 2019-113481

Non-Patent Literature

NPL 1
J. Li, and P. Stoica, "MIMO Radar with Colocated Antennas," Signal Processing Magazine, IEEE Vol. 24, Issue: 5, pp. 106-114, 2007

NPL 2
J. Hasch, E. Topak, R. Schnabel, T. Zwick, R. Weigel and C. Waldschmidt, "Millimeter-Wave Technology for Automotive Radar Sensors in the 77 GHz Frequency Band," in IEEE Transactions on Microwave Theory and Techniques, vol. 60, no. 3, pp. 845-860, March 2012.

NPL 3
M. Murad et al., "Requirements for next generation automotive radars," 2013 IEEE Radar Conference (RadarCon13), Ottawa, ON, 2013, pp. 1-6.

NPL 4
J. Wenger and S. Hahn, "Long Range and Ultra-Wideband Short Range Automotive Radar," 2007 IEEE International Conference on Ultra-Wideband, Singapore, 2007, pp. 518-522.

NPL 5
M. Kronauge, H. Rohling, "Fast two-dimensional CFAR procedure," IEEE Trans. Aerosp. Electron. Syst., 2013, 49, (3), pp. 1817-1823

NPL 6
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

However, methods for a radar apparatus (e.g., MIMO radar) to detect a target have not been comprehensively studied.

One non-limiting and exemplary embodiment facilitates providing a radar apparatus with an enhanced target-detection accuracy.

A radar apparatus according to an exemplary embodiment of the present disclosure includes: transmission circuitry, which, in operation, transmits a transmission signal using a plurality of transmit antennas; and reception circuitry, which, in operation, receives a reflected wave signal using a plurality of receive antennas, the reflected wave signal being the transmission signal reflected by an object, in which the plurality of transmit antennas include at least one first transmit antenna and a plurality of second transmit antennas, and, in a first direction, an absolute value of a difference between, on one hand, a spacing between the at least one first transmit antenna and a phase center of those of the plurality of second transmit antennas which are used for beam synthesis, and, on another hand, a spacing between adjacent receive antennas of the plurality of receive antennas is a defined value based on a wavelength of the plurality of transmission signals.

Note that these generic or specific exemplary embodiments may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to enhance the target detection accuracy of a radar apparatus.

Additional benefits and advantages of one example of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIGS. 3A and 3B illustrate an example of Doppler aliasing determination;

FIGS. 6A and 6B illustrate an example of an SR antenna and an LR antenna;

FIGS. 9A, 9B, and 9C illustrate examples of a virtual receive antenna arrangement according to arrangement example 2;

FIGS. 12A, 12B, and 12C illustrate examples of a direction estimation result according to arrangement example 2;

FIGS. 13A and 13B illustrate examples of an antenna arrangement according to arrangement example 3;

FIGS. 14A and 14B illustrate examples of a virtual receive antenna arrangement according to arrangement example 3;

FIGS. 22A and 22B illustrate an example of the SR antenna and the LR antenna;

FIGS. 23A, 23B, and 23C illustrate examples of a virtual receive antenna arrangement according to arrangement example 6;

FIGS. 24A, 24B, and 24C illustrate examples of a direction estimation result according to arrangement example 6;

FIGS. 26A, 26B, and 26C illustrate examples of a virtual receive antenna arrangement according to arrangement example 7; and FIGS. 27A, 27B, and 27C illustrate examples of a direction estimation result according to arrangement example 7.

DESCRIPTION OF EMBODIMENTS

Figure 1:
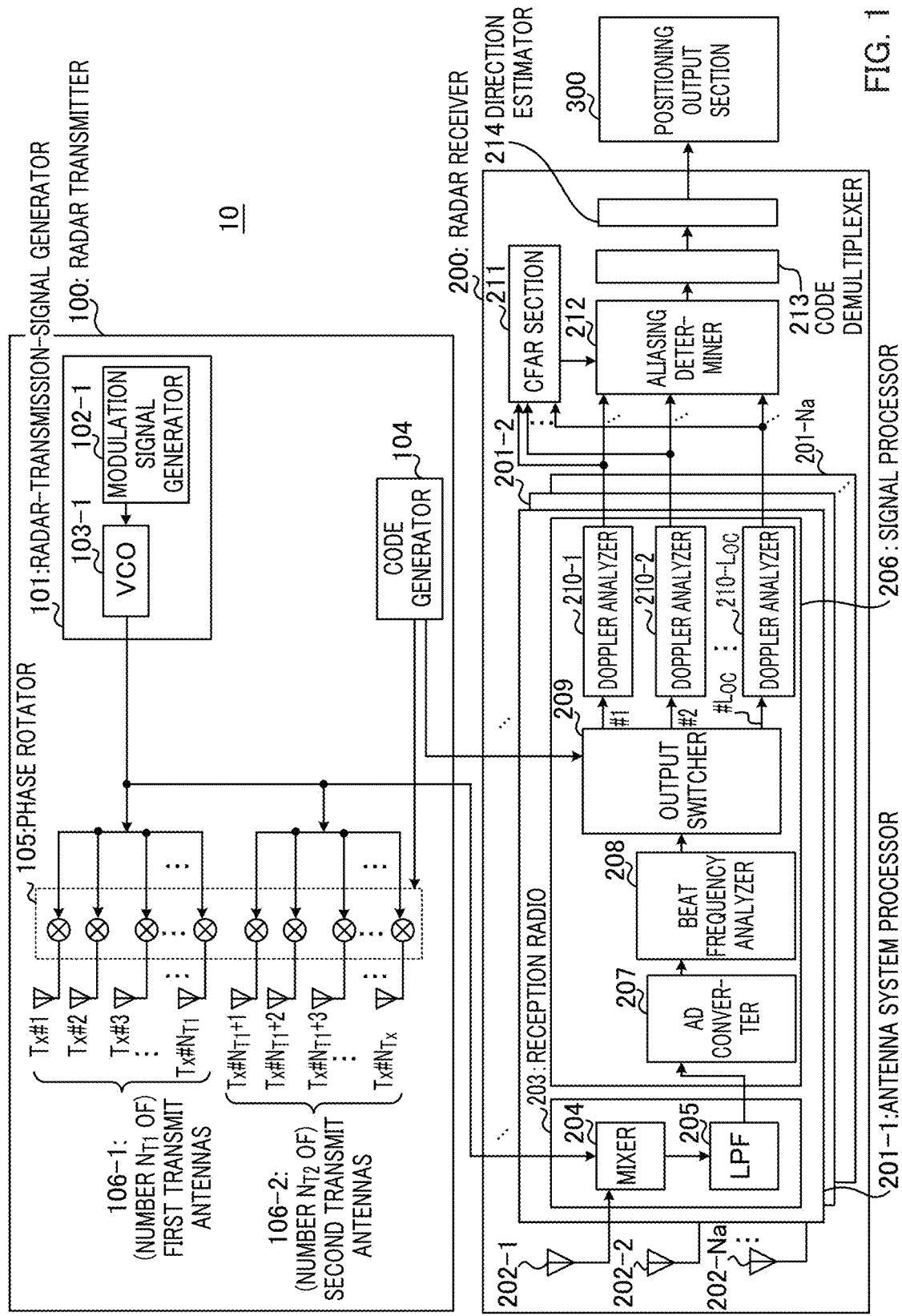
FIG. 1 is a block diagram illustrating an example of a configuration of a radar apparatus.

A MIMO radar transmits, from a plurality of transmit antennas (also referred to as "transmit array antenna"), a radar transmission signal (also referred to as "radar transmission wave") that is time-division, frequency-division, or code-division multiplexed, for example. The MIMO radar then receives a signal (e.g., referred to as "radar reflected wave") reflected, for example, by an object around the radar using a plurality of receive antennas (also referred to as "receive array antenna") to separate and receive a multiplexed transmission signal from each reception signal. With this processing, the MIMO radar can extract a propagation path response indicated by the product of the number of transmit antennas and the number of receive antennas, and performs array signal processing using these reception signals as a virtual receive array.

Further, in the MIMO radar, it is possible to virtually enlarge the antenna aperture so as to enhance the angular resolution by appropriately arranging element spacings in the transmit and receive array antennas.

For example, radar apparatuses such as an in-vehicle radar and the like have a mode for detection within a relatively-longer distance range (hereinafter, referred to as "Long Range (LR) mode") performed by narrowing a detection angle range (e.g., viewing angle, or Field Of View (FOV)) using transmit antennas (or receive antennas) with a higher directive gain obtained by narrower directivity (e.g., see NPLs 2 to 4). The radar apparatuses also have a mode for detection within a relatively-near distance range (hereinafter, referred to as "Short Range (SR) mode") performed by widening the detection angle range (FOV) using relatively wide-angle directional transmit antennas (or receive antennas) (e.g., see NPLs 2 to 4). Some radar systems use both the LR mode and the SR mode, for example. Note that, the SR range mode may also be called a middle distance range mode (e.g., "Middle Range (MR) mode"), for example.

In the combined use of the LR mode and the SR mode, a method of switching between the LR mode and the SR mode in a time division manner is possible. For example, a radar apparatus may transmit a modulation pulse (or a modulation pulse train consisting of a plurality of modulation pulses) for the LR mode from a transmit antenna for the LR mode, and a modulation pulse (or a modulation pulse train) for the SR mode from a transmit antenna for the SR mode alternately in a time division manner. Alternatively, the radar apparatus may sequentially transmit the modulation pulse train for the SR mode from the transmit antenna for the SR mode after transmitting the modulation pulse train for the LR mode from the transmit antenna for the LR mode.

Further, the transmissions of the modulation pulse trains are not limited to time division transmission or sequential transmission of the modulation pulse trains for the LR mode and the SR mode, but simultaneous multiplexing transmission such as code multiplexing transmission or Doppler multiplexing transmission may also be applied (see, e.g., Patent Literature (hereinafter referred to as "PTL") 1).

In the combined use in the LR mode and the SR mode, when antennas for the LR mode and antennas for the SR mode are provided separately from each other, there is a possibility that, for example, the restriction on the number of antenna ports on a Radio Frequency (RF) chip reduces the number of MIMO arrays for each of the SR mode and the LR mode. The reduction in the number of MIMO arrays for each of the SR mode and the LR mode may, for example, cause a reduction in the array gain in the SR mode or the LR mode, a decrease in the angular resolution due to the narrowing of the array aperture, or a decrease in the detection performance due to an increase in an angular side lobe.

Further, although the restriction on the number of antenna ports can be alleviated, for example, by increasing the number of RF chips, there is a possibility of an increase in the power consumption or cost. Alternatively, the increase in the number of RF chips may lead to an increase in the size of the radar apparatus to impair the ease of installation of the radar apparatus.

As a countermeasure to these issues, PTL 1 discloses, for example, that a plurality of antennas for a short range mode (for example, referred as "Short Range Radar (SRR) mode" or "SR mode") are synthesized for use as a part of antennas for a long range mode (for example, referred to as "Long Range Radar (LRR) mode" or "LR mode"). With this configuration, PTL 1 achieves an effect of increasing the angular resolution or the antenna gain in angular measurement processing in the long range mode, for example. However, in PTL 1, a receive antenna spacing is wider than the width of an antenna for the long range mode in an array for the long range mode, which may cause angular ambiguity due to a grating lobe in the angular measurement processing. While the angular ambiguity may be reduced, for example, by utilizing the difference between the spacing in a virtual array for the short range mode and the antenna spacing for the long range mode, processing performed for lessening the angular ambiguity may lead to an increase in the processing and arithmetic amount in the radar apparatus.

Then, a description will be given of an exemplary embodiment of the present disclosure in relation to an antenna arrangement in which, for example, an antenna for an SR mode (also referred to as an antenna for an SR, an SR antenna, or an SRR antenna, for example) and an antenna for an LR (also referred to as an antenna for an LR, an LR antenna, or an LRR antenna, for example) can be shared in the SR mode and the LR mode.

For example, in an exemplary embodiment according to the present disclosure, a radar apparatus may use an LR antenna in the SR mode, or an SR antenna in the LR mode. According to an exemplary embodiment of the present disclosure, it is possible, for example, to reduce the generation of grating lobes and the angular ambiguity in angular measurement processing (or direction-of-arrival estimation processing) in each of the SR mode and the LR mode, so as to enhance target detection performance. Moreover, according to an exemplary embodiment of the present disclosure, it is possible, for example, to increase the array gain and the angular resolution during the angular measurement processing in each of the SR mode and the LR mode, so as to improve the target detection performance.

Note that the radar apparatus according to an exemplary embodiment of the present disclosure may be mounted on a mobile body such as a vehicle, for example. The radar apparatus mounted on the mobile body can be used, for example, for an Advanced Driver Assistance System (ADAS) that enhances crashworthiness, or as a sensor used for monitoring around the mobile body during automatic driving.

The radar apparatus according to an exemplary embodiment of the present disclosure may also be attached to a relatively high-altitude structure, such as, for example, a roadside utility pole or traffic lights. Such a radar apparatus is usable, for example, as a sensor in an assist system that increases the safety of passing vehicles or pedestrians.

Note that the use of the radar apparatus is not limited to the above, and the radar apparatus may be used for other uses.

Embodiments of the present disclosure will be described below in detail with reference to the drawings. In the embodiments, the same constituent elements are identified with the same numerals, and a description thereof is omitted because of redundancy.

In the following, a description is given of a radar apparatus having a configuration in which a transmission branch transmits different code-division multiplexed transmission signals from a plurality of transmit antennas, and a reception branch performs reception processing by separating each of the transmission signals (in other words, a MIMO radar configuration). However, the configuration of the radar apparatus is not limited thereto, and the radar apparatus may have a configuration in which the transmission branch transmits different frequency-division multiplexed transmission signals from a plurality of transmit antennas, and the reception branch performs reception processing by separating each of the transmission signals. Similarly, the configuration of the radar apparatus may be a configuration in which the transmission branch transmits time-division multiplexed transmission signals from a plurality of transmit antennas and the reception branch performs reception processing.

Further, by way of example, a description will be given below of a configuration of a radar system using a frequency-modulated pulse wave such as a chirp pulse (e.g., also referred to as chirp pulse transmission (fast chirp modulation)). However, the modulation scheme is not limited to frequency modulation. For example, an exemplary embodiment of the present disclosure is applicable to a radar system using a single pulse or an encoded pulse.

[Configuration of Radar Apparatus]

FIG. 1 is a block diagram illustrating an example of the configuration of radar apparatus 10 according to the present embodiment.

Radar apparatus 10 includes radar transmitter (transmission branch) 100, radar receiver (reception branch) 200, and positioning output section 300.

Radar transmitter 100 (corresponding to the transmission circuitry, for example) generates, for example, a radar signal (radar transmission signal) and transmits the radar transmission signal at a defined transmission period using a transmit array antenna composed of a plurality of transmit antennas 106.

Radar receiver 200 (corresponding to the reception circuitry, for example) receives, for example, a reflected wave signal, which is a radar transmission signal reflected by a target (target object (not illustrated)), using a receive array antenna including a plurality of receive antennas 202 (e.g., number Na of antennas). Radar receiver 200 performs signal processing on the reflected wave signal received at each of receive antennas 202 to, for example, detect the presence or absence of the target object, or estimate the distance through which the reflected wave signal arrives, the Doppler frequency (in other words, the relative velocity), and the direction of arrival, and outputs information on an estimation result (in other words, positioning information).

Positioning output section 300 performs positioning output processing based on the information on the estimation result of the direction of arrival inputted from radar receiver 200, and may output a processing result, for example, to an advanced driver assistance system or a monitoring system for monitoring around the mobile body during automatic driving.

Note that, the target is an object to be detected by radar apparatus 10, and includes a vehicle (including a four-wheeled vehicle and a two-wheeled vehicle), a person, a block, or a curb, for example.

[Configuration of Radar Transmitter 100]

Radar transmitter 100 includes radar-transmission-signal generator 101, code generator 104, phase rotator 105, and transmit antennas 106.

In radar transmitter 100, for example, first transmit antennas 106-1 may be transmit antennas for the LR mode (e.g., LR antennas), and second transmit antennas 106-2 may be transmit antennas for the SR mode (e.g., SR antennas).

Radar-transmission-signal generator 101 generates, for example, a radar transmission signal (in other words, a baseband signal). Radar-transmission-signal generator 101 includes, for example, modulation signal generator 102 and Voltage Controlled Oscillator (VCO) 103. The components of radar-transmission-signal generator 101 will be described below.

Figure 2:
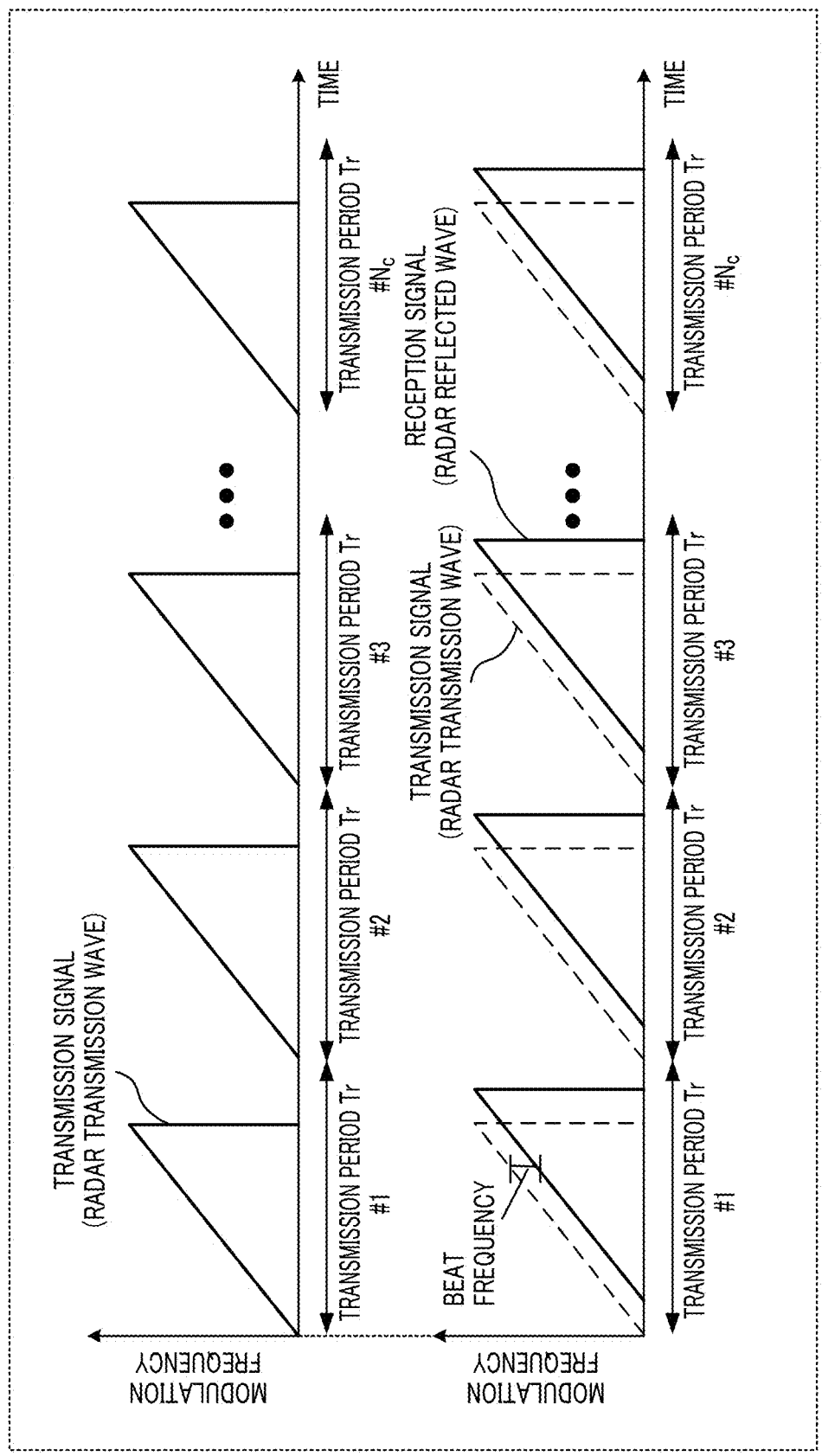
FIG. 2 illustrates an example of a transmission signal and a reflected wave signal in a case where a chirp pulse is used.

Modulation signal generator 102 generates a saw-toothed modulation signal (in other words, a modulation signal for VCO control) per radar transmission period Tr, for example, as illustrated on the upper side in FIG. 2.

Based on the radar transmission signal (modulation signal) outputted from modulation signal generator 102, VCO 103 outputs a frequency modulated signal (hereinafter, referred to as a frequency chirp signal or chirp signal, for example) to phase rotator 105 (e.g., number $N_{T1}$ of phase shifters or phase modulators connected to first transmit antennas 106-1). VCO 103 also outputs, for example, a chirp signal to phase rotator 105 (e.g., number $N_{T2}$ of phase shifters or phase modulators connected to second transmit antennas 106-2).

Further, the chirp signal generated in radar-transmission-signal generator 101 is outputted to radar receiver 200 (to below-described mixer 204).

Code generator 104 generates a code different for each of transmit antennas 106 that perform code multiplexing transmission. Code generator 104 outputs phase rotation amounts corresponding to the generated codes to phase rotator 105. Code generator 104 also outputs information on the generated codes to radar receiver 200 (below-described output switcher 209).

Phase rotator 105 applies the phase rotation amounts inputted from code generator 104, for example, to the chirp signal inputted from radar-transmission-signal generator 101, and outputs signals after the phase rotation to transmit antennas 106 (e.g., first transmit antennas 106-1 and second transmit antennas 106-2). Phase rotator 105 may include, for example, the phase shifters, phase modulators, or the like (not illustrated).

The output signals of phase rotator 105 are amplified to defined transmission power and radiated respectively from transmit antennas 106 to space. In other words, radar transmission signals are code multiplexed and transmitted from a plurality of transmit antennas 106 by application of the phase rotation amounts corresponding to the codes.

Next, one example of the codes (e.g., orthogonal codes) set in radar apparatus 10 will be described.

Code generator 104 may, for example, generate a code different for each of transmit antennas 106 that perform code multiplexing transmission.

By way of example, in the following, the number of first transmit antennas 106-1 is denoted by "$N_{T1}$," the number of second transmit antennas 106-2 is denoted by "$N_{T2}$," and the number of transmit antennas 106 which perform code multiplexing transmission is denoted by "$N_{Tx}$" ($=N_{T1}+N_{T2}$). Here, $N_{T1} \geq 1$, $N_{T2} \geq 1$, and $N_{Tx}$ ($=N_{T1}+N_{T2}$)$\geq 2$.

In addition, the number of code multiplexing is denoted by "$N_{CM}$." Although an example of $N_{CM}=N_{Tx}$ will be described with reference to FIG. 1, the present disclosure is not limited to the example, and the same code may also be transmitted (e.g., array transmission or beamforming transmission) for a set of a plurality of transmit antennas 106. In this case, $N_{CM}<N_{Tx}$.

For example, code generator 104 sets, as the codes for code multiplexing transmission, $N_{CM}$ orthogonal codes among $N_{allcode}$ (or $N_{allcode}(Loc)$) orthogonal codes included in code sequences with code length (in other words, the number of code elements) Loc (for example, mutually orthogonal code sequences (also simply referred to as codes or orthogonal codes)).

For example, number $N_{CM}$ of code multiplexing is less than number $N_{allcode}$ of orthogonal codes; that is, $N_{CM}<N_{allcode}$. In other words, code length Loc of the orthogonal codes is greater than number $N_{CM}$ of code multiplexing. For example, $N_{CM}$ orthogonal codes with code length Loc are represented as $Code_{ncm}=[OC_{ncm}(1), OC_{ncm}(2), \ldots, OC_{ncm}(Loc)]$. Here, "$OC_{ncm}(noc)$" represents the nocth code element in ncmth orthogonal code $Code_{ncm}$. The character "ncm" represents the index of an orthogonal code used for code multiplexing, and ncm=1, ..., $N_{CM}$. Further, the character "noc" is the index of a code element, and noc=1, ..., Loc.

Here, among $N_{allcode}$ orthogonal codes with code length Loc, ($N_{allcode}-N_{CM}$) orthogonal codes are not used in code generator 104 (in other words, they are not used for code multiplexing transmission). Hereafter, ($N_{allcode}-N_{CM}$) orthogonal codes not used in code generator 104 are referred to as "unused orthogonal codes." At least one of the unused orthogonal codes is used, for example, for aliasing determination of the Doppler frequency in aliasing determiner 212 of radar receiver 200 to be described later (a description of an example will be given below).

The use of the unused orthogonal code makes it possible for radar apparatus 10, for example, to receive signals code-multiplexed and transmitted from a plurality of transmit antennas 106, while inter-code interference is being prevented and such that the signals are separated individually, and also to expand the range of detectable Doppler frequencies (an example will be described later).

As described above, $N_{CM}$ orthogonal codes generated in code generator 104 are, for example, codes orthogonal to one another (in other words, uncorrelated codes). For example, a Walsh-Hadamard code may be used for the orthogonal code sequences. The code length of the Walsh-Hadamard code is a power of 2, and the number of orthogonal codes for each code length is the same as the code length. For example, the Walsh-Hadamard codes with a code length of 2, 4, 8, or 16 include 2, 4, 8, or 16 orthogonal codes, respectively.

In the following, by way of example, code length Loc of the orthogonal code sequences with $N_{CM}$ codes may be set so as to satisfy following Expression 1:

[1]

$$Loc \geq 2^{ceil[log2(N_{CM}+1)]} \qquad \text{(Expression 1).}$$

Here, ceil[x] is an operator (ceiling function) that outputs the smallest integer greater than or equal to real number x. For the Walsh-Hadamard codes with code length Loc, the relation of $N_{allcode}(Loc)=Loc$ holds true. For example, since the Walsh-Hadamard codes with code length Loc=2, 4, 8, or 16 include 2, 4, 8, or 16 orthogonal codes, respectively, $N_{allcode}(2)=2$, $N_{allcode}(4)=4$, $N_{allcode}(8)=8$, and $N_{allcode}(16)=16$ hold true. For example, code generator 104 may use $N_{CM}$ orthogonal codes among $N_{allcode}(Loc)$ codes included in the Walsh-Hadamard codes with code length Loc.

Here, a description will be given of the code length. For example, if acceleration is included in the moving speed of a target or radar apparatus 10, the longer the code length is, the more susceptible to inter-symbol interference the codes are. Further, candidates for the Doppler aliasing range for the below-described Doppler aliasing determination increase with increasing code length. Accordingly, with a plurality of Doppler frequency targets at the same distance index across the different aliasing ranges, the probability that Doppler frequency indexes detected in different aliasing ranges overlap each other increases. This can make it more difficult for radar apparatus 10 to appropriately determine aliasing.

For this reason, radar apparatus 10 may use a code with a shorter code length from the viewpoint of the performance and the arithmetic amount of the aliasing determination of aliasing determiner 212 of radar receiver 200 to be described later. By way of example, radar apparatus 10 may use an orthogonal code sequence having the shortest code length among code lengths Loc satisfying Expression 1.

Note that, when the Walsh-Hadamard codes with code length Loc include code [$OC_{ncm}(1)$, $OC_{ncm}(2)$, . . . , $OC_{ncm}$(Loc-1), and $OC_{ncm}$(Loc)] with code length Loc, the Walsh-Hadamard codes with code length Loc also include code [$OC_{ncm}(1)$, $-OC_{ncm}(2)$, . . . , $OC_{ncm}$(Loc-1), and $-OC_{ncm}$(Loc)] in which the odd-numbered code elements of the code are the same between the codes and the even-numbered code elements have signs inverted between the codes.

Note also that, even in a case of codes different from the Walsh-Hadamard codes with code length Loc, when code [$OC_{ncm}(1)$, $OC_{ncm}(2)$, . . . , $OC_{ncm}$(Loc-1), and $OC_{ncm}$(Loc)] with code length Loc is included, the code with code length Loc may be code [$OC_{ncm}(1)$, $-OC_{ncm}(2)$, . . . , $OC_{ncm}$(Loc-1), and $-OC_{ncm}$(Loc)] with the same odd-numbered code elements of the code and the even-numbered code elements with inverted signs, or may be code [$-OC_{ncm}(1)$, $OC_{ncm}(2)$, . . . , $-OC_{ncm}$(Loc-1), and $OC_{ncm}$(Loc)] with the same even-numbered code elements of the code and the odd-numbered code elements with inverted signs.

When number ($N_{allcode}-N_{CM}$) of unused orthogonal codes is 2 or more, radar apparatus 10 may, for example, select codes such that the set of codes having the aforementioned relationship is not included in the unused orthogonal codes. For example, among the set of codes having the aforementioned relationship, one of the codes may be used for code multiplexing and the other code may be included in the unused orthogonal codes. Such selection of the unused orthogonal codes allows enhancement of the Doppler frequency aliasing determination accuracy of aliasing determiner 212 of radar receiver 200 to be described later (an example will be described later).

Next, a description will be given of an example of orthogonal codes for each number $N_{CM}$ of code multiplexing.

<Case of $N_{CM}$=2 or 3>

When $N_{CM}$=2 or 3, the Walsh-Hadamard codes with code length Loc=4, 8, 16, 32, or so forth may be applied, for example. In the case of one of these code lengths Loc, $N_{CM}<N_{allcode}$(Loc). Further, a description will be given of a case where, when number $N_{CM}$ of code multiplexing=2 or 3, the Walsh-Hadamard codes with the shortest code length (for example, Loc=4) among these code lengths Loc are used.

For example, the Walsh-Hadamard codes with code length Loc are denoted by $WH_{Loc}$(nwhc). Note that nwhc represents a code index of each code included in the Walsh-Hadamard codes with code length Loc, and nwhc is 1, . . . , Loc. For example, the Walsh-Hadamard codes with code length Loc=4 include orthogonal codes $WH_4(1)$=[1, 1, 1, 1], $WH_4(2)$=[1, -1, 1, -1], $WH_4(3)$=[1, 1, -1, -1], and $WH_4(4)$=[1, -1, -1, 1].

Here, among the Walsh-Hadamard codes with code length Loc=4, $WH_4(1)$=[1, 1, 1, 1] and $WH_4(2)$=[1, -1, 1, -1] are a set of codes including the odd-numbered code elements the same between the codes and the even-numbered code elements with signs inverted between the codes. Moreover, $WH_4(3)$=[1, 1, -1, -1] and $WH_4(4)$=[1, -1, -1, 1] are a set of codes having the same relationship as the set of $WH_4(1)$ and $WH_4(2)$.

For example, when number ($N_{allcode}-N_{CM}$) of unused orthogonal codes is 2 or more, radar apparatus 10 may select codes such that the set of codes having the above-described relationship is not included in the unused orthogonal codes.

For example, in the case of number $N_{CM}$ of code multiplexing=2, code generator 104 determines two orthogonal codes among the Walsh-Hadamard codes with code length Loc=4 as the codes for code multiplexing transmission. In this case, number ($N_{allcode}-N_{CM}$) of unused orthogonal codes is 2.

For example, code generator 104 may select the codes for code multiplexing transmission such that the set of codes of $WH_4(1)$ and $WH_4(2)$ or the set of codes of $WH_4(3)$ and $WH_4(4)$ is not included in the unused orthogonal codes. For example, the combination of codes (Code$_1$ and Code$_2$) for code multiplexing transmission may be a combination of Code$_1$=$WH_4(1)$ (=[1, 1, 1, 1]) and Code$_2$=$WH_4(3)$ (=[1, 1, -1, -1]), a combination of Code$_1$=$WH_4(1)$ and Code$_2$=$WH_4(4)$, a combination of Code$_1$=$WH_4(2)$ and Code$_2$=$WH_4(3)$, or a combination of Code$_1$=$WH_4(2)$ and Code$_2$=$WH_4(4)$.

Further, in the case of number $N_{CM}$ of code multiplexing=2, for example, aliasing determiner 212 of radar receiver 200 may use, for the aliasing determination, at least one of two (=$N_{allcode}-N_{CM}$) unused orthogonal codes that are not used by code generator 104 (in other words, not used for code multiplexing transmission) among the $N_{allcode}$=4 Walsh-Hadamard codes with code length Loc=4 (an example will be described later).

Hereinbelow, among $N_{allcode}$ orthogonal codes with code length Loc, the unused orthogonal codes are represented as "UnCode$_{nuc}$=[$UOC_{nuc}(1)$, $UOC_{nuc}(2)$, . . . , $UOC_{nuc}$(Loc)]." Note that UnCode$_{nuc}$ represents the nucth unused orthogonal code. In addition, nuc represents the indexes of unused orthogonal codes, where nuc=1, . . . , ($N_{allcode}-N_{CM}$). Further, $UOC_{nuc}$(noc) represents the nocth code element of nucth unused orthogonal code UnCode$_{nuc}$. In addition, noc represents the index of a code element, where noc=1, . . . , Loc.

For example, when number $N_{CM}$ of code multiplexing=2 and the codes for code multiplexing transmission determined by code generator 104 are Code$_1$=$WH_4(1)$ (=[1, 1, 1, 1]) and Code$_2$=$WH_4(3)$ (=[1, 1, -1, -1]), the unused orthogonal codes are UnCode$_1$=$WH_4(2)$ (=[1, -1, 1, -1]) and UnCode$_2$=$WH_4(4)$ (=[1, -1, -1, 1]). Note that the combination of unused orthogonal codes (UnCode$_1$ and UnCode$_2$) is not limited to the combination of $WH_4(2)$ and $WH_4(4)$, and may be a combination of other codes.

Likewise, when number $N_{CM}$ of code multiplexing=3, code generator 104 determines three orthogonal codes of the Walsh-Hadamard codes with code length Loc=4 as the codes for code multiplexing transmission, for example. In this case, number ($N_{allcode}-N_{CM}$) of unused orthogonal codes is 1.

For example, code generator 104 may select Code$_1$=$WH_4$(3)=[1, 1, -1, -1], Code$_2$=$WH_4(4)$=[1, -1, -1, 1], and Code$_3$=$WH_4(2)$=[1, -1, 1, -1].

Further, aliasing determiner 212 of radar receiver 200 may use, for the aliasing determination, one (=$N_{allcode}-N_{CM}$) unused orthogonal code among the $N_{allcode}$=4 Walsh-Hadamard codes with code length Loc=4 (an example will be described below). For example, when number $N_{CM}$ of code multiplexing=3 and the codes for code multiplexing transmission determined by code generator 104 are Code$_1$=$WH_4(3)$=[1, 1, -1, -1], Code$_2$=$WH_4(4)$=[1, -1, -1, 1], and $Code_3=WH_4(2)=[1, -1, 1, -1]$, the unused orthogonal code is $UnCode_1=WH_4(1)=[1, 1, 1, 1]$. Note that the combination of the codes for code multiplexing transmission ($Code_1$, $Code_2$ and $Code_3$) and the unused orthogonal code ($UnCode_1$) is not limited to this example, and may be a combination of other codes.

<Case of $N_{CM}=4$, 5, 6, or 7>

In the case of $N_{CM}=4$, 5, 6, or 7, for example, the Walsh-Hadamard codes with code length Loc=8, 16, 32, . . . , or so forth may be applied. In the case of one of these code lengths Loc, $N_{CM}<N_{allcode}$(Loc). Further, a description will be given of a case where, when number $N_{CM}$ of code multiplexing=4, 5, 6, or 7, the Walsh-Hadamard codes with the shortest code length (for example, Loc=8) among these code lengths Loc are used.

For example, the Walsh-Hadamard codes with code length Loc=8 include the following eight orthogonal codes:

$$WH_8(1) = [\ 1\ \ \ 1\ \ \ 1\ \ \ 1\ \ \ 1\ \ \ 1\ \ \ 1\ \ \ 1\ ],$$
$$WH_8(2) = [\ 1\ -1\ \ \ 1\ -1\ \ \ 1\ -1\ \ \ 1\ -1\ ],$$
$$WH_8(3) = [\ 1\ \ \ 1\ -1\ -1\ \ \ 1\ \ \ 1\ -1\ -1\ ],$$
$$WH_8(4) = [\ 1\ -1\ -1\ \ \ 1\ \ \ 1\ -1\ -1\ \ \ 1\ ],$$
$$WH_8(5) = [\ 1\ \ \ 1\ \ \ 1\ \ \ 1\ -1\ -1\ -1\ -1\ ],$$
$$WH_8(6) = [\ 1\ -1\ \ \ 1\ -1\ -1\ \ \ 1\ -1\ \ \ 1\ ],$$
$$WH_8(7) = [\ 1\ \ \ 1\ -1\ -1\ -1\ -1\ \ \ 1\ \ \ 1\ ],\text{ and}$$
$$WH_8(8) = [\ 1\ -1\ -1\ \ \ 1\ -1\ \ \ 1\ \ \ 1\ -1\ ].$$

Here, among the Walsh-Hadamard codes with code length Loc=8, $WH_8(1)$ and $WH_8(2)$ are a set of codes including the odd-numbered code elements the same between the codes and the even-numbered code elements with signs inverted between the codes. Similarly, the set of $WH_8(3)$ and $WH_8(4)$, the set of $WH_8(5)$ and $WH_8(6)$, and, the set of $WH_8(7)$ and $WH_8(8)$ are sets of codes having the same relationship as the set of $WH_8(1)$ and $WH_8(2)$.

When number ($N_{allcode}-N_{CM}$) of unused orthogonal codes is 2 or more, code generator 104 may select codes for code multiplexing transmission such that none of the sets of codes having the aforementioned relationship is included in the unused orthogonal codes. For example, the codes for code multiplexing transmission may be selected such that none of the set of codes of $WH_8(1)$ and $WH_8(2)$, the set of codes of $WH_8(3)$ and $WH_8(4)$, the set of codes of $WH_8(5)$ and $WH_8(6)$, and the set of codes of $WH_8(7)$ and $WH_8(8)$ is included in the unused orthogonal codes.

For example, in the case of number $N_{CM}$ of code multiplexing=4, code generator 104 determines four orthogonal codes among the Walsh-Hadamard codes with code length Loc=8 as the codes for code multiplexing transmission. In this case, number ($N_{allcode}-N_{CM}$) of unused orthogonal codes is 4.

For example, in code generator 104, the combination of the codes for code multiplexing transmission ($Code_1$, $Code_2$, $Code_3$, and $Code_4$) may be a combination of $Code_1=WH_8(1)$, $Code_2=WH_8(3)$, $Code_3=WH_8(5)$, and $Code_4=WH_8(7)$, or a combination of $Code_1=WH_8(1)$, $Code_2=WH_8(4)$, $Code_3=WH_8(5)$, and $Code_4=WH_8(8)$. Note that, the combination of the codes for code multiplexing transmission ($Code_1$, $Code_2$, $Code_3$, and $Code_4$) is not limited to these.

Further, in the case of number $N_{CM}$ of code multiplexing=4, for example, aliasing determiner 212 of radar receiver 200 may use, for aliasing determination, a part or all of four ($=N_{allcode}-N_{CM}$) unused orthogonal codes among the $N_{allcode}=8$ Walsh-Hadamard codes with code length Loc=8 which are not used by code generator 104 (an example will be described later).

For example, when number $N_{CM}$ of code multiplexing=4 and the codes for code multiplexing transmission determined by code generator 104 are $Code_1=WH_8(1)$, $Code_2=WH_8(3)$, $Code_3=WH_8(5)$, and $Code_4=WH_8(7)$, the unused orthogonal codes are $UnCode_1=WH_8(2)$, $UnCode_2=WH_8(4)$, $UnCode_3=WH_8(6)$, and $UnCode_4=WH_8(8)$. As another example, when number $N_{CM}$ of code multiplexing=4 and the codes for code multiplexing transmission determined by code generator 104 are $Code_1=WH_8(1)$, $Code_2=WH_8(4)$, $Code_3=WH_8(5)$, and $Code_4=WH_8(8)$, the unused orthogonal codes are $UnCode_1=WH_8(2)$, $UnCode_2=WH_8(3)$, $UnCode_3=WH_8(6)$, and $UnCode_4=WH_8(7)$.

Likewise, for example, in the case of number $N_{CM}$ of code multiplexing=5, code generator 104 determines five orthogonal codes among the Walsh-Hadamard codes with code length Loc=8 as the codes for code multiplexing transmission. In this case, number ($N_{allcode}-N_{CM}$) of unused orthogonal codes is 3.

For example, in code generator 104, the combination of the codes for code multiplexing transmission ($Code_1$, $Code_2$, $Code_3$, $Code_4$, and $Code_5$) may be a combination of $Code_1=WH_8(1)$, $Code_2=WH_8(3)$, $Code_3=WH_8(5)$, $Code_4=WH_8(7)$, and $Code_5=WH_8(8)$, or a combination of $Code_1=WH_8(1)$, $Code_2=WH_8(4)$, $Code_3=WH_8(5)$, $Code_4=WH_8(7)$, and $Code_5=WH_8(8)$. Note that, the combination of the codes for code multiplexing transmission ($Code_1$, $Code_2$, $Code_3$, $Code_4$, and $Code_5$) is not limited to these.

Further, in the case of number $N_{CM}$ of code multiplexing=5, for example, aliasing determiner 212 of radar receiver 200 may use, for aliasing determination, a part or all of three ($=N_{allcode}-N_{CM}$) unused orthogonal codes among the $N_{allcode}=8$ Walsh-Hadamard codes with code length Loc=8 which are not used by code generator 104 (an example will be described later).

For example, when number $N_{CM}$ of code multiplexing=5 and the codes for code multiplexing transmission determined by code generator 104 are $Code_1=WH_8(1)$, $Code_2=WH_8(3)$, $Code_3=WH_8(5)$, $Code_4=WH_8(7)$, and $Code_5=WH_8(8)$, the unused orthogonal codes are $UnCode_1=WH_8(2)$, $UnCode_2=WH_8(4)$, and $UnCode_3=WH_8(6)$. Or, for example, when number $N_{CM}$ of code multiplexing=5 and the codes for code multiplexing transmission determined by code generator 104 are $Code_1=WH_8(1)$, $Code_2=WH_8(4)$, $Code_3=WH_8(5)$, $Code_4=WH_8(7)$, and $Code_5=WH_8(8)$, the unused orthogonal codes are $UnCode_1=WH_8(2)$, $UnCode_2=WH_8(3)$, and $UnCode_3=WH_8(6)$.

Likewise, for example, in the case of number $N_{CM}$ of code multiplexing=6, code generator 104 determines six orthogonal codes among the Walsh-Hadamard codes with code length Loc=8 as the codes for code multiplexing transmission. In this case, number ($N_{allcode}-N_{CM}$) of unused orthogonal codes is 2.

For example, in code generator 104, the combination of the codes for code multiplexing transmission ($Code_1$, $Code_2$, $Code_3$, $Code_4$, $Code_5$, and $Code_6$) may, for example, be $Code_1=WH_8(1)$, $Code_2=WH_8(2)$, $Code_3=WH_8(3)$, $Code_4=WH_8(4)$, $Code_5=WH_8(5)$, and $Code_6=WH_8(8)$. Note that, the combination of the codes for code multiplexing transmission (Code$_1$, Code$_2$, Code$_3$, Code$_4$, Code$_5$, and Code$_6$) is not limited to these.

Further, in the case of number N$_{CM}$ of code multiplexing=6, for example, aliasing determiner 212 of radar receiver 200 may use, for aliasing determination, a part or all of two (=N$_{allcode}$−N$_{CM}$) unused orthogonal codes among the N$_{allcode}$=8 Walsh-Hadamard codes with code length Loc=8 which are not used by code generator 104 (an example will be described later).

For example, when number N$_{CM}$ of code multiplexing=6 and the codes for code multiplexing transmission determined by code generator 104 are Code$_1$=WH$_8$(1), Code$_2$=WH$_8$(2), Code$_3$=WH$_8$(3), Code$_4$=WH$_8$(4), Code$_5$=WH$_8$(5), and Code$_6$=WH$_8$(8), the unused orthogonal codes are UnCode$_1$=WH$_8$(6) and UnCode$_2$=WH$_8$(7).

Likewise, for example, in the case of number N$_{CM}$ of code multiplexing=7, code generator 104 determines seven orthogonal codes among the Walsh-Hadamard codes with code length Loc=8 as the codes for code multiplexing transmission. In this case, number (N$_{allcode}$−N$_{CM}$) of unused orthogonal codes is 1.

For example, code generator 104 may select Code$_1$=WH$_8$(1), Code$_2$=WH$_8$(2), Code$_3$=WH$_8$(3), Code$_4$=WH$_8$(4), Code$_5$=WH$_8$(5), Code$_6$=WH$_8$(6), and Code$_7$=WH$_8$(7) as the codes for code multiplexing transmission. Note that the combination of the codes for code multiplexing transmission is not limited to this.

Further, aliasing determiner 212 of radar receiver 200 may use, for aliasing determination, one (=N$_{allcode}$−N$_{CM}$) unused orthogonal code among the N$_{allcode}$=8 Walsh-Hadamard codes with code length Loc=8 which is not used by code generator 104 (an example will be described later).

For example, when number N$_{CM}$ of code multiplexing=7 and the codes for code multiplexing transmission determined by code generator 104 are Code$_1$=WH$_8$(1), Code$_2$=WH$_8$(2), Code$_3$=WH$_8$(3), Code$_4$=WH$_8$(4), Code$_5$=WH$_8$(5), Code$_6$=WH$_8$(6), and Code$_7$=WH$_8$(7), the unused orthogonal code is UnCode$_1$=WH(8).

The cases of number N$_{CM}$ of code multiplexing=4, 5, 6, and 7 have been described.

Note that also when number N$_{CM}$ of code multiplexing=8 or more, radar apparatus 10 may determine the codes for code multiplexing transmission and the unused orthogonal codes in the same manner as in the cases of number N$_{CM}$ of code multiplexing=2 to 7.

For example, code generator 104 may select, as the codes for code multiplexing transmission, N$_{CM}$ orthogonal codes among the Walsh-Hadamard codes with code length Loc given by Expression 2:

[2]

$$Loc = 2^{ceil[\log_2(NCM+1)]} \quad \text{(Expression 2)}.$$

In this case, N$_{CM}$<Loc=N$_{allcode}$.

Further, aliasing determiner 212 of radar receiver 200 may use, for the aliasing determination, (N$_{allcode}$−N$_{CM}$) unused orthogonal codes of the N$_{allcode}$=Loc Walsh-Hadamard codes with code length Loc (an example will be described below). In addition, when number (N$_{allcode}$−N$_{CM}$) of unused orthogonal codes is 2 or more, code generator 104 may select, for example, among the Walsh-Hadamard codes with code length Loc, codes for code multiplexing transmission such that the set of codes in which either the odd-numbered code elements or the even-numbered code elements are the same between the codes, and the other code elements have signs inverted between the codes is not included in the unused orthogonal codes.

In other words, among the Walsh-Hadamard codes with code length Loc, one code in the set of codes in which either the odd-numbered code elements or the even-numbered code elements are the same between the codes and the other code elements have signs inverted between the codes may be included in the unused orthogonal codes, while the other code may not be included in the unused orthogonal codes.

Note that the elements constituting the orthogonal code sequence are not limited to real numbers, and may include a complex value.

Note also that the codes may also be other orthogonal codes different from the Walsh-Hadamard codes. For example, the codes may be orthogonal M-sequence codes or pseudo-orthogonal codes.

An example of the orthogonal codes in each case of number N$_{CM}$ of code multiplexing has been described above.

Next, exemplary phase rotation amounts based on the codes for code multiplexing transmission generated in code generator 104 will be described.

For example, radar apparatus 10 performs code multiplexing transmission using different orthogonal codes for respective transmit antennas Tx #1 to Tx #N$_{Tx}$ that perform the code multiplexing transmission. For example, code generator 104 sets phase rotation amount $\psi_{ncm}(m)$ based on orthogonal code Code$_{ncm}$ that is to be applied to ncmth transmit antenna Tx #ncm at mth transmission period Tr, and outputs phase rotation amount $\psi_{ncm}(m)$ to phase rotator 105. Here, ncm=1, . . . , N$_{CM}$.

For example, with phase rotation amount $\psi_{ncm}(m)$, a phase amount corresponding to each of Loc code elements OC$_{ncm}$(1), . . . , OC$_{ncm}$(Loc) of orthogonal code Code$_{ncm}$ is cyclically applied per Loc (code length) transmission periods as given by following Expression 3:

[3]

$$\psi_{ncm}(m) = \text{angle}[OC_{ncm}(OC\_INDEX)] \quad \text{(Expression 3)}.$$

Here, "angle(x)" is an operator outputting the radian phase of real number x, and angle(1)=0, angle(−1)=π, angle (j)=π/2, and angle(−j)=−π/2. The character "j" is an imaginary unit. OC_INDEX represents an orthogonal code element index indicating an element of orthogonal code sequence Code$_{ncm}$, and cyclically varies in the range of from 1 to Loc per transmission period (Tr), as given by following Expression 4:

[4]

$$OC\_INDEX = \text{mod}(m-1, Loc) + 1 \quad \text{(Expression 4)}.$$

Here, mod(x, y) is a modulo operator and is a function that outputs the remainder after x is divided by y. Further, m=1, . . . , Nc. Nc denotes a predetermined number of transmission periods used by radar apparatus 10 for radar positioning (hereinafter referred to as "radar-transmission-signal transmission times"). Further, radar apparatus 10, for example, performs radar-transmission-signal transmission times Nc of transmission, where Nc is an integer multiple of Loc (e.g., Loc multiplied by a factor of Ncode). For example, Nc=Loc×Ncode.

Further, code generator 104 outputs, per transmission period (Tr), orthogonal code element index OC_INDEX to output switcher 209 of radar receiver 200.

Phase rotator 105 includes, for example, phase shifters or phase modulators corresponding respectively to N$_{Tx}$ transmit antennas 106. For example, phase rotator 105 applies phase rotation amount $\psi_{ncm}(m)$ inputted from code generator 104 to a chirp signal inputted from radar-transmission-signal generator 101 per transmission period Tr.

For example, phase rotator 105 applies, to the chirp signal inputted from radar-transmission-signal generator 101 per transmission period Tr, phase rotation amount $\psi_{ncm}(m)$ based on orthogonal code $Code_{ncm}$ applied to ncmth transmit antenna Tx #ncm. Here, ncm=1, . . . , $N_{CM}$ and m=1, . . . , Nc.

Outputs from phase rotator 105 to $N_{Tx}$ transmit antennas 106 are amplified to predetermined transmission power, for example, and then radiated into space from $N_{Tx}$ transmit antennas 106 (e.g., transmit array antenna).

By way of example, a description will be given of a case where code multiplexing transmission in the case of number $N_{CM}$ of code multiplexing=3 is performed using number $N_{T1}$=1 of first transmit antenna 106-1 and number $N_{T2}$=2 of second transmit antennas 106-2 (number $N_{Tx}$ of transmit antennas=$N_{T1}$+$N_{T2}$=3). Note that, number $N_{Tx}$ of transmit antennas and number $N_{CM}$ of code multiplexing are not limited to these values.

For example, phase rotation amounts $\psi_1(m)$, $\psi_2(m)$, and $\psi_3(m)$ are outputted from code generator 104 to phase rotator 105 per mth transmission period Tr.

First (ncm=1) phase rotator 105 (in other words, a phase shifter corresponding to first transmit antenna 106-1 (for example, Tx #1)) applies, per transmission period Tr, phase rotation to the chirp signal generated in radar-transmission-signal generator 101 per transmission period Tr as given by following Expression 5:

[5]

$$\exp[j\psi_1(1)]cp(t), \exp[j\psi_1(2)]cp(t), \exp[j\psi_1(3)]cp(t), \ldots, \exp[j\psi_1(Nc)]cp(t) \quad \text{(Expression 5)}.$$

The output of first phase rotator 105 is transmitted from first transmit antenna 106-1 (Tx #1). Here, cp(t) represents the chirp signal per transmission period Tr outputted from radar-transmission-signal generator 101.

Likewise, second (ncm=2) phase rotator 105 applies, per transmission period Tr, phase rotation to the chirp signal generated in radar-transmission-signal generator 101 per transmission period Tr as given by following Expression 6:

[6]

$$\exp[j\psi_2(1)]cp(t), \exp[j\psi_2(2)]cp(t), \exp[j\psi_2(3)]cp(t), \ldots, \exp[j\psi_2(Nc)]cp(t) \quad \text{(Expression 6)}.$$

The output of second phase rotator 105 is transmitted from second transmit antenna 106-2 (e.g., Tx #2).

Likewise, third (ncm=3) phase rotator 105 applies, per transmission period Tr, phase rotation to the chirp signal generated in radar-transmission-signal generator 101 per transmission period Tr as given by following Expression 7:

[7]

$$\exp[j\psi_3(1)]cp(t), \exp[j\psi_3(2)]cp(t), \exp[j\psi_3(3)]cp(t), \ldots, \exp[j\psi_3(Nc)]cp(t) \quad \text{(Expression 7)}.$$

The output of third phase rotator 105 is transmitted from second transmit antenna 106-2 (e.g., Tx #3).

Note that, when performing radar positioning continuously, radar apparatus 10 may set a code used as orthogonal code $Code_{ncm}$ variably for each radar positioning (for example, per Nc transmission periods (Nc×Tr)).

Further, radar apparatus 10 may, for example, variably set transmit antennas 106 that transmit the outputs of $N_{Tx}$ phase rotators 105 (in other words, transmit antennas 106 corresponding respectively to the outputs of phase rotators 105).

For example, association between the plurality of transmit antennas 106 and the code sequences for code multiplexing transmission may be different for each radar positioning in radar apparatus 10. For example, when radar apparatus 10 receives a signal under the influence of interference by another radar different for each transmit antenna 106, the code multiplexed signal outputted from transmit antenna 106 per radar positioning is changed, so that a randomization effect on the influence of interference can be obtained.

The exemplary configuration of radar transmitter 100 has been described above.

[Configuration of Radar Receiver 200]

In FIG. 1, radar receiver 200 includes Na receive antennas 202 (e.g., also represented as Rx #1 to Rx #Na) and forms an array antenna. Further, radar receiver 200 includes Na antenna system processors 201-1 to 201-Na, Constant False Alarm Rate (CFAR) section 211, aliasing determiner 212, code demultiplexer 213, and direction estimator 214.

Each of receive antennas 202 receives a reflected wave signal that is a radar transmission signal reflected by a reflecting object including a target of radar positioning, and outputs, as a reception signal, the received reflected wave signal to corresponding one of antenna system processors 201.

Each of antenna system processors 201 includes reception radio 203 and signal processor 206.

Reception radio 203 includes mixer 204 and low pass filter (LPF) 205. Mixer 204 mixes, for example, the received reflected wave signal with a chirp signal that is the radar transmission signal inputted from radar-transmission-signal generator 101. LPF 205 performs LPF processing on an output signal from mixer 204 to output a beat signal representing a frequency of the reflected wave signal depending on a delay time. For example, as illustrated in FIG. 2, the difference frequency between the frequency of a transmission chirp signal (transmission frequency-modulated wave) and the frequency of a reception chirp signal (reception frequency-modulated wave) is obtained as the beat frequency (in other words, beat signal).

In each antenna system processor 201-z (where z is any of 1 to Na), signal processor 206 includes analog-to-digital (AD) converter 207, beat frequency analyzer 208, output switcher 209, and Doppler analyzers 210.

In signal processor 206, AD converter 207 converts the signal outputted from LPF 205 (e.g., the beat signal) into discretely sampled data, for example.

Beat frequency analyzer 208 performs, per transmission period Tr, Fast Fourier Transform (FFT) processing on $N_{data}$ pieces of discretely sampled data obtained in a defined time range (range gate), for example. Signal processor 206 thus outputs frequency spectra in which a peak appears at a beat frequency depending on the delay time of the reflected wave signal (radar reflected wave). Note that, as the FFT processing, beat frequency analyzer 208 may perform multiplication by a window function coefficient such as a Han window or a Hamming window, for example. Radar apparatus 10 can suppress side lobes around the beat frequency peak by using the window function coefficient.

Further, when the number of $N_{data}$ pieces of discretely sampled data is not a power of 2, beat frequency analyzer 208 may, for example, include zero-padded data to obtain the FFT size of a power of 2 to perform FFT processing.

Note that, for example, when mixer 204 has a quadrature mixer configuration, an I signal component (In-phase component) and a Q signal component (Quadrature-phase component) are obtained as outputs of mixer 204. In this case, for example, an LPF is applied to each I signal component or each Q signal component of the outputs of mixer 204, and AD conversion is applied to the outputs, so that the AD converted output of the I signal component, and, the AD converted output of the Q signal component may be obtained. When mixer 204 has the quadrature mixer configuration, beat frequency analyzer 208 can detect an aliasing beat frequency in the range of from $f_{mb}$ to $2f_{mb}$ as a negative beat frequency, so as to enlarge a distance detection range, for example, by setting cutoff frequency $f_{LPF}$ of LPF 205 to about $2f_{mb}$. Note that, $f_{mb}$ denotes the highest beat frequency detectable in the FFT processing of beat frequency analyzer 208 based on the sampling theorem and without aliasing, and may be expressed, for example, by $f_{mb}=N_{data}/(2T_{RG})=f_{sa}/2$. Here, $T_{RG}$ denotes the time range of the range gate, and $f_{sa}$ denotes the AD sampling frequency.

Here, a beat frequency response obtained by the mth chirp pulse transmission, which is outputted from beat frequency analyzer 208 in zth signal processor 206, is represented by $RFT_z(f_b, m)$. Here, $f_b$ denotes the beat frequency index and corresponds to an FFT index (bin number). For example, $f_b=0, \ldots, N_{data}/2, z=0, \ldots, Na$, and $m=1, \ldots, N_C$. A beat frequency having smaller beat frequency index $f_b$ indicates that the delay time of a reflected wave signal is shorter (in other words, the distance to the target is shorter).

In addition, beat frequency index $f_b$ may be converted into distance information using following Expression 8:

(Expression 8)

$$R(f_b) = \frac{C_o}{2B_w} f_b. \qquad [8]$$

In the following, beat frequency index $f_b$ is also referred to as "distance index $f_b$."

Here, $B_w$ denotes a frequency-modulation bandwidth of the chirp signal within the range gate, and $C_0$ denotes the speed of light.

When mixer 204 has the quadrature mixer configuration, a signal detected as the negative beat frequency (e.g., $f_b=-N_{data}/2, \ldots, -1$) can, for example, be regarded as aliasing of a positive beat frequency ($f_b=N_{data}/2, \ldots, N_{data}-1$). Therefore, such a signal may be expressed as $f_b=0, \ldots, N_{data}-1$, for example.

Based on orthogonal code element index OC_INDEX outputted from code generator 104, output switcher 209 selectively switches to OC_INDEXth Doppler analyzer 210 among Loc Doppler analyzers 210 and outputs the output of beat frequency analyzer 208 per transmission period to the OC_INDEXth Doppler analyzer. In other words, output switcher 209 selects OC_INDEXth Doppler analyzer 210 in mth transmission period Tr.

Signal processor 206 includes, for example, Loc Doppler analyzers 210-1 to 210-Loc. For example, data is inputted by output switcher 209 to nocth Doppler analyzer 210 per Loc transmission periods (Loc×Tr). Accordingly, nocth Doppler analyzer 210 performs Doppler analysis for each distance index $f_b$ using data in Ncode transmission periods among Nc transmission periods (for example, using beat frequency response $RFT_z(f_b, m)$ outputted from beat frequency analyzer 208). Here, noc denotes the index of a code element, and noc=1, . . . , Loc.

For example, when Ncode is a power of 2, FFT processing may be applied in the Doppler analysis. In this case, the FFT size is Ncode, and a maximum Doppler frequency that is derived from the sampling theorem and does not cause aliasing is ±1/(2Loc×Tr). Further, the Doppler frequency interval for Doppler frequency index $f_s$ is 1/(Ncode×Loc× Tr), and the range of Doppler frequency index $f_s$ is $f_s=-$Ncode/2, . . . , 0, . . . , Ncode/2−1.

For example, outputs $VFT_z^{noc}(f_b, f_s)$ of Doppler analyzers 210 of zth signal processor 206 are given by following Expression 9:

(Expression 9)

$$VFT_z^{noc}(f_b, f_s) = \sum_{s=0}^{N_{code}-1} RFT_z(f_b, L_{OC} \times s + noc)\exp\left[-j\frac{2\pi f_s}{N_{code}}\right]. \qquad [9]$$

Here, j is the imaginary unit and z=1 to Na.

Further, when Ncode is not a power of 2, zero-padded data may, for example, be included to obtain the data size (FFT size) of a power of 2 to perform FFT processing. For example, when the FFT size in Doppler analyzer 210 for the case where the zero-padded data is included is denoted by $N_{codewzero}$, outputs $VFT_z^{noc}(f_b, f_s)$ of Doppler analyzers 210 in zth signal processor 206 are given by following Expression 10:

(Expression 10)

$$VFT_z^{noc}(f_b, f_s) = \sum_{s=0}^{N_{codewzero}-1} RFT_z(f_b, L_{OC} \times s + noc)\exp\left[-j\frac{2\pi f_s}{N_{codewzero}}\right]. \qquad [10]$$

Here, noc denotes the index of a code element, and noc=1, . . . , Loc. In addition, the FFT size is $N_{codewzero}$, and the maximum Doppler frequency that is derived from the sampling theorem and does not cause aliasing is ±1/(2Loc× Tr). Further, the Doppler frequency interval for Doppler frequency index $f_s$ is 1/($N_{codewzero}$×Loc×Tr), and the range of Doppler frequency index $f_s$ is $f_s=-N_{codewzero}/2, \ldots, 0, \ldots, N_{codewzero}/2-1$.

The following description will be given of a case where Ncode is a power of 2, as an example. When zero-padding is used in Doppler analyzer 210, it is possible to apply the following description similarly and obtain similar effects with replacement of Ncode with $N_{codewzero}$ in the description.

In addition, in the FFT processing, Doppler analyzer 210 may perform multiplication by a window function coefficient such as the Han window or the Hamming window, for example. Radar apparatus 10 can suppress side lobes generated around the beat frequency peak by applying the window function.

The processing of each component of signal processor 206 has been described above.

In FIG. 1, CFAR section 211 performs CFAR processing (in other words, adaptive threshold determination) using the outputs of Loc Doppler analyzers 210 in each of the first to Nath signal processors 206 and extracts distance index $f_{b\_cfar}$ and Doppler frequency index $f_{s\_cfar}$ that provide a peak signal.

For example, CFAR section 211 performs two-dimensional CFAR processing with the distance axis and the Doppler frequency axis (corresponding to the relative velocity) or CFAR processing that is a combination of one-dimensional CFAR processing operations by power addition of outputs $VFT_z^{noc}(f_b, f_s)$ of Doppler analyzers 210 in first to Nath signal processors 206, for example, as given by following Expression 11:

(Expression 11)

$$PowerFT(f_b, f_s) = \sum_{z=1}^{N_a} \sum_{noc=1}^{L_{oc}} |VFT_z^{noc}(f_b, f_s)|^2. \quad [11]$$

For example, processing disclosed in NPL 5 may be applied as the two-dimensional CFAR processing or the CFAR processing that is a combination of one-dimensional CFAR processing operations.

CFAR section 211 adaptively sets a threshold and outputs to aliasing determiner 212, distance index $f_{b\_cfar}$, Doppler frequency index $f_{s\_cfar}$, and received-power information PowerFT($f_{b\_cfar}$, $f_{s\_cfar}$) that provides received power greater than the threshold.

Next, an operation example of aliasing determiner 212 illustrated in FIG. 1 will be described.

Aliasing determiner 212 performs aliasing determination of Doppler components $VFT_z^{noc}(f_{b\_cfar}, f_{s\_cfar})$, which are the outputs of Doppler analyzers 210, for example, based on distance indexes $f_{b\_cfar}$ and Doppler frequency indexes $f_{s\_cfar}$ extracted in CFAR section 211. Here, z=1, ..., Na, and noc=1, ..., Loc.

Aliasing determiner 212 may perform Doppler aliasing determination processing, for example, on the assumption that the Doppler range for a target is ±1/(2×Tr).

Here, since Doppler analyzer 210 applies the FFT processing to each code element, for example, when Ncode is a power value of 2, the Doppler analyzer performs the FFT processing per (Loc×Tr) periods using the output from beat frequency analyzer 208. Thus, the Doppler range in which the sampling theorem does not cause aliasing in Doppler analyzer 210 is ±1/(2Loc×Tr).

Accordingly, the Doppler range for the target assumed in aliasing determiner 212 is wider than the Doppler range in which no aliasing is caused in Doppler analyzer 210. For example, aliasing determiner 212 performs aliasing determination processing assuming Doppler range ±1/(2×Tr) that is Loc times greater than Doppler range ±1/(2Loc×Tr) in which no aliasing is caused in Doppler analyzer 210.

Hereinafter, an example of the aliasing determination processing of aliasing determiner 212 will be described.

Here, by way of example, a description will be given of a case where number $N_{CM}$ of code multiplexing=3, and code generator 104 uses three orthogonal codes $Code_1 = WH_4(3)=[1, 1, -1, -1]$, $Code_2=WH_4(4)=[1, -1, -1, 1]$, and $Code_3=WH_4(2)=[1, -1, 1, -1]$ among the Walsh-Hadamard codes with code length Loc=4.

For example, aliasing determiner 212 uses, for the aliasing determination, one $(=N_{allcode}-N_{CM})$ unused orthogonal code among the $N_{allcode}=4$ Walsh-Hadamard codes with code length Loc=4. For example, when number $N_{CM}$ of code multiplexing=3 and the codes for code multiplexing transmission determined by code generator 104 are $Code_1=WH_4(3)=[1, 1, -1, -1]$, $Code_2=WH_4(4)=[1, -1, -1, 1]$, and $Code_3=WH_4(2)=[1, -1, 1, -1]$, the unused orthogonal code is $UnCode_1=WH_4(1)=[1, 1, 1, 1]$.

For example, since Doppler analyzers 210 apply FFT processing to each code element as described above when radar apparatus 10 performs code multiplexing transmission using orthogonal codes with code length Loc=4, the FFT processing is performed using the output from beat frequency analyzer 208 per (Loc×Tr)=(4×Tr) periods. Thus, the Doppler range in which the sampling theorem does not cause aliasing in Doppler analyzer 210 is ±1/(2Loc×Tr)=±1/(8×Tr).

Aliasing determiner 212 may perform the determination of aliasing in the range greater by a factor of code length Loc of the orthogonal code sequences, for example, than the range of the Doppler analysis in Doppler analyzers 210 (Doppler range). For example, aliasing determiner 212 performs the aliasing determination processing on the assumption of the Doppler range=±1/(2×Tr) which is 4 (=Loc) times greater than the Doppler range ±1/(8×Tr) in which no aliasing is caused in Doppler analyzer 210.

Here, Doppler components $VFT_z^{noc}(f_{b\_cfar}, f_{s\_cfar})$, which are the outputs of Doppler analyzers 210 corresponding to distance indexes $f_{b\_cfar}$ and Doppler frequency indexes $f_{s\_cfar}$ extracted in CFAR section 211, may contain a Doppler component including aliasing as illustrated in FIG. 3A and FIG. 3B, for example, in the Doppler Range of ±1/(2×Tr).

For example, as illustrated in FIG. 3A, when $f_{s\_cfar}<0$, Doppler component $VFT_z^{noc}(f_{b\_cfar}, f_{s\_cfar})$ in the Doppler range of ±1/(2×Tr) may be any of four (=Loc) Doppler components of $f_{s\_cfar}$−Ncode, $f_{s\_cfar}$, $f_{s\_cfar}$+Ncode, and $f_{s\_cfar}$+2Ncode.

In addition, for example, as illustrated in FIG. 3B, when $f_{s\_cfar}>0$, Doppler component $VFT_z^{noc}(f_{b\_cfar}, f_{s\_cfar})$ in the Doppler range of ±1/(2×Tr) may be any of four (=Loc) Doppler components of $f_{s\_cfar}$−2Ncode, $f_{s\_cfar}$−Ncode, $f_{s\_cfar}$, and $f_{s\_cfar}$+Ncode.

Aliasing determiner 212 performs code separation processing in the Doppler range of ±1/(2×Tr) as illustrated in FIGS. 3A and 3B, for example, using an unused orthogonal code. For example, aliasing determiner 212 may correct, for the unused orthogonal code, the phase change of four (=Loc) Doppler components including aliasing as illustrated in FIGS. 3A and 3B.

Then, aliasing determiner 212 determines whether or not each Doppler component is aliasing, for example, based on the received power of the Doppler component that is code-separated based on the unused orthogonal code. For example, aliasing determiner 212 may detect the Doppler component having the minimum received power among the Doppler components including aliasing, and determine the detected Doppler component as the true Doppler component. In other words, aliasing determiner 212 may determine that the Doppler components having other levels of received power different from the minimum received power among the Doppler components including aliasing are false Doppler components.

This aliasing determination processing makes it possible for aliasing determiner 212 to reduce ambiguity of the Doppler range including aliasing. In addition, this aliasing determination processing makes it possible for aliasing determiner 212 to expand the range in which the Doppler frequency can be detected without ambiguity to a range of from −1/(2Tr) to less than 1/(2Tr), which is greater than the Doppler range (e.g., of from −1/(8Tr) to less than 1/(8Tr)) in Doppler analyzer 210.

For example, by the code separation based on the unused orthogonal code, the phase change of the true Doppler component is corrected appropriately, and the orthogonality between the orthogonal codes for code multiplexing transmission and the unused orthogonal code is maintained. The unused orthogonal code and the code-multiplexed transmission signals are thus uncorrelated, and aliasing determiner 212 detects the received power as low as a noise level.

Meanwhile, the phase change of the false Doppler component is erroneously corrected, and the orthogonality between the orthogonal codes for code multiplexing transmission and the unused orthogonal code is not maintained. Thus, since a correlated component (interference component) between the unused orthogonal code and the code-multiplexed transmission signals is caused, aliasing determiner 212 detects the received power greater than the noise level, for example.

Therefore, as described above, aliasing determiner 212 may determine the Doppler component having the minimum received power as the true Doppler component among the Doppler components that are code-separated based on the unused orthogonal code, and determine that the other Doppler components having received power different from the minimum received power are the false Doppler components.

For example, aliasing determiner 212 corrects the phase change of the Doppler components including aliasing based on the outputs of Doppler analyzers 210 in each of antenna system processors 201, and calculates, according to following Expression 12, received power DeMulUnCode$_{nuc}$ ($f_{b\_cfar}$, $f_{s\_cfar}$, DR) after code separation using unused orthogonal code UnCode$_{nuc}$:

(Expression 12)

$$DeMulUnCode_{nuc}(f_{b\_cfar}, f_{s\_cfar}, DR) = \sum_{z=1}^{Na} |(UnCode_{nuc})^* \cdot$$

$$\{\beta(DR) \otimes \alpha(f_{s\_cfar}) \otimes VFTALL_z(f_{b\_cfar}, f_{s\_cfar})\}^T|^2. \quad [12]$$

With respect to the outputs of Doppler analyzers 210 in all of antenna system processors 201, aliasing determiner 212 calculates, using Expression 12, the sum of the received powers after the code separation using unused orthogonal code UnCode$_{nuc}$. Thus, aliasing determiner 212 can increase the aliasing determination accuracy even when the reception signal level is low. However, instead of Expression 12, with respect to the outputs of Doppler analyzers 210 in some of antenna system processors 201, aliasing determiner 212 may calculate the received power after code separation using the unused orthogonal code. Even in this case, aliasing determiner 212 can maintain the accuracy of aliasing determination and reduce the arithmetic processing amount, for example, as long as the reception signal level is sufficiently high.

Note that, nuc=1, . . . , N$_{allcode}$–N$_{CM}$ in Expression 12. Further, DR is an index indicating the Doppler aliasing range, and takes an integer value in the range of DR=ceil [–Loc/2], ceil[–Loc/2]+1, . . . , 0, . . . , ceil[Loc/2]–1, for example.

In addition, in Expression 12,

[13]

operator "⊗" [13]

represents a product between elements of vectors having the same number of elements. For example, for nth order vectors A=[a$_1$, . . . , a$_n$] and B=[b$_1$, . . . , b$_n$], the products between the elements are expressed by following Expression 13:

[14]

$A \otimes B = [a_1, \ldots, a_n] \otimes [b_1, \ldots, b_n] = [a_1 b_1, \ldots, a_n b_n]$ (Expression 13).

Further, in Expression 12,

[15]

operator "•" [15]

represents a vector dot product operator. Moreover, in Expression 12, superscript "T" represents vector transposition, and superscript "*" (asterisk) represents a complex conjugate operator.

In Expression 12, $\alpha(f_{s\_cfar})$ represents "Doppler phase correction vector." In Doppler phase correction vector $\alpha(f_{s\_cfar})$, when Doppler frequency index $f_{s\_cfar}$ extracted in CFAR section 211 is within the output range (in other words, Doppler range) of Doppler analyzer 210 that does not include Doppler aliasing, for example, aliasing determiner 212 corrects the Doppler phase rotation caused by the time difference in the Doppler analysis between Loc Doppler analyzers 210.

For example, Doppler phase correction vector $\alpha(f_{s\_cfar})$ is expressed by following Expression 14:

(Expression 14)

$$\alpha(f_{s\_cfar}) = \begin{bmatrix} 1, \exp\left\{-j\frac{2\pi f_{s\_cfar}}{N_{code}} \frac{1}{Loc}\right\}, \exp\left\{-j\frac{2\pi f_{s\_cfar}}{N_{code}} \frac{2}{Loc}\right\}, \ldots, \\ \exp\left\{-j\frac{2\pi f_{s\_cfar}}{N_{code}} \frac{Loc-1}{Loc}\right\} \end{bmatrix} \quad [16]$$

For example, Doppler phase correction vector $\alpha(f_{s\_cfar})$ given by Expression 14 is a vector having, as an element, a Doppler phase correction coefficient used to correct phase rotations of Doppler components with Doppler frequency indexes $f_{s\_cfar}$ resulting from the time delays of Tr, 2Tr, . . . , (Loc-1)Tr of output VFT$_z^2$($f_{b\_cfar}$, $f_{s\_cfar}$) of second Doppler analyzer 210 to output VFT$_z^{Loc}$($f_{b\_cfar}$, $f_{s\_cfar}$) of Locth Doppler analyzer 210, for example, with reference to the Doppler analysis time of output VFT$_z^1$($f_{b\_cfar}$, $f_{s\_cfar}$) of first Doppler analyzer 210.

Further, in Expression 12, β(DR) represents an "aliasing phase correction vector." Aliasing phase correction vector β(DR) is used, considering the case where Doppler aliasing is present, for correction of the Doppler phase rotation of an integer multiple of 2π among the Doppler phase rotations caused by the time differences in the Doppler analyses of Loc Doppler analyzers 210, for example.

For example, aliasing phase correction vector β(DR) is expressed by following Expression 15:

(Expression 15)

$$\beta(DR) = \begin{bmatrix} 1, \exp\left(-j2\pi DR \frac{1}{Loc}\right), \exp\left(-j2\pi DR \frac{2}{Loc}\right), \ldots, \\ \exp\left(-j2\pi DR \frac{Loc-1}{Loc}\right) \end{bmatrix} \quad [17]$$

For example, in the case of Loc=4, aliasing phase correction vector p(DR) takes integer values of DR=–2, –1, 0, 1, and is expressed by Expression 16, Expression 17, Expression 18, and Expression 19:

(Expression 16)

$\beta(-2) = [1, -1, 1, -1];$ [18]

(Expression 17)

$\beta(-1) = \left[1, \exp\left(j\frac{\pi}{2}\right), \exp(j\pi), \exp\left[j\pi\frac{3}{2}\right]\right];$ [19]

-continued (Expression 18)

$$\beta(0) = [1, 1, 1, 1];$$  [20]

(Expression 19)

$$\beta(1) = \left[1, \exp\left(-j\frac{\pi}{2}\right), \exp(-j\pi), \exp\left(-j\pi\frac{3}{2}\right)\right].$$  [21]

For example, when Loc=4, the Doppler range (e.g., $-\frac{1}{8}$Tr to $+\frac{1}{8}$Tr) in which the Doppler component with Doppler frequency index $f_{s\_cfar}$ as the output of Doppler analyzer 210 is detected corresponds to DR=0 in FIG. 3A or 3B. In addition, by the Doppler phase rotations (e.g., β(1), β(−1), and β(−2)) of Doppler frequency index $f_{s\_cfar}$ for DR=0 by integer multiples of 2π, aliasing determiner 212 calculates the Doppler component in the Doppler range (e.g., $\frac{1}{8}$Tr to $\frac{3}{8}$Tr) corresponding to DR=1, the Doppler component in the Doppler range (e.g., $-\frac{3}{8}$Tr to $-\frac{1}{8}$Tr) corresponding to DR=−1, and the Doppler components in the Doppler ranges (e.g., $-\frac{1}{2}$Tr to $-\frac{3}{8}$Tr and $\frac{3}{8}$Tr to $\frac{1}{2}$Tr) corresponding to DR=−2.

Further, for example, as given by following Expression 20, $VFTALL_z(f_{b\_cfar}, f_{s\_cfar})$ in Expression 12 represents vector-format component $VFT_z^{noc}(f_{b\_cfar}, f_{s\_cfar})$ (where noc=1, . . . , Loc) corresponding to distance index $f_{b\_cfar}$ and Doppler frequency index $f_{s\_cfar}$ extracted in CFAR section 211 among outputs $VFT_z^{noc}(f_b, f_s)$ of Loc Doppler analyzers 210 in zth antenna system processor 201:

[22]

$$VFTALL_z(f_{b\_cfar}, f_{s\_cfar}) = [VFT_z^{1}(f_{b\_cfar}, f_{s\_cfar}), VFT_z^{2}(f_{b\_cfar}, f_{s\_cfar}), \ldots, VFT_z^{Loc}(f_{b\_cfar}, f_{s\_cfar})]$$  (Expression 20).

For example, in accordance with Expression 12, aliasing determiner 212 calculates, within the ranges of DR=ceil[−Loc/2], ceil[−Loc/2]+1, . . . , 0, . . . , ceil[Loc/2]−1, respective received powers $DeMulUnCode_{nuc}(f_{b\_cfar}, f_{s\_cfar}, DR)$ after the code separation using unused orthogonal code $UnCode_{nuc}$ that corrects the phase changes of the Doppler components including aliasing.

Then, aliasing determiner 212 detects the DR in which received power $DeMulUnCode_{nuc}(f_{b\_cfar}, f_{s\_cfar}, DR)$ is minimum among the ranges of DR. In the following, as given by following Expression 21, the DR in which received power $DeMulUnCode_{nuc}(f_{b\_cfar}, f_{s\_cfar}, DR)$ is minimum among the ranges of DR is represented as "$DR_{min}$:"

[23]

$$DR\min = \left\{\arg DR \middle| \min_{DR=ceil[-Loc/2],\ldots,ceil[Loc/2]-1} DeMulUnCode_{nuc}(f_{b\_cfar}, f_{s\_cfar}, DR)\right\}.$$  (Expression 21)

Hereinafter, the reason why the Doppler aliasing determination is possible by the aliasing determination processing as described above will be described.

Ignoring a noise component, for example, a radar transmission signal component transmitted from ncmth transmit antenna 106 (e.g., Tx #ncm) as included in $VFTALL_z(f_{b\_cfar}, f_{s\_cfar})$ given by Expression 20 is represented by following Expression 22:

[24]

$$\beta(DR_{true})^* \otimes \alpha(f_{s\_cfar})^* \otimes \gamma_{z,ncm}Code_{ncm}$$  (Expression 22).

Here, $\gamma_{z,ncm}$ represents a complex reflection coefficient for a case where the radar transmission signal transmitted from ncmth transmit antenna 106 and reflected by the target is received by zth antenna system processor 201. In addition, $DR_{true}$ represents an index indicating the true Doppler aliasing range. $DR_{true}$ is the index in the range of ceil[−Loc/2], ceil[−Loc/2]+1, . . . , 0, . . . , ceil[Loc/2]−1. Hereinafter, the possibility of determining that $DR_{min}=DR_{true}$ will be described.

For the radar transmission signal components transmitted from the first to the Ncmth transmit antennas 106, sum PowDeMul(nuc, DR, $DR_{true}$) of the received powers after the code separation using unused orthogonal code $UnCode_{nuc}$ is expressed by following Expression 23:

[25]

(Expression 23)

$$PowDeMul(nuc, DR, DR_{true}) =$$
$$\sum_{ncm=1}^{N_{CM}} \left|UnCode_{nuc}^* \cdot \{\beta(DR) \otimes \alpha(f_{s\_cfar}) \otimes \beta(DR_{true})^* \otimes \alpha(f_{s\_cfar})^* \otimes \gamma_{z,ncm}Code_{ncm}\}^T\right|^2 =$$
$$\sum_{ncm=1}^{N_{CM}} \left|\gamma_{z,ncm}UnCode_{nuc}^* \cdot \{\beta(DR) \otimes \beta(DR_{true})^* \otimes Code_{ncm}\}^T\right|^2 =$$
$$\sum_{ncm=1}^{N_{CM}} \left|\gamma_{z,ncm}\{\beta(DR) \otimes (DR_{true})^* \otimes Uncode_{nuc}^*\} \cdot \{Code_{ncm}\}^T\right|^2.$$

Note that PowDeMul(nuc, DR, $DR_{true}$) given by Expression 23 corresponds to an evaluation value of the term

[26]

$$|(UnCode_{nuc})^* \cdot \{\beta(DR) \otimes \alpha(f_{s\_cfar}) \otimes VFTALL_z(f_{b\_cfar}, f_{s\_cfar})\}^T|^2$$  [26]

in Expression 12.

In Expression 23, when DR=$DR_{true}$, a correlation value between unused orthogonal code $UnCode_{nuc}$ and orthogonal code $Code_{ncm}$ for code multiplexing transmission is zero (e.g., $UnCode_{nuc}^* \cdot \{Code_{ncm}\}^T=0$), and accordingly, PowDeMul(nuc, DR, $DR_{true}$)=0.

On the other hand, when DR≠$DR_{true}$ in Expression 23, PowDeMul(nuc, DR, $DR_{true}$) depending on the correlation value between

[27]

$$\beta(DR) \otimes \beta(DR_{true})^* \otimes UnCode_{nuc}^*$$  [27]

and orthogonal code $Code_{ncm}$ for code multiplexing transmission is outputted. Here, when PowDeMul(nuc, DR, $DR_{true}$) is not zero for all $UnCode_{nuc}$, following Expression 24 is satisfied, for example, and, when $DR=DR_{true}$, the power of $PowDeMul(nuc, DR_{true}, DR_{true})$ is minimum, so that aliasing determiner 212 can detect $DR_{true}$ (=$DR_{min}$):

[28]

$$\sum_{nuc=1}^{N_{allcode}-N_{CM}} PowDeMul(nuc, DR, DR_{true}) > 0. \quad \text{(Expression 24)}$$

In other words, aliasing determiner 212 can perform the Doppler aliasing determination according to Expression 12.

For example, to satisfy Expression 24, the term

[29]

$$\beta(DR)^* \otimes \beta(DR_{true}) \otimes UnCode_{nuc} \quad [29]$$

needs not to match another unused orthogonal code $UnCode_{nuc2}$. Here, nuc2≠nuc.

Thus, when the number of unused orthogonal codes is one, Expression 24 is satisfied. Further, when a plurality of unused orthogonal codes are present, code generator 104 may select the codes for code multiplexing transmission such that the term

[29]

$$\beta(DR)^* \otimes \beta(DR_{true}) \otimes UnCode_{nuc} \quad [30]$$

does not match another unused orthogonal code, for example.

Here, when a code such as the Walsh-Hadamard code or the orthogonal M-sequence code is used, a set of codes in which odd-numbered code elements are the same between the codes and even-numbered code elements have signs inverted between the codes may be included among orthogonal codes with code length Loc.

Meanwhile, since $\beta(0)=[1, 1, \ldots, 1]$ and $\beta(-Loc/2)=[1, -1, 1, -1, \ldots, 1, -1]$, the term

[31]

$$\beta(0)^* \otimes \beta(-Loc/2) \otimes UnCode_{nuc} \quad [31]$$

is converted into codes in which the odd-numbered code elements of $UnCode_{nuc}$ are the same between the codes and the even-numbered code elements signs inverted between the codes.

Accordingly, when number ($N_{allcode}-N_{CM}$) of unused orthogonal codes is 2 or more, code generator 104 may select, for example, among the orthogonal codes with code length Loc, codes for code multiplexing transmission or unused orthogonal codes such that the set of codes in which either the odd-numbered code elements or the even-numbered code elements are the same between the codes, and the other code elements have signs inverted between the codes is not included in the unused orthogonal codes.

For example, the Walsh-Hadamard codes with code length Loc=4 include $WH_4(1)=[1, 1, 1, 1]$ and $WH_4(2)=[1, -1, 1, -1]$, and are expressed as

[32]

$$\beta(0)^* \otimes \beta(-Loc/2) \otimes WH_4(1) = WH_4(2) \quad [32]$$

or

[33]

$$\beta(0)^* \otimes \beta(-Loc/2) \otimes WH_4(2) = WH_4(1). \quad [33]$$

Thus, code generator 104 may, for example, select the codes for code multiplexing transmission or the unused orthogonal code so as not to include a set of $WH_4(1)$ and $WH_4(2)$ in a plurality of unused orthogonal codes. Further, since the relation between $WH_4(3)=[1, 1, -1, -1]$ and $WH_4(4)=[1, -1, -1, 1]$ is similar to the relation between $WH_4(1)$ and $WH_4(2)$, code generator 104 may, for example, select the codes for code multiplexing transmission or the unused orthogonal code so as not to include a set of $WH_4(3)$ and $WH_4(4)$ in a plurality of unused orthogonal codes.

Note that, when there are a plurality of unused orthogonal codes $UnCoden_{nuc}$, received power $DeMulUnCodeAll(f_{b\_cfar}, f_{s\_cfar}, DR)$ after code separation using all the unused orthogonal codes as given by following Expression 25 may be used instead of received power $DeMulUnCode_{nuc}(f_{b\_cfar}, f_{s\_cfar}, DR)$:

[34]

$$DeMulUnCodeAll(f_{b\_cfar}, f_{s\_cfar}, DR) = \quad \text{(Expression 25)}$$

$$\sum_{nuc=1}^{N_{allcode}-N_{CM}} DeMulUnCode_{nun}(f_{b\_cfar}, f_{s\_cfar}, DR).$$

Obtaining the received power after the code separation using all the unused orthogonal codes makes it possible for aliasing determiner 212 to increase the accuracy of the aliasing determination even when the reception signal level is low.

For example, aliasing determiner 212 calculates $DeMulUnCodeAll(f_{b\_cfar}, f_{s\_cfar}, DR)$ in each of the ranges of $DR$=ceil[−Loc/2], ceil[−Loc/2]+1, . . . , 0, . . . , ceil[Loc/2]−1, and detects the DR (in other words, $DR_{min}$) in which received power $DeMulUnCodeAll(f_{b\_cfar}, f_{s\_cfar}, DR)$ is minimum. When Expression 25 is used, the DR which provides the minimum received power in the DR range is represented as "$DR_{min}$" as given by following Expression 26:

[35]

$$DR_{min} = \quad \text{(Expression 26)}$$

$$\left\{ \arg DR \mid \min_{DR=} DeMulUnCodeAll(f_{b\_cfar}, f_{s\_cfar}, DR) \right\}.$$

Further, for example, aliasing determiner 212 may perform processing of comparing minimum received power $DeMulUnCode_{nuc}(f_{b\_cfar}, f_{s\_cfar}, DR_{min})$ after code separation using unused orthogonal code $UnCoden_n e$ with received power, and determining (in other words, measuring) the certainty of the aliasing determination. In this case, aliasing determiner 212 may determine the certainty of the aliasing determination in accordance with following Expressions 27 and 28, for example:

[36]

$$DeMulUnCod\ e_{nuc}(f_{b\_cfar}, f_{s\_cfar}, DR_{min}) < \text{Threshold}_{DR} \times PowerFT(f_{b\_cfar}, f_{s\_cfar}) \quad \text{(Expression 27);}$$

[37]

$$DeMulUnCod\ e_{nuc}(f_{b\_cfar}, f_{s\_cfar}, DR_{min}) \geq \text{Threshold}_{DR} \times PowerFT(f_{b\_cfar}, f_{s\_cfar}) \quad \text{(Expression 28).}$$

For example, when minimum received power DeMulUnCode$_{nuc}$(f$_{b\_cfar}$, f$_{s\_cfar}$, DR$_{min}$) after code separation using unused orthogonal code UnCoden$_{nuc}$ is smaller (e.g., Expression 27) than a value obtained by multiplying, by predetermined value Threshold$_{DR}$, received power value PowerFT(f$_{b\_cfar}$, f$_{s\_cfar}$) corresponding to distance index f$_{b\_cfar}$ and Doppler frequency index f$_{s\_cfar}$ extracted in CFAR section 211, aliasing determiner 212 determines that the aliasing determination is sufficiently certain. In this case, radar apparatus 10 may perform, for example, subsequent processing (e.g., code separation processing).

Meanwhile, for example, aliasing determiner 212 determines that the accuracy of the aliasing determination is not sufficient (for example, determines the component as a noise component) when minimum received power DeMulUnCode$_{nuc}$(f$_{b\_cfar}$, f$_{s\_cfar}$, DR$_{min}$) after code separation using unused orthogonal code UnCoden$_{nuc}$ is equal to or greater than the value obtained by multiplying received power value PowerFT(f$_{b\_cfar}$, f$_{s\_cfar}$) by Threshold$_{DR}$ (for example, Expression 28). In this case, for example, radar apparatus 10 may not perform subsequent processing (e.g., code separation processing).

Such processing makes it possible for aliasing determiner 212 to reduce a determination error in aliasing determination and to remove a noise component. Note that, predetermined value Threshold$_{DR}$ may, for example, be set within a range of from 0 to less than 1. By way of example, considering inclusion of a noise component, Threshold$_{DR}$ may be set in a range of approximately from 0.1 to 0.5.

Note that, when there are a plurality of unused orthogonal codes UnCode$_{nuc}$, aliasing determiner 212 may perform processing of comparing between DeMulUnCodeAll(f$_{b\_cfar}$, f$_{s\_cfar}$, DR) instead of received power DeMulUnCode$_{nuc}$ (f$_{b\_cfar}$, f$_{s\_cfar}$, DR) and received power, and determining (in other words, measuring) the certainty of the aliasing determination. In this case, aliasing determiner 212 may, for example, determine the certainty of the aliasing determination using DeMulUnCodeAll(f$_{b\_cfar}$, f$_{s\_cfar}$, DR) instead of DeMulUnCode$_{nuc}$(f$_b$_car, f$_{s\_cfar}$, DR) in Expressions 27 and 28. Obtaining the received power after code separation using all the unused orthogonal codes makes it possible for aliasing determiner 212 to increase the accuracy of how certain the aliasing determination is, even when the reception signal level is low.

Note that the calculation formula for received power DeMulUnCode$_{nuc}$(f$_{b\_cfar}$, f$_{s\_cfar}$, DR) after code separation using unused orthogonal code UnCoden$_{ne}$ may be following Expression 29 instead of Expression 12, for example:

[38]

$$DeMulUnCode_{nuc}(f_{b\_cfar}, f_{s\_cfar}, DR) = \sum_{z=1}^{Na} \left| (\beta(DR) \otimes UnCode_{nuc})^* \cdot \{\alpha(f_{s\_cfar}) \otimes VFTALL_z(f_{b\_cfar}, f_{s\_cfar})\}^T \right|^2 \quad \text{(Expression 29)}$$

In Expression 29, the term

[39]

$$\beta(DR) \otimes UnCode_{nuc} \quad [39]$$

does not depend on index (Doppler frequency index) f$_s$ of a Doppler component, and it is thus possible to reduce the arithmetic amount in aliasing determiner 212, for example, by pre-tabulation.

The operation example of aliasing determiner 212 has been described above.

Next, an operation example of code demultiplexer 213 will be described.

Code demultiplexer 213 performs separation processing of a code multiplexed signal based on the aliasing determination result in aliasing determiner 212 and the codes for code multiplexing transmission.

For example, as given by following Expression 30, code demultiplexer 213 performs, based on aliasing phase correction vector β(DR$_{min}$) using DR$_{min}$ that is the aliasing determination result in aliasing determiner 212, code separation processing on Doppler components VFTALL$_z$(f$_{b\_cfar}$, f$_{s\_cfar}$) that are the outputs of Doppler analyzers 210 corresponding to distance indexes f$_{b\_cfar}$ and Doppler frequency indexes f$_{s\_cfar}$ extracted by CFAR section 211:

[40]

$$DeMUL_z^{ncm}(f_{b\_cfar}, f_{s\_cfar}) =$$

$$(Code_{ncm})^* \cdot \{\beta(DR_{min}) \otimes \alpha(f_{s\_cfar}) \otimes VFTALL_z(f_{b\_cfar}, f_{s\_cfar})\}^T \quad \text{(Expression 30)}.$$

Since aliasing determiner 212 can determine an index that is a true Doppler aliasing range within the Doppler range of from −1/(2Tr) to less than 1/(2Tr) (in other words, can determine the index such that DR$_{min}$=DR$_{true}$), code demultiplexer 213 can set the correlation value between the orthogonal codes used for code multiplexing to zero in the Doppler range of from −1/(2Tr) to less than 1/(2Tr), thereby enabling the separation processing in which the interference between the code multiplexed signals is suppressed.

Here, DeMul$_z^{ncm}$(f$_{b\_cfar}$, f$_{s\_cfar}$) is an output (e.g., code separation result) resulting from code separation of a code multiplexed signal using orthogonal code Code$_{ncm}$ corresponding to the output of distance index f$_{b\_cfar}$ and Doppler frequency index f$_{s\_cfar}$ of Doppler analyzer 210 in zth antenna system processor 201. Note that, z=1, . . . , Na, and ncm=1, . . . , N$_{CM}$.

Note that, code demultiplexer 213 may use following Expression 31 instead of Expression 30:

[41]

$$DeMUL_z^{ncm}(f_{b\_cfar}, f_{s\_cfar}) = (\beta(DR_{min}) \otimes Code_{ncm})^* \cdot \{\alpha(f_{s\_cfar}) \otimes VFTALL_z(f_{b\_cfar}, f_{s\_cfar})\}^T \quad \text{(Expression 31)}.$$

In Expression 31, the term

[42]

$$\beta(DR) \otimes Code_{ncm} \quad [42]$$

(where, DR=DR$_{min}$ in Expression 31) does not depend on index (e.g., Doppler frequency index) f$_s$ of the Doppler component, and it is thus possible to reduce the arithmetic amount in code demultiplexer 213, for example, by pre-tabulation.

Through the code separation processing as described above, radar apparatus 10 can obtain a signal resulting from separation of a signal code-multiplexed and transmitted using orthogonal code Code$_{ncm}$ applied to ncmth transmit antenna Tx #ncm based on the aliasing determination result of aliasing determiner 212 assuming a Doppler range of ±1/(2×Tr) that is Loc times greater than Doppler range ±1/(2Loc×Tr) in which the aliasing is not caused in Doppler analyzer 210.

In addition, radar apparatus 10 performs, on the output of Doppler analyzer 210 for each code element, Doppler phase correction (for example, processing based on aliasing phase correction vector $\beta(DR_{min})$) considering Doppler aliasing, for example, during code separation processing. Mutual interference between code multiplexed signals can thus be reduced, for example, as low as a noise level. In other words, radar apparatus 10 can reduce inter-code interference and suppress the effect on degradation of the detection performance of radar apparatus 10.

Figure 4:
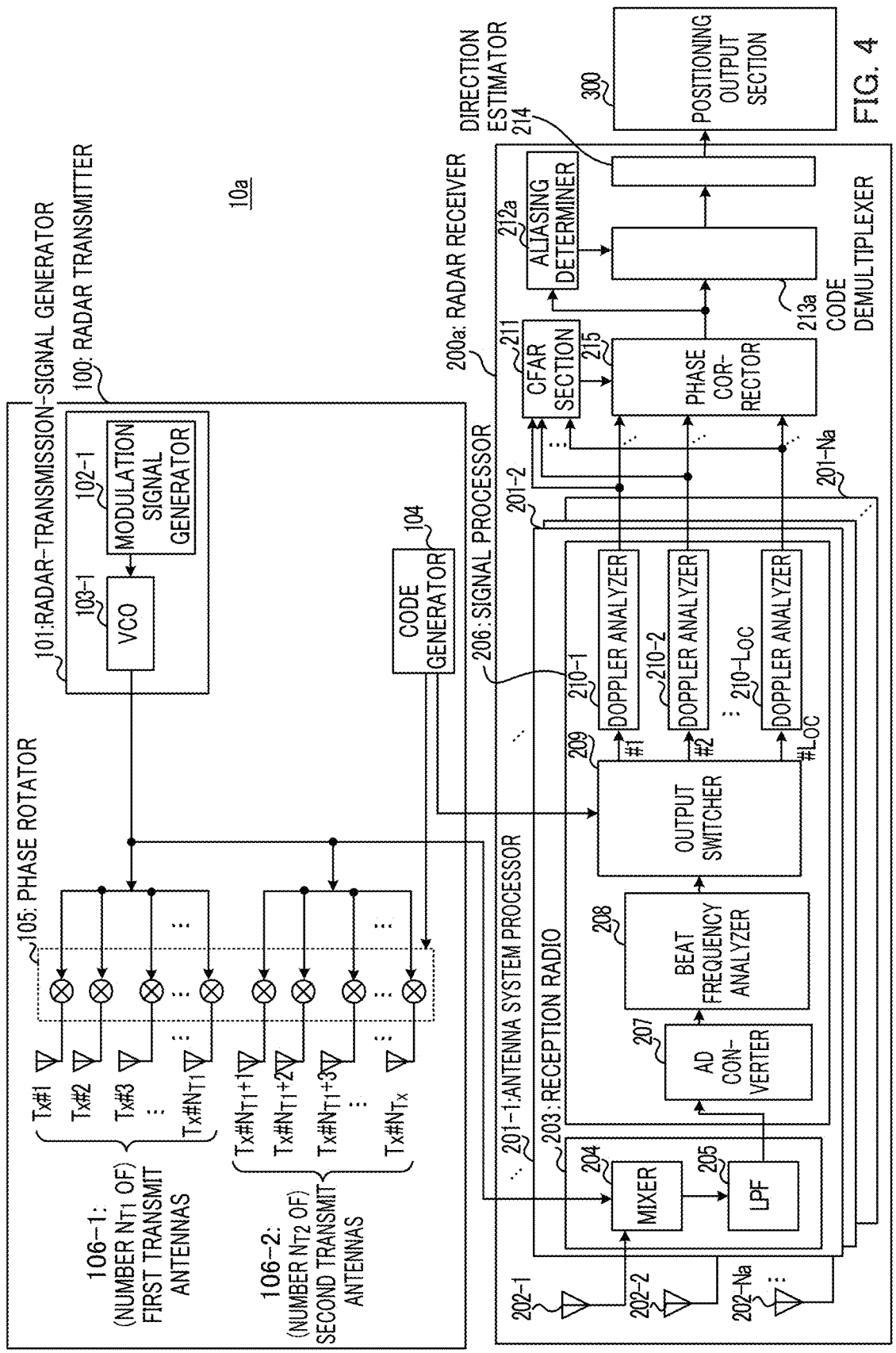
FIG. 4 is a block diagram illustrating another example of the configuration of the radar apparatus.

FIG. 4 illustrates another exemplary configuration of radar apparatus 10. In the configuration of radar apparatus 10 illustrated in FIG. 1, the term

[43]

$$\alpha(f_{s\_cfar}) \otimes VFTALL_z(f_{b\_cfar}, f_{s\_cfar}) \quad [43]$$

is commonly used in aliasing determiner 212 and code demultiplexer 213 as indicated in Expression 12, Expression 29, Expression 30, and Expression 31. Radar apparatus 10a illustrated in FIG. 4, for example, includes phase corrector 215 and may output, to aliasing determiner 212a and code demultiplexer 213a, output

[44]

$$\alpha(f_{s\_cfar}) \otimes VFTALL_z(f_{b\_cfar}, f_{s\_cfar}) \quad [44]$$

obtained by multiplying Doppler component $VFTALL_z$ ($f_{b\_cfar}$, $f_{s\_cfar}$) by Doppler phase correction vector $\alpha(f_{s\_cfar})$. Aliasing determiner 212a and code demultiplexer 213a may not calculate the term

[45]

$$\alpha(f_{s\_cfar}) \otimes VFTALL_z(f_{b\_cfar}, f_{s\_cfar}), \quad [45]$$

so that it is possible to reduce redundant arithmetic processing of the term in radar apparatus 10a.

The operation example of code demultiplexer 213 has been described above.

In FIG. 1, direction estimator 214 performs target direction estimation processing based on code separation result $DeMul_z^{ncm}(f_{b\_cfar}, f_{s\_cfar})$ inputted from code demultiplexer 213 with respect to the output of Doppler analyzer 210 corresponding to distance index $f_{b\_cfar}$ and Doppler frequency index $f_{s\_cfar}$.

For example, direction estimator 214 may perform direction estimation for the LR mode (hereinafter, also referred to as "LR-DOA") using reception signals $DeMul_z^{ncm}(f_{bLR}, f_{s\_cfar})$ corresponding to code multiplexed signals transmitted from first transmit antennas 106-1 (e.g., ncm=1, . . . , $N_{T1}$) for the LR mode.

In addition, direction estimator 214 may, for example, perform direction estimation processing for the SR mode (hereinafter, also referred to as "SR-DOA") using reception signals $DeMul_z^{ncm}(f_{b\_cfar}, f_{s\_cfar})$ corresponding to code multiplexed signals transmitted from second transmit antennas 106-2 (e.g., ncm=$N_{T1}$+1, . . . , $N_{Tx}$) for the SR mode.

Hereinafter, examples of LR-DOA and SR-DOA will be described.

<(1) Direction Estimation for LR Mode (LR-DOA)>

Direction estimator 214 may perform the direction estimation for the LR mode (LR-DOA) using, for example, reception signals $DeMul_z^{ncm}(f_{bLR}, f_{s\_cfar})$, which are code multiplexed signals transmitted from first transmit antennas 106-1 (e.g., ncm=1, . . . , $N_{T1}$) for the LR mode on which the code demultiplexing processing and the distance conversion are performed.

Further, for example, in the direction estimation for the LR mode (LR-DOA), direction estimator 214 may perform the direction estimation for the LR mode (LR-DOA) using a part or all of reception signals $DeMul_z^{ncm}(f_{b\_cfar}, f_{s\_cfar})$ obtained by performing code demultiplexing processing on code multiplexed signals transmitted from second transmit antennas 106-2 (e.g., ncm=$N_{T1}$+1, . . . , $N_{Tx}$) for the SR mode as signals resulting from beam synthesis by multiplication by a beam weight for directing in the direction of directivity of first transmit antennas 106-1 for the LR mode.

<(2) Direction Estimation for SR Mode (SR-DOA)>

Direction estimator 214 may perform the direction estimation for the SR mode (SR-DOA) using, for example, reception signals $DeMul_z^{ncm}(f_{b\_cfar}, f_{s\_cfar})$ obtained by code demultiplexing processing performed on code multiplexed signals transmitted from second transmit antennas 106-2 (e.g., ncm=$N_{T1}$+1, . . . , $N_{Tx}$) for the SR mode.

In addition, direction estimator 214 may perform the direction estimation processing for the SR mode (SR-DOA) on reception signals including reception signal $DeMul_z^{ncm}$ ($f_{b\_cfar}$, $f_{s\_cfar}$) obtained by the code separation processing performed on a code multiplex signal transmitted from first transmit antennas 106-1 for the LR mode (e.g., ncm=1, . . . , $N_{T1}$), for example, within a predetermined angular range centered on the direction of directivity of first transmit antennas 106-1 which are the transmit antennas for the LR mode.

As is understood, in the direction estimation processing for the LR mode (LR-DOA) and the direction estimation processing for the SR mode (SR-DOA), direction estimator 214 performs the direction estimation processing using the reception signals corresponding to the code multiplexed signals transmitted using first transmit antennas 106-1 and second transmit antennas 106-2, for example.

Radar apparatus 10 may employ an arrangement of transmit antennas 106 and receive antennas 202 that can suppress grating lobes or side lobes to increase angular resolution, for example, by increasing the array gain and increasing the aperture length by the virtual receive array.

Hereinafter, an example of the antenna arrangement of transmit antennas 106 and receive antennas 202, and an example of the direction estimation processing of direction estimator 214 in a case of application of each arrangement example will be described.

Note that in the description given with respect to the following arrangement examples, antenna elements of different types or different sizes (SR antennas and LR antennas) are used as transmit antennas 106, but the antenna elements are not limited thereto.

Further, in the following arrangement examples, the arrangement of the SR antennas and the LR antennas of transmit antennas 106 may be replaced with the arrangement of the SR antennas and the LR antennas of receive antennas 202, respectively, or the arrangement of receive antennas 202 may be replaced with the arrangement of transmit antennas 106 in radar apparatus 10. In radar apparatus 10, even when the antenna arrangement of transmit antennas 106 and the antenna arrangement of receive antennas 202 are replaced with each other, it is possible to obtain the same effects as the following arrangement examples.

Further, in radar apparatus 10, an arrangement in which the horizontal direction (e.g., corresponding to the first direction) and the vertical direction (e.g., corresponding to the second direction perpendicular to the first direction) in the following arrangement examples are replaced with each other may be employed. In the case of the antenna arrangement in which the horizontal direction and the vertical direction are replaced with each other, radar apparatus 10 can obtain an effect obtainable when the horizontal direction and the vertical direction are replaced with each other in the following arrangement examples.

Arrangement Example 1

Figure 5:
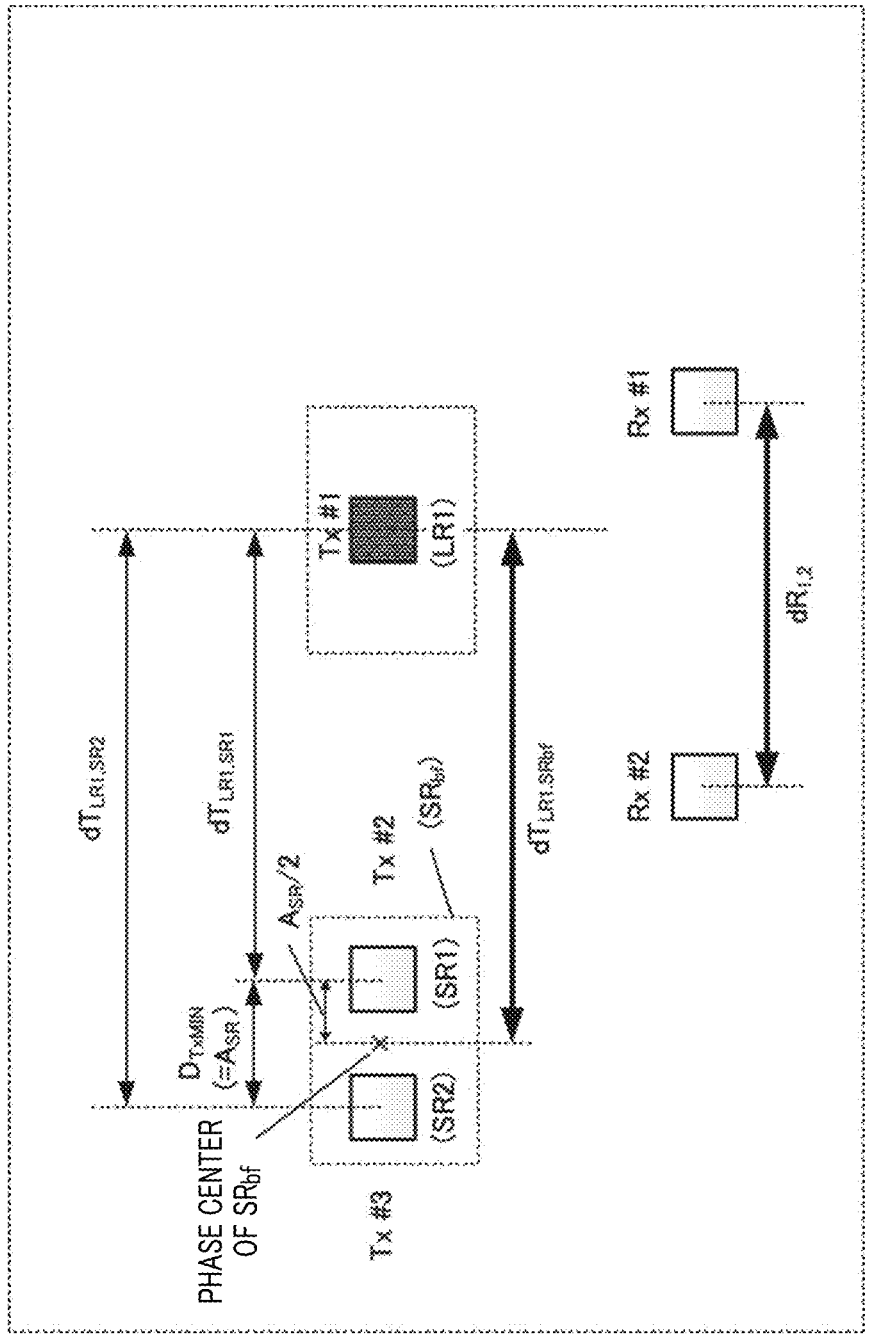
FIG. 5 illustrates an example of an antenna arrangement according to arrangement example 1.

FIG. 5 illustrates an arrangement example (for example, a MIMO antenna arrangement example) of transmit antennas 106 (referred to as Tx, for example) and receive antennas 202 (referred to as Rx, for example) according to arrangement example 1.

In the example illustrated in FIG. 5, number $N_{Tx}$ of transmit antennas is three (e.g., Tx #1, Tx #2, and Tx #3), and the number of receive antennas Na is two (e.g., Rx #1 and Rx #2).

In FIG. 5, the number of first transmit antennas 106-1 for the LR mode is $N_{T1}=1$, and the number of second transmit antennas 106-2 for the SR mode is $N_{T2}=2$. In FIG. 5, "LR1" denotes the LR antenna, "SR1" and "SR2" denote the SR antennas.

The MIMO antenna arrangement illustrated in FIG. 5 satisfies, for example, following (Condition 1).

(Condition 1)

In the direction estimation for the LR mode (LR-DOA), at least one absolute value of a difference between, on the one hand, spacing $dT_{LR1,SRbf}$ between the phase center of the SR antennas (e.g., the set of Tx #2 (SR1) and Tx #3 (SR2) in FIG. 5, which may be represented as "$SR_{bf}$" for example) used for beam synthesis and the LR antenna (e.g., Tx #1 (LR1) in FIG. 5) and, on the other hand, spacing $dR_{1,2}$ between receive antennas 202 (e.g., Rx #1 and Rx #2 in FIG. 5) is about DA=0.5λ to 0.8λ (in other words, a defined value based on the wavelength of a radar transmission signal). Antenna spacing "$D_{TxMIN}$" between the SR antennas used for beam synthesis may, for example, be about 0.5λ to 0.8λ. Note that λ represents the wavelength of the carrier frequency of the radar transmission signal. For example, when a chirp signal is used as the radar transmission signal, λ is the wavelength of the center frequency in the frequency sweep band of the chirp signal.

Here, the phase center of $SR_{bf}$ is, for example, a midpoint (a center point in the case of three or more antennas) between feeding points with respect to the SR antennas (Tx #2 (SR1) and Tx #3 (SR2) in FIG. 5) used for beam synthesis. For example, in FIG. 5, antenna spacing $D_{TxMIN}$ between Tx #2 (SR1) and Tx #3 (SR2) may be from 0.5λ to 0.8λ. Further, when there are three or more SR antennas, the minimum spacing among the antenna spacings may be $D_{TxMIN}$.

In addition, in FIG. 5, two SR antennas Tx #2 (SR1) and Tx #3 (SR2) are arranged at minimum transmit antenna spacing $D_{TxMIN}$ and with aperture length $A_{SR}=D_{TxMIN}$ between the SR antennas, but the present disclosure is not limited thereto, and when three SR antennas are arranged side by side at minimum transmit antenna spacings $D_{TxMIN}$, aperture length $A_{SR}$ between the SR antennas may be $2D_{TxMIN}$. For example, when $N_{SR}$ SR antennas (where $N_{SR}$ is 2 or more) are arranged side by side at minimum transmit antenna spacing $D_{TxMIN}$, aperture length $A_{SR}$ between the SR antennas may be $(N_{SR}-1)D_{TxMIN}$.

By way of example, a description will be given of a case where $dT_{LR1,SR1}=1.75\lambda$, $dT_{LR1,SR2}=2.25\lambda$, and $dR_{1,2}=3\lambda/2$ in FIG. 5. In this instance, the phase center with respect to Tx #2 (SR1) and Tx #3 (SR2) (e.g., the phase center of $SR_{bf}$) is the midpoint between Tx #2 (SR1) and Tx #3 (SR2), and accordingly, $dT_{LR1,SRbf}=2\lambda$. Thus, $|dT_{LR1,SRbf}-dR_{1,2}|=DA=\lambda/2$ (=0.5λ), and (Condition 1) is satisfied.

Here, the LR antenna may, for example, yield a higher gain by narrower antenna directivity than the directivity of the SR antennas. Therefore, for example, as illustrated in FIGS. 6A and 6B, width $W_{LR}$ of the LR antenna may be greater than width $W_{SR}$ of the SR antennas. For example, $W_{LR}\approx 2W_{SR}$ may hold true in FIGS. 6A and 6B. For example, the LR antenna and the SR antenna illustrated in FIGS. 6A and 6B may be applied to the antenna arrangement illustrated in FIG. 5. For example, the SR antenna of FIG. 6A is used for each of the two SR antennas in FIG. 5, and the LR antenna of FIG. 6B is used for one LR antenna of FIG. 5. It is thus possible for radar apparatus 10, for example, to synthesize transmission beams using two SR antennas (for example, Tx #2 (SR1) and Tx #3 (SR2)), so as to form the directivity the same between the LR antenna and the two SR antennas.

Likewise, radar apparatus 10 may perform transmission beam synthesis using three SR antennas, for example. In this instance, radar apparatus 10 can form the directivity the same between the LR antenna and the three SR antennas, for example, by using the LR antenna and the SR antennas for which $W_{LR}\approx 3W_{SR}$ holds true.

Likewise, radar apparatus 10 may, for example, perform transmission beam synthesis using Nsr SR antennas. In this instance, radar apparatus 10 can form the directivity the same between the LR antenna and the Nsr SR antennas, for example, by using the LR antenna and the SR antennas for which $W_{LR}\approx Nsr \times W_{SR}$ holds true.

Further, the arrangement of the transmit antennas constituting the transmit array antenna may be an arrangement in which the antennas do not overlap in the vertical direction, for example, as illustrated in FIG. 5. With this arrangement, the vertical size of the antennas constituting the transmit array antenna may be any size, for example. Similarly, the arrangement of the antennas constituting the receive array antenna may be, for example, an arrangement in which the antennas do not overlap in the vertical direction. With this arrangement, the vertical size of the antennas constituting the receive array antenna may be any size, for example. For example, considering that the LR antenna and the SR antennas are used in combination in SR-DOA and LR-DOA, height $H_{LR}$ of the LR antenna and height $H_{SR}$ of the SR antennas may be approximately the same as each other ($H_{LR}\approx H_{SR}$) in radar apparatus 10.

Figure 7A:
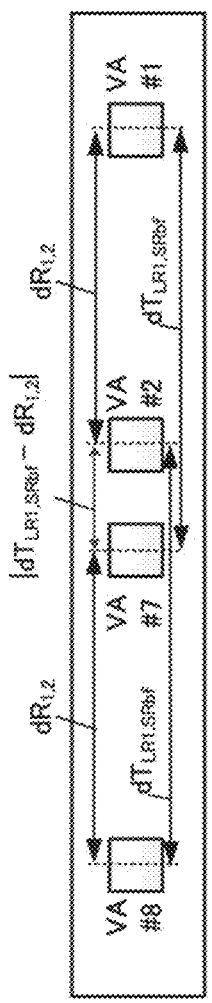
FIGS. 7A, 7B, and 7C illustrate examples of a virtual receive antenna arrangement according to arrangement example 1.
Figure 7B:
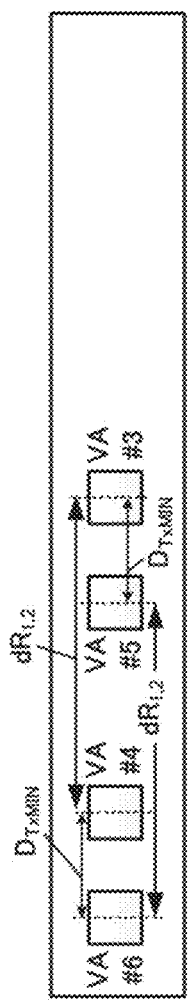
Figure 7C:
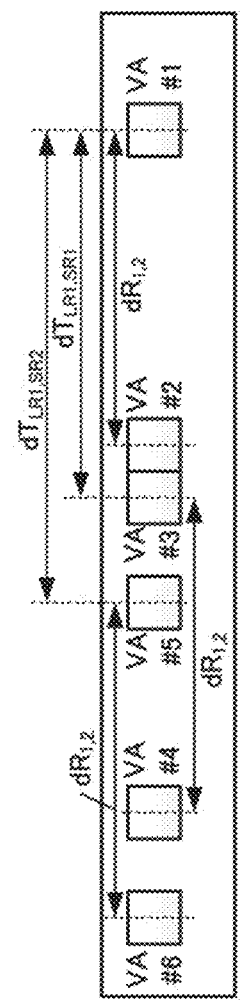

FIGS. 7A, 7B, and 7C illustrate arrangement examples of a virtual receive array obtained by the antenna arrangement illustrated in FIG. 5.

Here, the arrangement of the virtual receive array may be expressed by following Expression 32, for example, based on the positions of transmit antennas 106 constituting the transmit array antenna (e.g., the positions of the feeding points) and the positions of receive antennas 202 constituting the receive array antenna (e.g., the positions of the feeding points):

[46]

$$\begin{cases} X_{V\_\#k} = (X_{T\_\#[ceil(k/Na)]} - X_{T\_\#1}) + (X_{R\_\#[mod(k-1,Na)+1]} - X_{R\_\#1}) \\ Y_{V\_\#k} = (Y_{T\_\#[ceil(k/Na)]} - Y_{T\_\#1}) + (Y_{R\_\#[mod(k-1,Na)+1]} - Y_{R\_\#1}) \end{cases} \quad \text{(Expression 32)}$$

Here, the position coordinates of transmit antennas 106 (e.g., Tx #n) constituting the transmit array antenna are represented as $(X_{T\_\#n}, Y_{T\_\#n})$ (e.g., n=1, . . . , $N_{Tx}$), the position coordinates of receive antennas 202 (e.g., Rx #m) constituting the receive array antenna are represented as $(X_{R\_\#m}, Y_{R\_\#m})$ (e.g., m=1, . . . , Na), and the position coordinates of virtual antennas VA #k constituting a virtual receive array antenna are represented as $(X_{V\_\#k}, Y_{V\_\#k})$ (e.g., k=1, . . . , $N_{Tx}$×Na).

Note that, VA #1 is represented as the position reference (0, 0) of the virtual receive array, for example, in Expression 32.

Further, in arrangements of the virtual receive array obtainable by the antenna arrangement illustrated in FIG. 5, VA #7 and VA #8 indicate an arrangement of virtual receive antennas that is obtainable in a case where the SR antennas for beam synthesis (e.g., $SR_{bf}$) are regarded as new transmit antenna "Tx #4" and the phase center of the SR antenna group for beam synthesis (the phase center of $SR_{bf}$) is regarded as the position coordinates of antenna Tx #4 in Expression 32. In other words, VA #7 and VA #8 are configured based on Tx #4, Rx #1, and Rx #2.

(Arrangement of Virtual Receive Antennas Used for Direction Estimation for LR Mode (LR-DOA))

FIG. 7A illustrates an arrangement of the virtual receive antennas used for LR-DOA.

Virtual receive antennas used for LR-DOA are configured based on the SR antennas for beam synthesis (also referred to as "SR antenna group"), the LR antenna, and the receive antennas. For example, the virtual receive antennas (VA #1, VA #2, VA #7, and VA #8) illustrated in FIG. 7A are configured based on the SR antennas for beam synthesis (e.g., $SR_{bf}$ or Tx #4), the LR antenna (e.g., Tx #1), and two receive antennas Rx #1 and Rx #2 illustrated in FIG. 5.

For example, when aforementioned (Condition 1) is satisfied, the arrangement of the virtual receive antennas illustrated in FIG. 7A includes virtual receive antennas (VA #2 and VA #7 in FIG. 7A) the spacing between which is DA. For example, when DA=0.5λ in FIG. 5, the element spacing between VA #2 and VA #7 illustrated in FIG. 7A is $|dT_{LR1,SRbf} - dR_{1,2}| = DA = 0.5λ$.

For example, when "at least one absolute value of the difference between, on the one hand, spacing $dT_{LR1,SRbf}$ between the phase center of the SR antennas ($SR_{bf}$) for beam synthesis in LR-DOA and the LR antenna and, on the other hand, spacing dR between the receive antennas is DA=0.5λ," the virtual receive antenna arrangement (FIG. 7A) used for LR-DOA includes at least one element spacing of DA=0.5λ. Thus, for example, when the front direction of the virtual receive antennas (e.g., the broadside direction) is used as referential 0 degrees, radar apparatus 10 can suppress the generation of grating lobes in the range of ±90 degrees.

Further, for example, when "at least one absolute value of the difference between, on the one hand, spacing $dT_{LR1,SRbf}$ between the phase center of the SR antennas ($SR_{bf}$) for beam synthesis in LR-DOA and the LR antenna and, on the other hand, spacing dR between the receive antennas is DA=0.8λ," the virtual receive antenna arrangement (FIG. 7A) used for LR-DOA includes at least one element spacing of DA=0.8λ. Thus, for example, when the front direction of the virtual receive antennas (e.g., the broadside direction) is used as referential 0 degrees, radar apparatus 10 can suppress the generation of grating lobes in the range of ±10 degrees.

For example, LR-DOA may be expected to perform estimation within a long distance range with a narrower viewing angle than that in SR-DOA. Accordingly, in LR-DOA, for example, when (Condition 1) that "at least one absolute value of the difference between, on the one hand, the spacing between the phase center of the SR antennas ($SR_{bf}$) for beam synthesis and the LR antenna and, on the other hand, the spacing between the receive antennas is DA=0.5λ to 0.8λ" is satisfied, radar apparatus 10 can suppress the generation of grating lobes in the range of from ±10 degrees to ±90 degrees, for example. Further, for example, radar apparatus 10 can suppress generation of grating lobes within the viewing angle by setting DA based on the expected viewing angle in LR-DOA.

In addition, radar apparatus 10 transmits radar transmission signals using the LR antenna and a plurality of SR antennas (e.g., SR antennas for beam synthesis) in the LR mode (e.g., corresponding to the first mode). Thus, for example, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Therefore, in radar apparatus 10, the reception quality (e.g., Signal to Noise Ration: SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

FIG. 7B illustrates an arrangement of virtual receive antennas used for SR-DOA.

The virtual receive antennas used for SR-DOA are configured based on the SR antennas and the receive antennas, for example. In other words, the LR antenna may not be used for SR-DOA, for example. For example, the virtual receive antennas (VA #3 to VA #6) illustrated in FIG. 7B are configured based on SR antennas Tx #2 (SR1) and Tx #3 (SR2) and two receive antennas Rx #1 and Rx #2 illustrated in FIG. 5.

For example, when aforementioned (Condition 1) is satisfied, the arrangement of the virtual receive antennas illustrated in FIG. 7B includes virtual receive antennas (the set of VA #3 and VA #5 and the set of VA #4 and VA #6 in FIG. 7B) the spacing between which is $D_{TxMIN}$.

For example, when "transmit antenna spacing $D_{TxMIN}$ is set to 0.5λ," the virtual receive antenna arrangement (FIG. 7B) used for SR-DOA includes at least one element spacing of 0.5λ (=$D_{TxMIN}$). Thus, for example, when the front direction of the virtual receive antennas (e.g., the broadside direction) is used as referential 0 degrees, radar apparatus 10 can suppress the generation of grating lobes in the range of ±90 degrees.

In addition, for example, when "minimum transmit antenna spacing $D_{TxMIN}$ is set to 0.8λ," the virtual receive antenna arrangement (FIG. 7B) used for SR-DOA includes at least one element spacing of 0.8λ (=$D_{TxMIN}$). Thus, for example, when the front direction of the virtual receive antennas (e.g., the broadside direction) is used as referential 0 degrees, radar apparatus 10 can suppress the generation of grating lobes in the range of ±10 degrees.

Therefore, in SR-DOA, the generation of grating lobes can be suppressed in the range of from ±10 degrees to ±90 degrees by "setting transmit antenna spacing $D_{TxMIN}$ to about 0.5λ to 0.8λ," for example. Further, for example, radar apparatus 10 can suppress the generation of grating lobes within the viewing angle by setting transmit antenna spacing $D_{TxMIN}$ based on the viewing angle expected in SR-DOA.

(Arrangement of Virtual Receive Antennas Used in SR-DOA within Viewing Angle in LR Mode)

FIG. 7C illustrates an arrangement of virtual receive antennas used for SR-DOA within the viewing angle (FOV) in the LR mode.

In SR-DOA, within the viewing angle in the LR mode, the virtual receive antennas may be configured, for example, based on the transmit antennas including the SR antennas and, additionally, the LR antenna. For example, the virtual receive antennas (VA #1 to VA #6) illustrated in FIG. 7C are configured based on SR antennas Tx #2 (SR1) and Tx #3 (SR2), LR antenna Tx #1 (LR1), and two receive antennas Rx #1 and Rx #2 illustrated in FIG. 5.

Thus, in the SR mode (e.g., corresponding to the second mode), radar apparatus 10 transmits the radar transmission signals using the LR antenna and a plurality of SR antennas within the viewing angle in the LR mode. Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 1, radar apparatus 10 satisfies above-mentioned (Condition 1), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Arrangement Example 2

Figure 8:
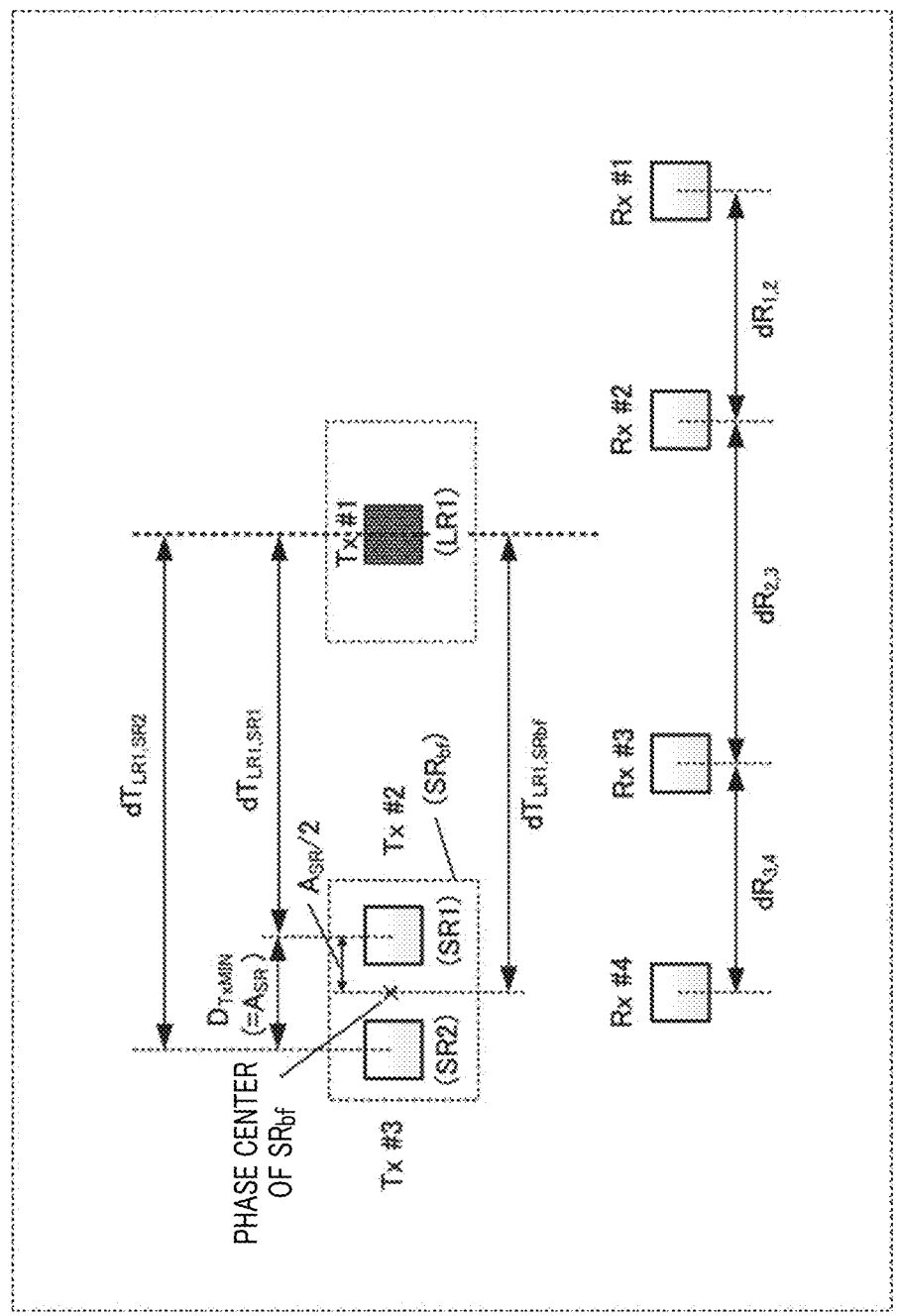
FIG. 8 illustrates an example of an antenna arrangement according to arrangement example 2.

FIG. 8 illustrates an arrangement example (for example, a MIMO antenna arrangement example) of transmit antennas 106 (referred to as Tx, for example) and receive antennas 202 (referred to as Rx, for example) according to arrangement example 2.

In the example illustrated in FIG. 8, number $N_{Tx}$ of transmit antennas is three (e.g., Tx #1, Tx #2, and Tx #3), and the number of receive antennas Na is four (e.g., Rx #1, Rx #2, Rx #3, and Rx #4).

In FIG. 8, the number of first transmit antennas 106-1 for the LR mode is $N_{T1}=1$, and the number of second transmit antennas 106-2 for the SR mode is $N_{T2}=2$. In FIG. 8, "LR1" denotes the LR antenna, "SR1" and "SR2" denote the SR antennas.

The MIMO antenna arrangement illustrated in FIG. 8 satisfies, for example, following (Condition 1) and (Condition 2).

(Condition 1)

In the direction estimation for the LR mode (LR-DOA), at least one absolute value of a difference between, on the one hand, spacing $dT_{LR1,SRbf}$ between the phase center of SR antennas $SR_{bf}$ (e.g., the set of Tx #2 (SR1) and Tx #3 (SR2) in FIG. 8) used for beam synthesis and an LR antenna (e.g., Tx #1 (LR1) in FIG. 8) and, on the other hand, spacing $dR_{1,2}$ between receive antennas 202 (e.g., Rx #1 and Rx #2 in FIG. 8) is about DA=0.5λ to 0.8λ). Antenna spacing $D_{TxMIN}$ between the SR antennas used for beam synthesis may, for example, be about 0.5λ to 0.8λ.

(Condition 2)

The element spacings between a plurality of receive antennas Rx (in other words, the spacings between adjacent receive antennas Rx; e.g., $dR_{1,2}$, $dR_{2,3}$, and $dR_{3,4}$ in FIG. 8) are greater than aperture length $A_{SR}$ between those of the plurality of SR antennas which are arranged side by side at minimum transmit antenna spacing $D_{TxMIN}$. Here, minimum spacing $D_{TxMIN}$ among the spacings between the transmit antennas may, for example, be about 0.5λ to 0.8λ.

By way of example, a description will be given of a case where $dT_{LR1,SR1}=1.75λ$, $dT_{LR1,SR2}=2.25λ$, $dR_{1,2}=λ$, $dR_{2,3}=3λ/2$, and $dR_{3,4}=λ$ in FIG. 8. In this instance, since the phase center of Tx #2 (SR1) and Tx #3 (SR2) (e.g., the phase center of $SR_{bf}$) is the midpoint between Tx #2 (SR1) and Tx #3 (SR2), $dT_{LR1,SRbf}=2λ$. Accordingly, $|dT_{LR1,SRbf}-dR_{1,2}|=λ$, $|dT_{LR1,SRbf}-dR_{2,3}|=λ/2$ (=0.5λ), and $|dT_{LR1,SRbf}-dR_{3,4}|=λ$ hold true, and (Condition 1) in the case of DA=λ/2 is satisfied for $dT_{LR1,SRbf}$ and $dR_{2,3}$, for example.

Further, in the above example, aperture length $A_{SR}$ between the SR antennas=$|dT_{LR1,SR2}-dT_{LR1,SR1}|=λ/2$ in FIG. 8. Therefore, all of $dR_{1,2}=λ$, $dR_{2,3}=3λ/2$, and $dR_{3,4}=λ$ are wider than aperture length $A_{SR}$ between the SR antennas ($dR_{1,2}$, $dR_{2,3}$, $dR_{3,4}>A_{SR}$) and satisfy (Condition 2).

Note that, although the arrangement of two SR antennas Tx #2 (SR1) and Tx #3 (SR2) has been described with reference to FIG. 8, the arrangement is not limited to this, and three or more SR antennas may be arranged. In addition, in FIG. 8, two SR antennas Tx #2 (SR1) and Tx #3 (SR2) are arranged at minimum transmit antenna spacing $D_{TxMIN}$ and with aperture length $A_{SR}=D_{TxMIN}$ between the SR antennas, but the present disclosure is not limited thereto, and when three SR antennas are arranged side by side at minimum transmit antenna spacings $D_{TxMIN}$, aperture length $A_{SR}$ between the SR antennas may be $2D_{TxMIN}$. For example, when $N_{SR}$ SR antennas (where $N_{SR}$ is 2 or more) are arranged side by side at minimum transmit antenna spacing $D_{TxMIN}$, aperture length $A_{SR}$ between the SR antennas may be $(N_{SR}-1)D_{TxMIN}$.

FIGS. 9A, 9B, and 9C illustrate arrangement examples of a virtual receive array obtained by the antenna arrangement illustrated in FIG. 8.

Here, the arrangement of the virtual receive array may be expressed by Expression 32, for example, based on the positions of transmit antennas 106 constituting the transmit array antenna (e.g., the positions of the feeding points) and the positions of receive antennas 202 constituting the receive array antenna (e.g., the positions of the feeding points).

Further, in arrangements of the virtual receive array obtainable by the antenna arrangement illustrated in FIG. 8, VA #13 to VA #16 indicate an arrangement of virtual receive antennas that is obtainable in a case where the SR antennas for beam synthesis (e.g., $SR_{bf}$) are regarded as new transmit antenna "Tx #4" and the phase center of the SR antenna group for beam synthesis (the phase center of $SR_{bf}$) is regarded as the position coordinates of antenna Tx #4 in Expression 32. In other words, VA #13 to VA #16 are configured based on Tx #4 and Rx #1 to Rx #4.

(Arrangement of Virtual Receive Antennas Used for Direction Estimation for LR Mode (LR-DOA))

FIG. 9A illustrates an arrangement of the virtual receive antennas used for LR-DOA.

Virtual receive antennas used for LR-DOA are configured based on the SR antennas for beam synthesis, the LR antenna, and the receive antennas. For example, the virtual receive antennas (VA #1 to VA #4 and VA #13 to VA #16) illustrated in FIG. 9A are configured based on the SR antennas for beam synthesis (e.g., $SR_{bf}$ or Tx #4), the LR antenna (e.g., Tx #1), and four receive antennas Rx #1 to Rx #4 illustrated in FIG. 8.

For example, when aforementioned (Condition 1) is satisfied, the arrangement of the virtual receive antennas illustrated in FIG. 9A includes virtual receive antennas (VA #3 and VA #14 in FIG. 9A) the spacing between which is DA. For example, when DA=0.5λ in FIG. 8, the element spacing between VA #3 and VA #14 illustrated in FIG. 9A is $|dT_{LR1,SRbf} - dR_{2,3}| = DA = 0.5\lambda$.

For example, when "at least one absolute value of the difference between, on the one hand, spacing $dT_{LR1,SRbf}$ between the phase center of the SR antenna group ($SR_{bf}$) for beam synthesis in LR-DOA and the LR antenna and, on the other hand, spacing dR between the receive antennas is DA=0.5λ," the virtual receive antenna arrangement (FIG. 9A) used for LR-DOA includes at least one element spacing of DA=0.5λ. Thus, for example, when the front direction of the virtual receive antennas (e.g., the broadside direction) is used as referential 0 degrees, radar apparatus 10 can suppress the generation of grating lobes in the range of ±90 degrees.

Further, for example, when "at least one absolute value of the difference between, on the one hand, spacing $dT_{LR1,SRbf}$ between the phase center of the SR antenna group ($SR_{bf}$) for beam synthesis in LR-DOA and the LR antenna and, on the other hand, spacing dR between the receive antennas is DA=0.8λ," the virtual receive antenna arrangement (FIG. 9A) used for LR-DOA includes at least one element spacing of DA=0.8λ. Thus, for example, when the front direction of the virtual receive antennas (e.g., the broadside direction) is used as referential 0 degrees, radar apparatus 10 can suppress the generation of grating lobes in the viewing angle range of ±10 degrees.

For example, LR-DOA may be expected to perform estimation within a long distance range with a narrower viewing angle than that in SR-DOA. Accordingly, in LR-DOA, for example, when (Condition 1) that "at least one absolute value of the difference between, on the one hand, the spacing between the phase center of the SR antennas ($SR_{bf}$) for beam synthesis and the LR antenna and, on the other hand, the spacing between the receive antennas is DA=0.5λ to 0.8λ," is satisfied, radar apparatus 10 can suppress the generation of grating lobes in the range of from ±10 degrees to ±90 degrees, for example. Further, for example, radar apparatus 10 can suppress generation of grating lobes within the viewing angle by setting DA based on the expected viewing angle in LR-DOA.

Further, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Radar apparatus 10 can thus improve the reception quality (e.g., SNR) during the direction estimation to increase the detection distance, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

FIG. 9B illustrates an arrangement of virtual receive antennas used for SR-DOA.

The virtual receive antennas used for SR-DOA are configured based on a plurality of SR antennas and the receive antennas, for example. For example, the virtual receive antennas (VA #5 to VA #12) illustrated in FIG. 9B are configured based on SR antennas Tx #2 (SR1) and Tx #3 (SR2) and four receive antennas Rx #1 to Rx #4 illustrated in FIG. 8.

For example, when aforementioned (Condition 2) is satisfied, the arrangement of the virtual receive antennas illustrated in FIG. 9B includes virtual receive antennas (e.g., VA #5 and VA #9, VA #6 and VA #10, VA #7 and VA #11, and VA #8 and VA #12 illustrated in FIG. 9B) the spacings between which are $D_{TxMIN}$. In addition, in radar apparatus 10, when (Condition 2) is satisfied, there is no overlap between the virtual receive antennas in the virtual receive antenna arrangement for the SR mode as illustrated in FIG. 9B and the aperture length in the virtual receive array can thus be extended.

For example, when "the element spacing between receive antennas Rx is wider than aperture length $A_{SR}$ of the antenna group whose antennas are arranged at transmit antenna spacing $D_{TxMIN}$, where transmit antenna spacing $D_{TxMIN}$ is 0.5λ," the virtual receive antenna arrangement (FIG. 9B) used for SR-DOA includes at least one element spacing of 0.5λ (=$D_{TxMIN}$). Thus, for example, when the front direction of the virtual receive antennas (e.g., the broadside direction) is used as referential 0 degrees, radar apparatus 10 can suppress the generation of grating lobes in the range of ±90 degrees. Further, since the virtual receive antennas are arranged without overlap in the virtual receive antenna arrangement for SR mode, it is possible to expand the aperture length in the virtual receive array and to improve the angular resolution in radar apparatus 10.

In addition, for example, when "the element spacing between receive antennas Rx is wider than aperture length $A_{SR}$ of the antenna group whose antennas are arranged at transmit antenna spacing $D_{TxMIN}$, where transmit antenna spacing $D_{TxMIN}$ is 0.8λ," the virtual receive antenna arrangement (FIG. 9B) used for SR-DOA includes at least one element spacing of 0.8λ (=$D_{TxMIN}$). Thus, for example, when the front direction of the virtual receive antennas (e.g., the broadside direction) is used as referential 0 degrees, radar apparatus 10 can suppress the generation of grating lobes in the range of ±10 degrees. Further, since the virtual receive antennas are arranged without overlap in the virtual receive antenna arrangement for SR mode, it is possible to expand the aperture length in the virtual receive array and to improve the angular resolution in radar apparatus 10.

Therefore, in SR-DOA, when (Condition 2) that "the element spacing between receive antennas Rx is wider than aperture length $A_{SR}$ of the antenna group whose antennas are arranged at transmit antenna spacing $D_{TxMIN}$, where transmit antenna spacing $D_{TxMIN}$ is 0.5λ to 0.8λ" is satisfied, radar apparatus 10 can suppress the generation of grating lobes, for example, in the range of ±10 degrees to ±90 degrees. Further, since the virtual receive antennas are arranged without overlap in the virtual receive antenna arrangement for SR mode, it is possible to expand the aperture length in the virtual receive array and to improve the angular resolution in radar apparatus 10.

(Arrangement of Virtual Receive Antennas Used in SR-DOA within Viewing Angle in LR Mode)

FIG. 9C illustrates an arrangement of virtual receive antennas used for SR-DOA within the viewing angle (FOV) in the LR mode.

In SR-DOA, within the viewing angle in the LR mode, the virtual receive antennas may be configured, for example, based on the transmit antennas including the SR antennas and, additionally, the LR antenna. For example, the virtual receive antennas (VA #1 to VA #12) illustrated in FIG. 9C are configured based on SR antennas Tx #2 (SR1) and Tx #3 (SR2), LR antenna Tx #1 (LR1), and four receive antennas Rx #1 to Rx #4 illustrated in FIG. 8.

Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 2, radar apparatus 10 satisfies aforementioned (Condition 1) and (Condition 2), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Arrangement example 1 and arrangement example 2 have been described above.

Next, an example of the direction estimation processing of direction estimator 214 performed when the antenna arrangement described above is applied will be described.

For example, direction estimator 214 performs the direction estimation processing by generating virtual receive array correlation vector $h_{LR}(f_{bLR}, f_{s\_cfar})$ for first transmit antennas 106-1 for the LR mode as given by Expression 33 using reception signals $\text{DeMul}_z^{nuc}(f_{b\_cfar}, f_{s\_cfar})$ that are code multiplexed signals transmitted from first transmit antennas 106-1 (e.g., ncm=1, ..., $N_{T1}$) for the LR mode, on which code separation processing is performed.

Virtual receive array correlation vector $h_{LR}(f_{bLR}, f_{s\_cfar})$ includes $N_{T1} \times Na$ elements, the number of which is equal to the product of number $N_{T1}$ of transmit antennas and number Na of receive antennas. Virtual receive array correlation vector $h_{LR}(f_{bLR}, f_{s\_cfar})$ is used in processing for performing, on reflected wave signals from a target, direction estimation based on a phase difference among receive antennas 202. Here, z=1, ..., Na. When the MIMO antenna arrangement of arrangement example 1, for example, of FIG. 5 is used, $N_{T1}=1$ and Na=2, and virtual receive array correlation vector $h_{LR}(f_{bLR}, f_{s\_cfar})$ thus includes two elements, which correspond respectively to reception signals at VA #1 and VA #2 in the virtual receive antenna arrangement illustrated in FIG. 7.

[47]

$$h_{LR}(f_{bLR}, f_{s\_cfar}) = \begin{bmatrix} DeMUL_1^1(f_{bLR}, f_{s\_cfar}) \\ DeMUL_2^1(f_{bLR}, f_{s\_cfar}) \\ \vdots \\ DeMUL_{Na}^1(f_{bLR}, f_{s\_cfar}) \\ DeMUL_1^2(f_{bLR}, f_{s\_cfar}) \\ DeMUL_2^2(f_{bLR}, f_{s\_cfar}) \\ \vdots \\ DeMUL_{Na}^2(f_{bLR}, f_{s\_cfar}) \\ \vdots \\ DeMUL_1^{N_{T1}}(f_{bLR}, f_{s\_cfar}) \\ DeMUL_2^{N_{T1}}(f_{bLR}, f_{s\_cfar}) \\ \vdots \\ DeMUL_{Na}^{N_{T1}}(f_{bLR}, f_{s\_cfar}) \end{bmatrix} \quad \text{(Expression 33)}$$

In addition, for example, direction estimator 214 performs the direction estimation processing by generating virtual receive array correlation vector $h_{SR}(f_{bLR}, f_{s\_cfar})$ for second transmit antennas 106-2 for the SR mode as given by Expression 34 using reception signals $\text{DeMul}_z^{nuc}(f_{b\_cfar}, f_{s\_cfar})$ that are code multiplexed signals transmitted from second transmit antennas 106-2 (e.g., ncm=$N_{T1}+1, \ldots, N_{Tx}$) for the SR mode, on which code separation processing is performed.

Virtual receive array correlation vector $h_{SR}(f_{bLR}, f_{s\_cfar})$ includes $N_{T2} \times Na$ elements, the number of which is equal to the product of number $N_{T2}$ of transmit antennas and number Na of receive antennas. Virtual receive array correlation vector $h_{SR}(f_{bLR}, f_{s\_cfar})$ is used in processing for performing, on reflected wave signals from a target, direction estimation based on a phase difference among receive antennas 202. Here, z=1, ..., Na. When the MIMO antenna arrangement of arrangement example 1, for example, of FIG. 5 is used, $N_{T2}=2$ and Na=2, and virtual receive array correlation vector $h_{SR}(f_bLR, f_{s\_cfar})$ thus includes four elements, which correspond respectively to reception signals at VA #3, VA #4, VA #5, and VA #6 in the virtual receive antenna arrangement illustrated in FIG. 7.

[48]
$$h_{SR}(f_{b\_cfar}, f_{s\_cfar}) = \begin{bmatrix} DeMUL_1^{N_{T1}+1}(f_{b\_cfar}, f_{s\_cfar}) \\ DeMUL_2^{N_{T1}+1}(f_{b\_cfar}, f_{s\_cfar}) \\ \vdots \\ DeMUL_{Na}^{N_{T1}+1}(f_{b\_cfar}, f_{s\_cfar}) \\ DeMUL_1^{N_{T1}+2}(f_{b\_cfar}, f_{s\_cfar}) \\ DeMUL_2^{N_{T1}+2}(f_{b\_cfar}, f_{s\_cfar}) \\ \vdots \\ DeMUL_{Na}^{N_{T1}+2}(f_{b\_cfar}, f_{s\_cfar}) \\ \vdots \\ DeMUL_1^{N_{Tx}}(f_{b\_cfar}, f_{s\_cfar}) \\ DeMUL_2^{N_{Tx}}(f_{b\_cfar}, f_{s\_cfar}) \\ \vdots \\ DeMUL_{Na}^{N_{Tx}}(f_{b\_cfar}, f_{s\_cfar}) \end{bmatrix}$$

(Expression 34)

<(1) Direction Estimation for LR Mode (LR-DOA)>

For example, direction estimator 214 may calculate a spatial profile, with azimuth direction $\theta_u$ in direction estimation evaluation function value $P_{LR}(\theta_u, \theta_{BF}, f_{b\_cfar}, f_{s\_cfar})$ for the LR mode being variable within a defined viewing angle for the LR mode. Direction estimator 214 extracts a predetermined number of local maximum peaks in the calculated spatial profile in order from the largest, for example, and outputs the elevation angle directions of the local maximum peaks as direction-of-arrival estimation values (e.g., positioning outputs). For example, in direction estimation evaluation function value $P_{LR}(\theta_u, \theta_{BF}, f_{b\_cfar}, f_{s\_cfar})$ for the LR mode, the SR antenna forms directivity in directivity direction $\theta_{BF}$ the same as the LR antenna, and azimuth direction $\theta_u$ of receive antennas 202 may be set variably within a predetermined viewing angle for the LR mode.

There are various methods for direction estimation evaluation function value $P_{LR}(\theta_u, \theta_{BF}, \theta f_{b\_cfar}, f_{s\_cfar})$ for the LR mode depending on direction-of-arrival estimation algorithms. For example, an estimation method using an array antenna disclosed in NPL 6 may be used.

For example, a beamformer method can be expressed by following Expressions 35, 36, and 37:

[49]
$$P_{LR}(\theta_u, \theta_{BF}, f_{b\_cfar}, f_{s\_cfar}) = \\ |(a_{Tx}(\theta_u, \theta_{BF}) \otimes a_{Rx}(\theta_u))^H D_{cal} h_{all}(f_{b\_cfar}, f_{s\_cfar})|^2;$$
(Expression 35)

[50]
$$a_{Tx}(\theta_u, \theta_{BF}) = \begin{bmatrix} a_{TxLR}(\theta_u) \\ a_{TxSR}(\theta_{BF}) \end{bmatrix};$$
(Expression 36)

[51]
$$h_{all}(f_{b\_cfar}, f_{s\_cfar}) = \begin{bmatrix} h_{LR}(f_{b\_cfar}, f_{s\_cfar}) \\ h_{SR}(f_{b\_cfar}, f_{s\_cfar}) \end{bmatrix}.$$
(Expression 37)

In addition, techniques such as Capon and MUSIC are also applicable.

Here, superscript H is the Hermitian transpose operator. Further, $a_{Tx}(\theta_u, \theta_{BF})$ represents a $N_{Tx}(=N_{T1}+N_{T2})$th order column vector including elements of $(N_{T1})$th order column vector $a_{TxLR}(\theta_u)$ and elements of $(N_{T2})$th order column vector $a_{TxSR}(\theta_{BF})$.

In addition, azimuth direction $\theta_u$ is a value changed at azimuth interval $D_{StepLR}$ within the view angle (e.g., $\theta_{minLR} \le \theta_u \le \theta_{maxLR}$) for the LR mode over which the direction-of-arrival estimation is performed. For example, $\theta_u$ may be set as follows:

$\theta_u = \theta_{minLR} + u \times D_{StepLR}, u=0, \ldots, NU-1$ $NU = \text{floor}[(\theta_{maxLR} - \theta_{minLR})/D_{StepLR}]$.

Here, floor(x) is a function that returns the maximum integer value not greater than real number x.

Further, $a_{TxLR}(\theta_u)$ is a direction vector representing a phase difference at first transmit antennas 106-1 for the case where a radar reflected wave arrives from azimuth direction $\theta_u$, and is a $(N_{T1})$th order column vector having, as an element, a complex response geometrically-optically calculated for the element spacing between first transmit antennas 106-1. Note that, the phase difference at first transmit antennas 106-1 may, for example, be calculated with reference to the arrangement of a predetermined antenna of first transmit antennas 106-1.

Further, $a_{TxSR}(\theta_{BF})$ is a direction vector representing a phase difference at second transmit antennas 106-2 for the case where a radar reflected wave arrives from azimuth direction $\theta_{BF}$, and is a $(N_{T2})$th order column vector having, as an element, a complex response geometrically-optically calculated for the element spacing between second transmit antennas 106-2. Note that, the phase difference at second transmit antennas 106-2 may, for example, be calculated with reference to the predetermined antenna of first transmit antennas 106-1 which is used for calculating $a_{TxLR}(\theta_u)$.

Virtual receive array correlation vector $h_{all}(f_{b\_cfar}, f_{s\_cfar})$ represents a $(N_{Tx} \times Na)$th order column vector consisting of the elements of virtual receive array correlation vector $h_{LR}(f_{b\_cfar}, f_{s\_cfar})$ for the transmit antennas for the LR mode and the elements of virtual receive array correlation vector $h_{SR}(f_{b\_cfar}, f_{s\_cfar})$ for the transmit antennas for the SR mode.

Further, $D_{cal}$ is a $(N_{Tx} \times Na)$th order square matrix including an array correction coefficient for correcting phase deviations and amplitude deviations between the transmit antennas and between the receive antennas, and a coefficient for reducing the influence of inter-element coupling between the antennas. If the coupling between antennas in the virtual receive array is negligible, $D_{cal}$ represents a diagonal matrix and includes, as diagonal components, the array correction coefficient for correcting the phase deviations and the amplitude deviations between the transmit antennas and between the receive antennas.

In Expression 35, operator

[52]

"⊗" [52]

represents the Kronecker product.

Note that, Expression 35 may be modified, for example, as Expression 38:

[53]

$$P_{LR}(\theta_u, \theta_{BF}, f_{b\_cfar}, f_{s\_cfar}) = \left| \begin{bmatrix} a_{TxLR}(\theta_u) \otimes a_{Rx}(\theta_u) \\ a_{TxSR}(\theta_{BF}) \otimes a_{Rx}(\theta_u) \end{bmatrix}^H D_{cal} h(f_{b\_cfar}, f_{s\_cfar}) \right|^2.$$ (Expression 38)

Further, for example, when $D_{cal}$ is a diagonal matrix, Expression 35 may be modified as following Expression 39:

[54]

$$P_{LR}(\theta_u, \theta_{BF}, f_{b\_cfar}, f_{s\_cfar}) = |(a_{TxLR}(\theta_u) \otimes a_{Rx}(\theta_u))^H D_{calLR} h_{LR}(f_{b\_cfar}, f_{s\_cfar}) + (a_{TxSR}(\theta_{BF}) \otimes a_{Rx}(\theta_u))^H D_{calSR} h_{SR}(f_{b\_cfar}, f_{s\_cfar})|^2$$ (Expression 39).

Note here that, $D_{calLR}$ is the first to the $N_{T1}$th elements of the diagonal components of $D_{cal}$, and $D_{calSR}$ is the $N_{T1}+1$th to the $N_{Tx}$th elements of the diagonal components of $D_{cal}$.

Here, although the operation of the direction estimation processing with respect to azimuth direction θ has been described, the present disclosure is not limited thereto, and direction estimator 214 may perform two-dimensional direction estimation in the azimuth direction and in the elevation angle direction, for example, when the virtual receive antenna arrangement includes virtual receive antennas which are different from each other in position in the vertical arrangement.

<(2) Direction Estimation for SR Mode (SR-DOA)>

For example, direction estimator 214 may calculate a spatial profile, with azimuth direction $\theta_q$ in direction estimation evaluation function value $P_{SR}(\theta_q, f_{b\_cfar}, f_{s\_cfar})$ for the SR mode being variable within a defined viewing angle for the SR mode. Direction estimator 214 extracts a predetermined number of local maximum peaks in the calculated spatial profile in order from the largest, for example, and outputs the elevation angle directions of the local maximum peaks as direction-of-arrival estimation values (e.g., positioning outputs), for example.

There are various methods for direction estimation evaluation function value $P_{SR}(\theta_q, f_{b\_cfar}, f_{s\_cfar})$ for the SR mode depending on direction-of-arrival estimation algorithms. For example, an estimation method using an array antenna disclosed in NPL 6 may be used.

For example, the beamformer method can be expressed as following Expression 40:

[55]

$$P_{SR}(\theta_q, f_{b\_cfar}, f_{s\_cfar}) = |(a_{TxSR}(\theta_q) \otimes a_{Rx}(\theta_q))^H D_{calSR} h_{SR}(f_{b\_cfar}, f_{s\_cfar})|^2$$ (Expression 40).

In addition, techniques such as Capon and MUSIC are also applicable.

Here, superscript H is the Hermitian transpose operator.

In addition, direction $\theta_q$ is a value changed at azimuth interval $D_{StepSR}$ within the view angle (e.g., $\theta_{minSR} \leq \theta_q \leq \theta_{maxSR}$) for the SR mode over which the direction-of-arrival estimation is performed. For example, $\theta_q$ may be set as follows:

$$\theta_q = \theta_{minSR} + q \times D_{StepSR}, q = 0, \ldots, NQ-1$$

$$NQ = \text{floor}[(\theta_{maxSR} - \theta_{minSR})/D_{StepSR}].$$

Here, floor(x) is a function that returns the maximum integer value not greater than real number x.

Further, $D_{calSR}$ is a $(N_{T1} \times Na)$th order square matrix including an array correction coefficient for correcting phase deviations and amplitude deviations between second transmit antennas 106-2 and between the receive antennas, and a coefficient for reducing the influence of inter-element coupling between the antennas. If the coupling between antennas in the virtual receive array is negligible, $D_{calSR}$ represents a diagonal matrix and includes, as diagonal components, the array correction coefficient for correcting phase deviations and amplitude deviations between the transmit antennas and between the receive antennas.

Further, for example, when azimuth direction $\theta_q$ is within the viewing angle range for the LR mode (e.g., $\theta_{minLR} \leq \theta_q \leq \theta_{maxLR}$) or when azimuth direction $\theta_q$ is within a predetermined range including the viewing angle range for the LR mode (e.g., $\theta_{minSRwLR} \leq \theta_{minLR} \leq \theta_q \leq \theta_{maxLR} \leq \theta_{maxSRwLR}$), direction estimator 214 may calculate the spatial profile, with azimuth direction $\theta_q$ in direction estimation evaluation function value $P_{SRwLR}(\theta_q, f_{b\_cfar}, f_{s\_cfar})$ for the SR mode as given by Expression 41 being variable within the viewing angle range for the LR mode ($\theta_{minLR} \leq \theta_q \leq \theta_{maxLR}$) or within the predetermined range including the viewing angle range for the LR mode ($\theta_{minSRwLR} \leq \theta_{minLR} \leq \theta_q \leq \theta_{maxLR} \leq \theta_{maxSRwLR}$):

[56]

$$P_{SRwLR}(\theta_q, f_{b\_cfar}, f_{s\_cfar}) = \frac{N_{T2}}{N_{TX}} \left| \begin{bmatrix} \gamma a_{TxLR}(\theta_q) \otimes a_{Rx}(\theta_q) \\ a_{TxSR}(\theta_q) \otimes a_{Rx}(\theta_q) \end{bmatrix}^H D_{cal} h_{all}(f_{b\_cfar}, f_{s\_cfar}) \right|^2.$$ (Expression 41)

Direction estimator 214 may extract a predetermined number of local maximum peaks in the calculated spatial profile in order from the largest, for example, and output the elevation angle directions of the local maximum peaks as direction-of-arrival estimation values (e.g., positioning outputs), for example.

Here, γ is an attenuation coefficient for adjusting the difference in antenna gain between the LR antenna and the SR antenna. For example, attenuation coefficient γ may be set such that the average of antenna gains of the LR antenna is identical to the average of antenna gains of the SR antenna (e.g., 0<γ<1). By way of example, when the average of antenna gains of the LR antenna is 3 dB higher than the average of antenna gains of the SR antenna, γ may be set to 0.5.

Further, for example, when the number of antennas used for direction estimation is different between $P_{SR}(\theta_q, f_{b\_cfar}, f_{s\_cfar})$ and $P_{SRwLR}(\theta_q, f_{b\_cfar}, f_{s\_cfar})$, the evaluation value yields a difference. Thus, term $N_{T2}/N_{Tx}$ in Expression 41 is a term for normalizing the difference in the number of antennas.

Further, for example, when $D_{cal}$ is a diagonal matrix, Expression 41 may be modified as following Expression 42:

[57]

$$P_{SRwLR}(\theta_q, f_{b\_cfar}, f_{s\_cfar}) = \frac{N_{T2}}{N_{Tx}}|\gamma a_{TxLR}(\theta_q) \otimes a_{Rx}(\theta_q))^H$$ (Expression 42)

$$D_{calLR}h_{LR}(f_{b\_cfar}, f_{s\_cfar}) + (a_{TxSR}(\theta_q) \otimes$$

$$(a_{Rx}(\theta_q))^H D_{calSR} h_{SR}(f_{b\_cfar}, f_{s\_cfar})|^2.$$

Here, $D_{calLR}$ is the first to the $N_{T1}$th elements of the diagonal components of $D_{cal}$, and $D_{calSR}$ is the $N_{T1}+1$th to the $N_{Tx}$th elements of the diagonal components of $D_{cal}$.

Note that, although the description of direction estimation evaluation function value $P_{SR}$ ($\theta_q$, $f_{b\_cfar}$, $f_{s\_cfar}$) has been given here in relation to the case where the beamformer method is used as the direction estimation algorithm, the present disclosure is not limited thereto, and another direction estimation algorithm such as Capon or MUSIC may be applied, for example, by using virtual receive array correlation vector $h_{SR}$ ($f_{b\_cfar}$, $f_{s\_cfar}$) and direction vector

[58]

$$a_{SR}(\theta_q) \otimes a_{Rx}(\theta_u).$$ [58]

In addition, although the description hereinabove has been given of the case where, for direction estimation evaluation function value $P_{SRwLR}$ ($\theta_q$, $f_{b\_cfar}$, $f_{s\_cfar}$), the beamformer method is used as the direction estimation algorithm, the present disclosure is not limited thereto, and another direction estimation algorithm such as Capon or MUSIC may be applied, for example, by using virtual receive array correlation vector $h_{all}$ ($f_{b\_cfar}$, $f_{s\_cfar}$) and direction vector

[59]

$$\begin{bmatrix} \gamma a_{TxLR}(\theta_q) \otimes a_{Rx}(\theta_q) \\ a_{TxSR}(\theta_q) \otimes a_{Rx}(\theta_q) \end{bmatrix}.$$

Further, although the operation of the direction estimation processing with respect to azimuth direction θ has been described, the present disclosure is not limited thereto, and direction estimator 214 may perform two-dimensional direction estimation in the azimuth direction and in the elevation angle direction, for example, when the virtual receive antenna arrangement includes virtual receive antennas which are different from each other in position in the vertical arrangement.

LR-DOA and SR-DOA have been described above.

Next, an example of the direction estimation result (computer simulation result) obtained when the antenna arrangement according to each of above-described arrangement example 1 and arrangement example 2 is applied will be described.

Example 1 of Direction Estimation Result of Arrangement Example 1

Figures 10A, 10B, 10C:
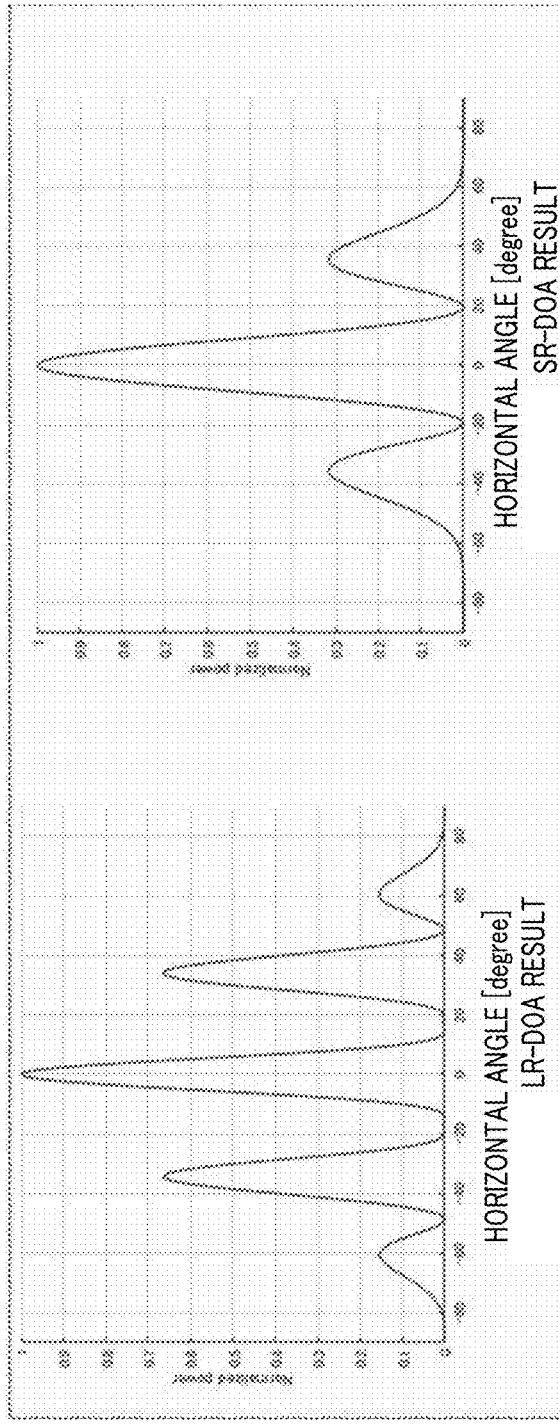
FIGS. 10A, 10B, and 10C illustrate examples of a direction estimation result according to arrangement example 1.

FIGS. 10A, 10B, and 10C illustrate examples of a direction estimation result (computer simulation result) obtained when the MIMO antenna arrangement of arrangement example 1 (for example, FIG. 5) is used and when the beamformer method is used as the direction-of-arrival estimation algorithm in direction estimator 214. FIGS. 10A, 10B, and 10C illustrate the examples of the direction estimation result, for example, in the case of DA=λ/2 and $D_{TxMIN}$=λ/2.

Note that, the directivity of each antenna element alone is not considered in FIGS. 10A, 10B, and 10C. Further, FIGS. 10A, 10B, and 10C illustrate examples of plotted outputs of the direction-of-arrival estimation evaluation function value within the range of ±90 degrees in the horizontal direction when the true value of a target is an angle of 0 degrees in the horizontal direction.

FIG. 10A illustrates an example of the direction estimation result (LR-DOA) obtained in the LR virtual receive antenna arrangement (e.g., FIG. 7A) using the beamformer method. Note that, regarding directivity direction $\theta_{BF}$ resulting from the beam synthesis using the SR antennas, directivity at 0 degrees in the horizontal direction was formed.

Further, FIG. 10B illustrates an example of the direction estimation result (SR-DOA) obtained in the SR virtual receive antenna arrangement (e.g., FIG. 7B) using the beamformer method.

FIG. 10C illustrates an example of the direction estimation result (SR-DOA within LR FOV) obtained in the SR virtual receive antenna arrangement within the viewing field in the LR mode (e.g., FIG. 7C) using the beamformer method.

From the results in the direction estimator illustrated respectively in FIGS. 10A, 10B, and 10C, it can be confirmed that the maximum peaks were obtained at the target true value (here, horizontal 0 degrees) and direction estimator 214 correctly estimated the target direction.

Further, DA=λ/2 and $D_{TxMIN}$=λ/2 in the MIMO antenna arrangement illustrated in FIG. 5, for example. Accordingly, as can be confirmed by the direction-of-arrival estimation results illustrated in FIGS. 10A, 10B, and 10C, radar apparatus 10 suppresses grating lobes within ±90 degrees.

Further, for example, as illustrated in FIGS. 10A and 10B, it can be confirmed that the LR virtual receive antenna arrangement (e.g., FIG. 7A) has, because of its greater aperture length between the virtual receive antennas, a narrower and sharper peak in the target direction (e.g., the main lobe) than the SR virtual receive antenna arrangement (e.g., FIG. 7B), and accordingly has higher angular resolution.

Further, for example, FIG. 10C illustrates the direction estimation result obtained on the assumption that the direction of the horizontal 0 degrees is within the viewing angle in the LR mode. Thus, as illustrated in FIGS. 10C and 10B, it can be confirmed that the virtual receive antenna arrangement including the LR antenna (e.g., FIG. 7C) has, because of its greater aperture length between the virtual receive antennas, a narrower and sharper peak in the target direction (e.g., the main lobe) than the SR virtual receive antenna arrangement (e.g., FIG. 7B), and accordingly has higher angular resolution.

Further, the number of virtual receive antennas is greater in the SR virtual receive antenna arrangement within the viewing angle in the LR mode (e.g., FIG. 7C) than in the LR virtual receive antenna arrangement (e.g., FIG. 7A). Thus, for example, as illustrated in FIGS. 10A and 10C, it can be confirmed that the peak levels of pseudo peaks occurring in directions different from the target direction (e.g., referred to as side lobes) are reduced more in the SR virtual receive antenna arrangement within the viewing angle in the LR mode than in the LR virtual receive antenna arrangement. When the peak levels of the pseudo peaks (e.g., side lobes) are reduced more, radar apparatus 10 can improve detection performance for a weaker target, for example.

Example 1 of Direction Estimation Result of Arrangement Example 2

Figure 11B:
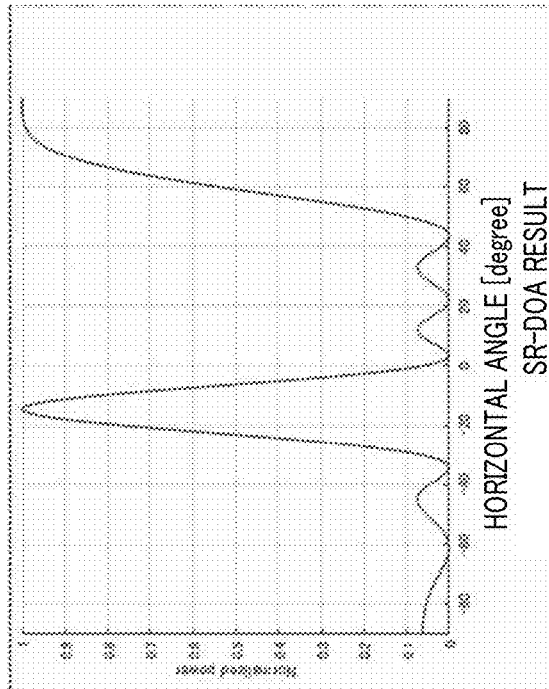
FIGS. 11A, 11B, and 11C illustrate other examples of the direction estimation result according to arrangement example 1.
Figure 11A:
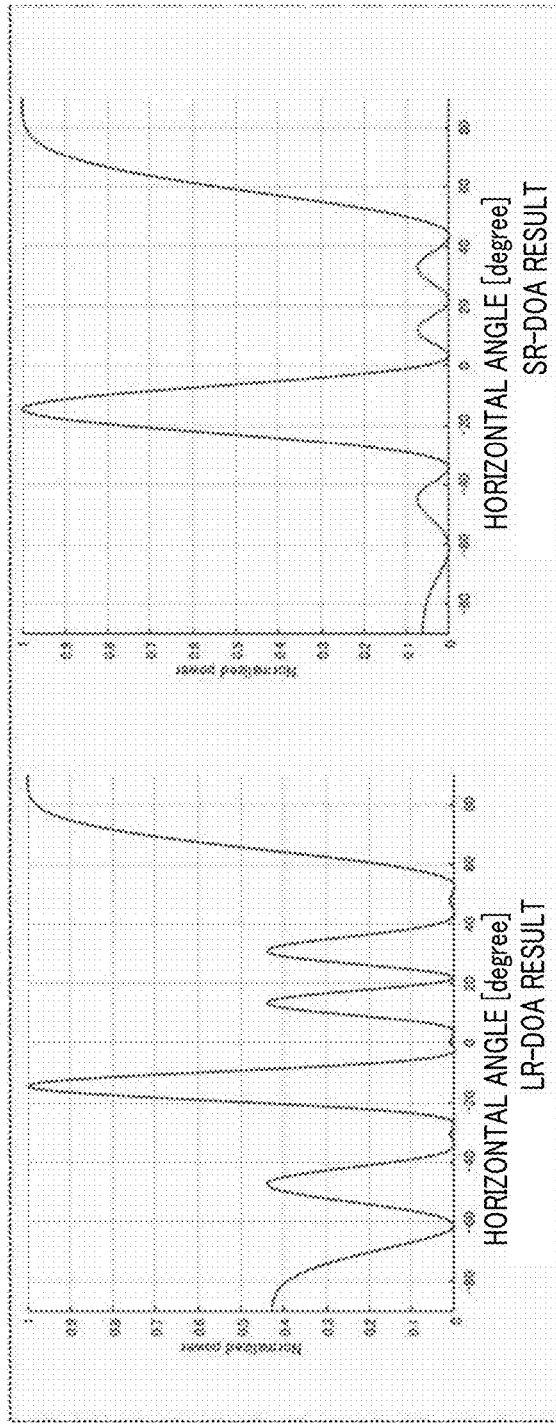
Figure 11C:
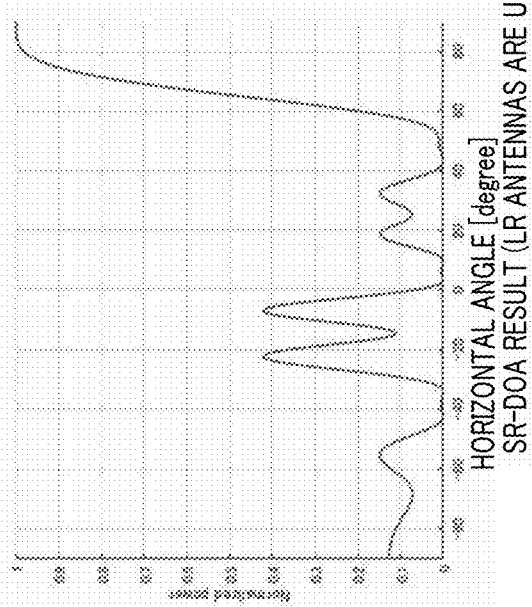

FIGS. 11A, 11B, and 11C illustrate examples of a direction estimation result (computer simulation result) obtained when the beamformer method is used as the direction-of-arrival estimation algorithm in direction estimator 214 in the case of, for example, DA=0.8λ and $D_{TxMIN}$=0.8λ (for example, in the case of $dT_{LR1,SR1}$=2λ, $dT_{LR1,SR2}$=2.8λ, $dT_{LR1,SRbf}$=2.4λ, and $dR_{1,2}$=1.6λ in FIG. 5) in the IMO antenna arrangement of arrangement example 1 (for example, FIG. 5).

Note that, the directivity of each antenna element alone is not considered in FIGS. 11A, 11B, and 11C. Further, FIGS. 11A, 11B, and 11C illustrate examples of plotted outputs of the direction-of-arrival estimation evaluation function value within the range of +90 degrees in the horizontal direction, in which the true value of a target is an angle of 90 degrees in the horizontal direction.

FIG. 11A illustrates an example of the direction estimation result (LR-DOA) obtained in the LR virtual receive antenna arrangement (e.g., FIG. 7A) using the beamformer method. Note that, regarding directivity direction $θ_{BF}$ resulting from the beam synthesis using the SR antennas, directivity at 90 degrees in the horizontal direction was formed.

Further, FIG. 11B illustrates an example of the direction estimation result (SR-DOA) obtained in the SR virtual receive antenna arrangement (e.g., FIG. 7B) using the beamformer method.

FIG. 11C illustrates an example of the direction estimation result (SR-DOA within LR FOV) obtained in the SR virtual receive antenna arrangement within the viewing field in the LR mode (e.g., FIG. 7C) using the beamformer method.

From the results in the direction-of-arrival estimator illustrated respectively in FIGS. 11A, 11B, and 11C, it can be confirmed that the maximum peaks were obtained at the target true value (here, horizontal 90 degrees) and direction estimator 214 correctly estimated the target direction.

Note that, in FIGS. 11A and 11B, it can be confirmed that grating lobes occur in the vicinity of −15 degrees in addition to the maximum peaks of horizontal 90 degrees. In contrast, in radar apparatus 10, for example, when the viewing angle (FOV) is set to ±10 degrees, and there is a target near the horizontal 90 degrees, no grating lobe peak occurs within the viewing angle. It is thus possible for radar apparatus 10 to reduce the possibility of erroneously detecting a grating lobe as the peak of a target.

Further, the number of virtual receive antennas is greater in the SR virtual receive antenna arrangement within the viewing angle in the LR mode (e.g., FIG. 7C) than in the LR or SR virtual receive antenna arrangement (e.g., FIG. 7A or 7B). Thus, as illustrated in FIG. 11C, it is possible to confirm that the generation of such a grating lobe as those in FIGS. 11A and 11B is suppressed in SR-DOA within the LR viewing angle.

<Example of Direction Estimation Result of Arrangement Example 2>

FIGS. 12A, 12B, and 12C illustrate examples of a direction estimation result (computer simulation result) obtained when the MIMO antenna arrangement of arrangement example 2 (for example, FIG. 8) is used and when the beamformer method is used as the direction-of-arrival estimation algorithm in direction estimator 214. FIGS. 12A, 12B, and 12C illustrate the direction estimation results, for example, in the case of DA=λ/2 and $D_{TxMIN}$=λ/2.

Note that, the directivity of each antenna element alone is not considered in FIGS. 12A, 12B, and 12C. Further, FIGS. 12A, 12B, and 12C illustrate examples of plotted outputs of the direction-of-arrival estimation evaluation function value within the range of ±90 degrees in the horizontal direction, in which the true value of a target is an angle of 0 degrees in the horizontal direction.

FIG. 12A illustrates an example of the direction estimation result (LR-DOA) obtained in the LR virtual receive antenna arrangement (e.g., FIG. 9A) using the beamformer method. Note that, regarding directivity direction $θ_{BF}$ resulting from the beam synthesis using the SR antennas, directivity at 0 degrees in the horizontal direction was formed.

Further, FIG. 12B illustrates an example of the direction estimation result (SR-DOA) obtained in the SR virtual receive antenna arrangement (e.g., FIG. 9B) using the beamformer method.

FIG. 12C illustrates an example of the direction estimation result (SR-DOA within LR FOV) obtained in the SR virtual receive antenna arrangement within the viewing field in the LR mode (e.g., FIG. 9C) using the beamformer method.

From the results in the direction-of-arrival estimator illustrated respectively in FIGS. 12A, 12B, and 12C, it can be confirmed that the maximum peaks were obtained at the target true value (here, horizontal 0 degrees) and direction estimator 214 correctly estimated the target direction.

Further, DA=λ/2 and $D_{TxMIN}$=λ/2 in the MIMO antenna arrangement illustrated in FIG. 8, for example. Accordingly, as can be confirmed by the direction-of-arrival estimation results illustrated in FIGS. 12A, 12B, and 12C, radar apparatus 10 suppresses grating lobes within ±90 degrees.

Further, for example, as illustrated in FIGS. 12A and 12B, it can be confirmed that the LR virtual receive antenna arrangement (e.g., FIG. 9A) has, because of its greater aperture length between the virtual receive antennas, a narrower and sharper peak in the target direction (e.g., the main lobe) than the SR virtual receive antenna arrangement (e.g., FIG. 9B), and accordingly has higher angular resolution.

Further, for example, FIG. 12C illustrates the direction estimation result obtained on the assumption that the direction of the horizontal 0 degrees is within the viewing angle in the LR mode. Thus, as illustrated in FIGS. 12C and 12B, it can be confirmed that the virtual receive antenna arrangement including the LR antenna (e.g., FIG. 9C) has, because of its greater aperture length between the virtual receive antennas, a narrower and sharper peak in the target direction (e.g., the main lobe) than the SR virtual receive antenna arrangement (e.g., FIG. 9B), and accordingly has higher angular resolution.

Further, the number of virtual receive antennas is greater in the SR virtual receive antenna arrangement within the viewing angle in the LR mode (e.g., FIG. 9C) than in the LR virtual receive antenna arrangement (e.g., FIG. 9A). Thus, for example, as illustrated in FIGS. 12A and 12C, it can be confirmed that the peak levels of pseudo peaks occurring in directions different from the target direction (e.g., referred to as side lobes) are reduced more in the SR virtual receive antenna arrangement within the viewing angle in the LR mode than in the LR virtual receive antenna arrangement. When the peak levels of the pseudo peaks (e.g., side lobes) are reduced more, radar apparatus 10 can improve detection performance for a weaker target, for example.

Further, since the number of receive antennas 202 is greater and, accordingly, the number of virtual receive antennas is greater in arrangement example 2 (e.g., FIGS. 8, 9A, 9B, and 9C) than in arrangement example 1 (e.g., FIGS. 5, 7A, 7B, and 7C), the virtual receive antennas have a larger aperture length. It can thus be confirmed that the peak (e.g., main lobe) oriented in the target direction (e.g., horizontal 0 degrees) is narrower and sharper in the direction estimation result (e.g., FIGS. 12A, 12B, and 12C) of arrangement example 2 than in the direction estimation result (e.g., FIGS. 10A, 10B, and 10C) of arrangement example 1, and the angular resolution is high. Further, it can be confirmed that the peak levels of the pseudo peaks (for example, side lobes) occurring in directions different from the target direction are reduced more in the direction estimation results (for example, FIGS. 12A, 12B, and 12C) of arrangement example 2 than in the direction estimation results (for example, FIGS. 10A, 10B, and 10C) of arrangement example 1. When the peak levels of the pseudo peaks (e.g., side lobes) are reduced more, radar apparatus 10 can improve detection performance for a weaker target, for example.

The examples of the direction estimation result (computer simulation result) have been described above.

For example, direction estimator 214 may output the direction estimation result and may further output, as a positioning result, distance information that is based on distance index $f_{bLR}$ or $f_{b\_cfar}$, and Doppler velocity information of the target that is based on Doppler frequency index $f_{b\_cfar}$ of the target and determination result $DR_{min}$ of aliasing determiner 212, for example, to a control device of a vehicle in the case of an in-vehicle radar (not illustrated) or to an infrastructure control device in the case of an infrastructure radar (not illustrated).

Direction estimator 214 may, for example, calculate Doppler frequency index $f_{es\_cfar}$ in accordance with Expression 43 based on Doppler frequency index $f_{s\_cfar}$ and $DR_{min}$ that is a determination result of aliasing determiner 212:

[60]

$$f_{es\_cfar} = f_{s\_cfar} + DR_{min} \times Ncode \quad \text{(Expression 43)}.$$

Doppler frequency index $f_{es\_cfar}$ corresponds, for example, to a Doppler index for the case where the FFT size of Doppler analyzer 210 is extended to Loc×Ncode. Hereinafter, $f_{es\_cfar}$ is referred to as "extended Doppler frequency index."

Note that, the Doppler range is assumed to be up to ±1/(2×Tr), and the range of extended Doppler frequency index $f_{es\_cfar}$ corresponding to this Doppler range is −Loc×Ncode/2 ≤ $f_{es\_cfar}$ < Loc×Ncode/2. As a result of calculation of Expression 43, $f_{es\_cfar}$+Loc×Ncode is regarded as $f_{es\_cfar}$ when $f_{es\_cfar}$ < −Loc×Ncode/2. Further, when $f_{es\_cfar}$ ≥ Loc×Ncode/2, $f_{es\_cfar}$−Loc×Ncode is regarded as $f_{es\_cfar}$.

Moreover, the Doppler frequency information may be converted into a relative velocity component and then outputted. Doppler frequency index $f_{es\_cfar}$ may be converted into relative velocity component $v_d(f_{es\_cfar})$ using Expression 44:

[61]

$$v_d(f_{es\_cfar}) = \frac{\lambda}{2} f_{es\_cfar} \Delta_f. \quad \text{(Expression 44)}$$

Here, $\lambda$ is the wavelength of the carrier frequency of an RF signal outputted from a transmission radio (not illustrated). When a chirp signal is used as the radar transmission signal, $\lambda$ is the wavelength of the center frequency in the frequency sweep band of the chirp signal. Further, $\Delta_f$ denotes the Doppler frequency interval in FFT processing performed in Doppler analyzer 210. For example, in the present embodiment, $\Delta_f = 1/\{Loc \times N_{code} \times Tr\}$.

The operation example of radar apparatus 10 has been described above.

As described above, in the present embodiment, the arrangement of a plurality of transmit antennas 106 and a plurality of receive antennas 202 are determined in radar apparatus 10, for example, based on the phase center of transmit antennas for beam synthesis among a plurality of SR antennas (e.g., corresponding to the second transmit antennas). This antenna arrangement makes it possible for radar apparatus 10 to reduce the angular ambiguity to improve the target detection performance even when the LR antennas and the SR antennas are shared in the LR mode and SR mode.

For example, when above-described (Condition 1) is satisfied, the virtual receive antenna arrangement (for example, FIG. 7A or FIG. 9A) used for direction estimation for the LR mode includes at least one element spacing of about 0.5λ to 0.8λ, so that radar apparatus 10 can suppress generation of grating lobes within the viewing angle.

Further, for example, since a signal resulting from beam synthesis using the SR antennas can also be used in the direction estimation for the LR mode, the number of virtual receive antennas increases, and radar apparatus 10 can thus increase the array gain. Thus, radar apparatus 10 can improve the reception quality at the time of direction estimation and improve the detection distance. Further, since an increase in the number of virtual receive antennas may increase the aperture length between the virtual receive antennas, radar apparatus 10 can improve the angular resolution.

Radar apparatus 10 can also suppress generation of grating lobes within the viewing angle, for example, in the direction estimation for the SR mode. Further, since radar apparatus 10 can use the virtual receive antenna arrangement including the LR antenna within the viewing angle in the LR mode during the direction estimation for the SR mode, the number of virtual receive antennas increases, and the array gain can be increased. Thus, radar apparatus 10 can improve the reception quality at the time of direction estimation and improve the detection distance. Further, since an increase in the number of virtual receive antennas may increase the aperture length between the virtual receive antennas, radar apparatus 10 can improve the angular resolution.

Further, besides the effect obtained when above (Condition 1) is satisfied, the virtual receive antennas can be arranged without overlap in the virtual receive antenna arrangement for the SR mode when above-described (Condition 2) is satisfied. Accordingly, the aperture length between the virtual receive antennas can be enlarged, and radar apparatus 10 can thus improve the angular resolution.

Further, radar apparatus 10 may, for example, perform the determination of Doppler aliasing on the reception signal (for example, the output of each of Doppler analyzers 210 per code element of a code multiplexed signal) using an orthogonal code that is unused for the code multiplexing transmission. By this determination, radar apparatus 10 can, for example, determine the aliasing within the Doppler range that is greater by a factor of the code length of the orthogonal code sequences than the Doppler analysis range in each of Doppler analyzers 210. Therefore, according to the present embodiment, radar apparatus 10 can extend, to the Doppler range equivalent to that at the time of single antenna transmission, the Doppler range where it is possible to perform detection without ambiguity.

Further, radar apparatus 10 can, for example, reduce mutual interference between code multiplexed signals as low as a noise level by performing the Doppler phase correction considering aliasing during code separation based on the determination result for the Doppler aliasing, and thus can perform the code multiplexing transmission of the MIMO radar while preventing degradation of radar detection performance.

As is understood from the foregoing description, according to the present embodiment, it is possible to enhance the target detection accuracy of radar apparatus 10.

Note that, when at least one of the number of transmit antennas and the number of receive antennas is increased in arrangement example 1, the virtual receive antennas increase in the arrangement given by Expression 32 additively to the configuration illustrated in arrangement example 1 (for example, FIG. 5). In other words, another virtual receive antenna is added to the virtual receive antenna arrangement illustrated in FIG. 7A, 7B, or 7C. It is thus possible to obtain the same effect even with the antenna arrangement including arrangement example 1 since the effect described above in the present embodiment is retained. Moreover, also in the case where at least one of the number of transmit antennas and the number of receive antennas is increased in arrangement example 2, the effect described in the above present embodiment is retained. The same applies to subsequent arrangement examples.

OTHER EMBODIMENTS

Hereinafter, other arrangement examples different from arrangement example 1 and arrangement example 2 described above will be described.

Arrangement Example 3

FIGS. 13A and 13B illustrate arrangement examples (for example, MIMO antenna arrangement examples) of transmit antennas 106 (referred to as Tx, for example) and receive antennas 202 (referred to as Rx, for example) according to arrangement example 3.

In the examples illustrated in FIGS. 13A and 13B, number $N_{Tx}$ of transmit antennas is four (e.g., Tx #1, Tx #2, Tx #3, and Tx #4), and the number of receive antennas Na is four (e.g., Rx #1, Rx #2, Rx #3, and Rx #4).

In FIGS. 13A and 13B, the number of first transmit antennas 106-1 for the LR mode (e.g., LR antennas) is $N_{T1}=2$, and the number of second transmit antennas 106-2 for the SR mode (e.g., SR antennas) is $N_{T2}=2$. In FIGS. 13A and 13B, "LR1" and "LR2" denote the LR antennas, "SR1" and "SR2" denote the SR antennas.

The antenna arrangement examples illustrated in FIGS. 13A and 13B are different from arrangement example 2 (e.g., FIG. 8) in that the antenna arrangement examples include a plurality of LR antennas, for example.

The MIMO antenna arrangements illustrated in FIGS. 13A and 13B satisfy, for example, following (Condition 1) and (Condition 2). In arrangement example 3, when there are a plurality of LR antennas as illustrated in FIGS. 13A and 13B, at least one of the LR antennas may be arranged so as to satisfy (Condition 1).

FIG. 13A illustrates an example of an arrangement in which both of two LR antennas Tx #1 and Tx #2 satisfy (Condition 1). Further, FIG. 13B illustrates an example of an arrangement in which one LR antenna Tx #2 of the two LR antennas satisfies (Condition 1).

Arrangement Example 3-1: Condition 1

By way of example, a description will be given of a case where $dT_{LR2,SR1}=1.75\lambda$, $dT_{LR2,SR2}=2.25\lambda$, $dT_{Tx1,Tx2}=1.5\lambda$, $dR_{1,2}=3\lambda$, $dR_{2,3}=1.5\lambda$, and $dR_{3,4}=\lambda$ in FIG. 13A. In this instance, since the phase center with respect to Tx #3 (SR1) and Tx #4 (SR2) (e.g., the phase center of $SR_{bf}$) is the midpoint between Tx #3 (SR1) and Tx #4 (SR2), $dT_{LR1,SRbf}=3.5\lambda$ and $dT_{LR2,SRbf}=2\lambda$.

Thus, in FIG. 13A, $|dT_{LR1,SRbf}-dR_{1,2}|=1\lambda/2$, $|dT_{LR1,SRbf}-dR_{2,3}|=2\lambda$, $|dT_{LR1,SRbf}-dR_{3,4}|=2.5\lambda$, $|dT_{LR2,SRbf}-dR_{1,2}|=\lambda$, $|dT_{LR2,SRbf}-dR_{2,3}|=\lambda/2$, and $|dT_{LR2,SRbf}-dR_{3,4}|=\lambda$. Here, $\lambda$ represents the wavelength of the carrier frequency of the radar transmission signal. When a chirp signal is used as the radar transmission signal, $\lambda$ is the wavelength of the center frequency in the frequency sweep band of the chirp signal.

In the antenna arrangement illustrated in FIG. 13A, in the direction estimation for the LR mode (LR-DOA), absolute value $|dT_{LR1,SRbf}-dR_{1,2}|$ of the difference between, on the one hand, spacing $dT_{LR1,SRbf}$ between the phase center of SR antennas $SR_{bf}$ for beam synthesis using Tx #3 (SR1) and Tx #4 (SR2) and LR antenna Tx #1 (LR1) and, on the other hand, receive antenna spacing $dR_{1,2}$ is $\lambda/2$, and thus, (Condition 1) in the case of $DA=\lambda/2$ is satisfied. Likewise, in the antenna arrangement illustrated in FIG. 13A, in the direction estimation for the LR mode (LR-DOA), absolute value $|d_{TLR2,SRbf}-dR_{2,3}|$ of the difference between, on the one hand, spacing $dT_{LR2,SRbf}$ between the phase center of SR antennas $SR_{bf}$ for beam synthesis using Tx #3 (SR1) and Tx #4 (SR2) and LR antenna Tx #2 (LR2) and, on the other hand, receive antenna spacing $dR_{2,3}$ is $\lambda/2$, and thus, (Condition 1) in the case of $DA=\lambda/2$ is satisfied.

Arrangement Example 3-1: Condition 2

In FIG. 13A, the element spacings between receive antennas Rx are $dR_{1,2}=3\lambda$, $dR_{2,3}=1.5\lambda$, and $dR_{3,4}=\lambda$, and are wider than aperture length $A_{SR}$ between the SR antennas arranged at minimum transmit antenna spacing $D_{TxMIN}=\lambda/2$. For example, in FIG. 13A, $A_{SR}=|dT_{LR2,SR2}-dT_{LR2,SR1}|=\lambda/2$, and each of $dR_{1,2}$, $dR_{2,3}$, and $dR_{3,4}$ is wider than aperture length $A_{SR}$ between the SR antennas ($dR_{1,2}$, $dR_{2,3}$, $dR_{3,4} > A_{SR}$), and, (Condition 2) is thus satisfied.

Arrangement Example 3-2: Condition 1

By way of example, a description will be given of a case where $dT_{LR2,SR1}=1.75\lambda$, $dT_{LR2,SR2}=2.25\lambda$, $dT_{Tx1,Tx2}=1.5\lambda$, $dR_{1,2}=2\lambda$, $dR_{2,3}=1.5\lambda$, and $dR_{3,4}=\lambda$ in FIG. 13B. In this instance, since the phase center with respect to Tx #3 (SR1) and Tx #4 (SR2) (e.g., the phase center of $SR_{bf}$) is the midpoint between Tx #3 (SR1) and Tx #4 (SR2), $dT_{LR1,SRbf}=3.5\lambda$ and $dT_{LR2,SRbf}=2\lambda$.

Thus, in FIG. 13B, $|dT_{LR1,SRbf}-dR_{1,2}|=1.5\lambda$, $|dT_{LR1,SRbf}-dR_{2,3}|=2\lambda$, $|dT_{LR1,SRbf}-dR_{3,4}|=2.5\lambda$, $|dT_{LR2,SRbf}-dR_{1,2}|=0$, $|dT_{LR2,SRbf}-dR_{2,3}|=\lambda/2$, and $|dT_{LR2,SRbf}-dR_{3,4}|=\lambda$. Here, $\lambda$ represents the wavelength of the carrier frequency of the radar transmission signal. When a chirp signal is used as the radar transmission signal, $\lambda$ is the wavelength of the center frequency in the frequency sweep band of the chirp signal.

In the antenna arrangement illustrated in FIG. 13B, in the direction estimation for the LR mode (LR-DOA), absolute value $|dT_{LR2,SRbf}-dR_{2,3}|$ of the difference between, on the one hand, spacing $dT_{LR2,SRbf}$ between the phase center of SR antennas $SR_{bf}$ for beam synthesis using Tx #3 (SR1) and Tx #4 (SR2) and LR antenna Tx #2 (LR2) and, on the other hand, receive antenna spacing $dR_{2,3}$ is $\lambda/2$, and thus, (Condition 1) in the case of $DA=\lambda/2$ is satisfied.

Arrangement Example 3-2: Condition 2

In FIG. 13B, the element spacings between receive antennas Rx are $dR_{1,2}=2\lambda$, $dR_{2,3}=1.5\lambda$, and $dR_{3,4}=\lambda$, and are wider than aperture length $A_{SR}$ between the SR antennas arranged at minimum transmit antenna spacing $D_{TxMIN}=\lambda/2$. For example, in FIG. 13B, $A_{SR}=|dT_{LR2,SR2}-dT_{LR2,SR1}|=\lambda/2$, and each of $dR_{1,2}$, $dR_{2,3}$, and $dR_{3,4}$ is wider than aperture length $A_{SR}$ between the SR antennas ($dR_{1,2}$, $dR_{2,3}$, $dR_{3,4}>A_{SR}$), and, (Condition 2) is thus satisfied.

Note that, although the arrangement of two SR antennas Tx #3 (SR1) and Tx #4 (SR2) has been described with reference to FIGS. 13A and 13B, the arrangement is not limited to this, and three or more SR antennas may be arranged. In addition, in FIGS. 13A and 13B, two SR antennas Tx #3 (SR1) and Tx #4 (SR2) are arranged at minimum transmit antenna spacing $D_{TxMIN}$ and with aperture length $A_{SR}=D_{TxMIN}$ between the SR antennas, but the present disclosure is not limited thereto, and when three SR antennas are arranged side by side at minimum transmit antenna spacings $D_{TxMIN}$, aperture length $A_{SR}$ between the SR antennas may be $2D_{TxMIN}$. For example, when $N_{SR}$ SR antennas (where $N_{SR}$ is 2 or more) are arranged side by side at minimum transmit antenna spacing $D_{TxMIN}$, aperture length $A_{SR}$ between the SR antennas may be $(N_{SR}-1)D_{TxMiN}$.

FIGS. 14A and 14B illustrate arrangement examples of LR virtual receive arrays (for example, VA #1 to VA #8 and VA #17 to VA #20) obtained by the antenna arrangements illustrated in FIGS. 13A and 13B, respectively.

Here, the arrangements of the virtual receive arrays may be expressed by Expression 32, for example, based on the positions of transmit antennas 106 constituting the transmit array antenna (e.g., the positions of the feeding points) and the positions of receive antennas 202 constituting the receive array antenna (e.g., the positions of the feeding points).

Further, in arrangements of the virtual receive arrays illustrated in FIGS. 14A and 14B, VA #17 to VA #20 indicate an arrangement of virtual receive antennas that is obtainable in a case where the SR antennas for beam synthesis (e.g., $SR_{bf}$) are regarded as new transmit antenna "Tx #5" and the phase center of the SR antenna group for beam synthesis (the phase center of $SR_{bf}$) is regarded as the position coordinates of antenna Tx #5 in Expression 32. In other words, VA #17 to VA #20 are configured based on Tx #5 and Rx #1 to Rx #4.

(Arrangement of Virtual Receive Antennas Used for Direction Estimation for LR Mode (LR-DOA))

Virtual receive antennas used for LR-DOA are configured based on the SR antennas for beam synthesis, the LR antenna, and the receive antennas. For example, virtual receive antennas VA #1 to VA #4, VA #5 to VA #8, and VA #17 to VA #20 illustrated in FIGS. 14A and 14B are configured based on the SR antennas for beam synthesis (e.g., $SR_{bf}$ or Tx #5), the LR antennas (e.g., Tx #1 and Tx #2), and four receive antennas Rx #1 to Rx #4 in FIGS. 13A and 13B. Note that the arrangements of VA #3 and VA #6 overlap each other in FIG. 14A. In FIG. 14B, the arrangements of VA #3, VA #6, and VA #17 overlap one another.

For example, when aforementioned (Condition 1) is satisfied, each of the arrangements of the virtual receive antennas illustrated in FIGS. 14A and 14B includes virtual receive antennas the spacing between which is DA (DA=0.5λ in the case of FIGS. 14A and 14B). For example, the element spacing between VA #2 and VA #17 illustrated in FIG. 14A is $|dT_{LR1,SRbf}-dR_{1,2}|=DA=0.5\lambda$, and the element spacing between VA #7 and VA #18 is $|dT_{LR2,SRbf}-dR_{2,3}|=DA=0.5\lambda$. In addition, the element spacing between VA #7 and VA #18 illustrated in FIG. 14B is $|dT_{LR2,DRbf}-dR_{2,3}|=DA=0.5\lambda$.

For example, in LR-DOA, when (Condition 1) that "at least one absolute value of the difference between, on the one hand, the spacing between the phase center of the SR antenna group ($SR_{bf}$) for beam synthesis and the LR antenna and, on the other hand, the spacing between the receive antennas is DA=0.5λ to 0.8λ" is satisfied, radar apparatus 10 can suppress the generation of grating lobes in the range of from ±10 degrees to ±90 degrees, for example. Further, for example, radar apparatus 10 can suppress generation of grating lobes within the viewing angle by setting DA based on the expected viewing angle in LR-DOA.

In addition, radar apparatus 10 transmits radar transmission signals using the LR antenna and a plurality of SR antennas (e.g., SR antennas for beam synthesis) in the LR mode. Thus, for example, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Radar apparatus 10 can thus improve the reception quality (e.g., SNR) during the direction estimation to increase the detection distance, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

The virtual receive antennas used for SR-DOA are configured based on the SR antennas and the receive antennas, for example. For example, virtual receive antennas VA #9 to VA #16 (not illustrated) are configured based on SR antennas Tx #3 (SR1) and Tx #4 (SR2) and four receive antennas Rx #1 to Rx #4 in FIGS. 13A and 13B.

For example, when above-mentioned (Condition 2) is satisfied, the arrangement of the virtual receive antennas includes virtual receive antennas the spacing between which is $D_{TxMIN}$. In addition, in radar apparatus 10, when (Condition 2) is satisfied, there is no overlap between the virtual receive antennas in the virtual receive antenna arrangement for the SR mode and the aperture length in the virtual receive array can thus be extended.

Therefore, in SR-DOA, when (Condition 2) that "the element spacing between receive antennas Rx is wider than aperture length $A_{SR}$ of the antenna group whose antennas are arranged at transmit antenna spacing $D_{TxMIN}$, where transmit antenna spacing $D_{TxMiN}$ is 0.5λ to 0.8λ" is satisfied, radar apparatus 10 can suppress the generation of grating lobes, for example, in the range of ±10 degrees to ±90 degrees. Further, since the virtual receive antennas are arranged without overlap in the virtual receive antenna arrangement for SR mode, it is possible to expand the aperture length in the virtual receive array and to improve the angular resolution in radar apparatus 10.

(Arrangement of Virtual Receive Antennas Used in SR-DOA within Viewing Angle in LR Mode)

In SR-DOA, within the viewing angle in the LR mode, the virtual receive antennas may be configured, for example, based on the transmit antennas including the SR antennas and, additionally, the LR antenna. For example, virtual receive antennas VA #1 to VA #16 (partly not illustrated) are configured based on SR antennas Tx #3 (SR1) and Tx #4 (SR2), LR antennas Tx #1 (LR1) and Tx #2 (LR2), and four receive antennas Rx #1 to Rx #4 in FIGS. 13A and 13B.

Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 3, radar apparatus 10 satisfies aforementioned (Condition 1) and (Condition 2), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Arrangement Example 4

Figure 15:
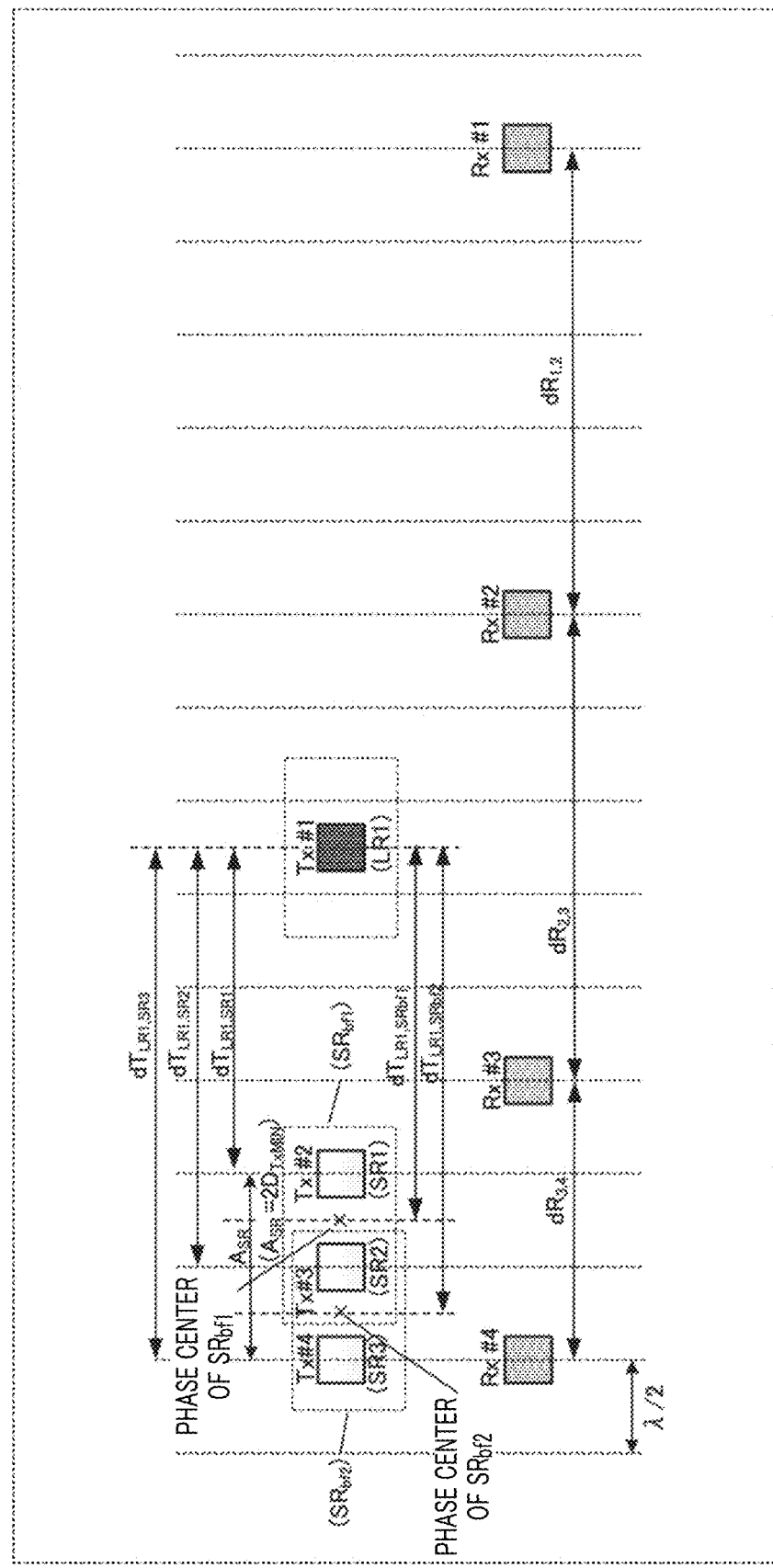
FIG. 15 illustrates an example of an antenna arrangement according to arrangement example 4.

FIG. 15 illustrates an arrangement example (for example, a MIMO antenna arrangement example) of transmit antennas 106 (referred to as Tx, for example) and receive antennas 202 (referred to as Rx, for example) according to arrangement example 4.

In the example illustrated in FIG. 15, number $N_{Tx}$ of transmit antennas is four (e.g., Tx #1, Tx #2, Tx #3, and Tx #4), and the number of receive antennas Na is four (e.g., Rx #1, Rx #2, Rx #3, and Rx #4).

In FIG. 15, the number of first transmit antennas 106-1 for the LR mode (e.g., LR antennas) is $N_{T1}=1$, and the number of second transmit antennas 106-2 for the SR mode (e.g., SR antennas) is $N_{T2}=3$. In FIG. 13, "LR1" denotes the LR antenna, "SR1," "SR2," and "SR3" denote the SR antennas.

In FIG. 15, for example, SR antennas for beam synthesis using SR antennas Tx #2 (SR1) and Tx #3 (SR2) are represented as "$SR_{bf1}$," and SR antennas for beam synthesis using Tx #3 (SR2) and Tx #4 (SR3) are represented as "$SR_{bf2}$." In other words, arrangement example 4 differs from arrangement examples 1 to 3 in that there are a plurality of beams for synthesis using the SR antennas.

The MIMO antenna arrangement illustrated in FIG. 15 satisfies (Condition 1) and (Condition 2), for example. When there are a plurality of phase centers of SR antennas for beam synthesis (e.g., $SR_{bf1}$ and $SR_{bf2}$) in arrangement example 4 as illustrated in FIG. 15, the arrangement may be such that at least one of $SR_{bf1}$ and $SR_{bf2}$ satisfies (Condition 1). In the example illustrated in FIG. 15, SR antennas $SR_{bf1}$ for beam synthesis satisfy (Condition 1).

(Condition 1)

By way of example, a description will be given of a case where $dT_{LR1,SR1}=1.75\lambda$, $dT_{LR1,SR2}=2.25\lambda$, $dT_{LR1,SR3}=2.75\lambda$, $dR_{1,2}=2.5\lambda$, $dR_{2,3}=2.5\lambda$, and $dR_{3,4}=1.5\lambda$ in FIG. 15. In this instance, since the phase center with respect to Tx #2 (SR1) and Tx #3 (SR2) (e.g., the phase center of $SR_{bf1}$) is the midpoint between Tx #2 (SR1) and Tx #3 (SR2), $dT_{LR1,SRbf1}=2\lambda$. In addition, since the phase center with respect to Tx #3 (SR2) and Tx #4 (SR3) (e.g., the phase center of $SR_{bf2}$) is the midpoint between Tx #3 (SR2) and Tx #4 (SR3), $dT_{LR1,SRbf2}=2.5\lambda$.

Thus, in FIG. 15, $|dT_{LR1,SRbf1}-dR_{1,2}|=\lambda/2$, $|dT_{LR1,SRbf1}-dR_{2,3}|=\lambda/2$, $|dT_{LR1,SRbf1}-dR_{3,4}|=\lambda/2$, $|dT_{LR1,SRbf2}-dR_{1,2}|=0$, $|dT_{LR1,SRbf2}-dR_{2,3}|=0$, and $|dT_{LR1,SRbf2}-dR_{3,4}|=\lambda$. Here, $\lambda$ represents the wavelength of the carrier frequency of the radar transmission signal. When a chirp signal is used as the radar transmission signal, $\lambda$ is the wavelength of the center frequency in the frequency sweep band of the chirp signal.

In the antenna arrangement illustrated in FIG. 15, in the direction estimation for the LR mode (LR-DOA), the absolute values of the differences between, on the one hand, spacing $dT_{LR1,SRbf1}$ between the phase center of SR antennas $SR_{bf1}$ for beam synthesis using Tx #2 (SR1) and Tx #3 (SR2) and LR antenna Tx #1 (LR1) and, on the other hand, receive antenna spacings $dR_{1,2}$, $dR_{2,3}$, and $dR_{3,4}$ are $|dT_{LR1,SRbf1}-dR_{1,2}|=|dT_{LR1,SRbf1}-dR_{2,3}|=|dT_{LR1,SRbf1}-dR_{3,4}|=\lambda/2$, and thus, (Condition 1) in the case of DA=$\lambda/2$ is satisfied.

On the other hand, in the antenna arrangement illustrated in FIG. 15, in the direction estimation for the LR mode (LR-DOA), the absolute values of the differences between, on the one hand, spacing $dT_{LR1,SRbf2}$ between the phase center of SR-mode transmit antennas $SR_{bf2}$ for beam synthesis using Tx #(SR2) and Tx #4 (SR3) and LR antenna Tx #1 (LR1) and, on the other hand, the receive antenna spacings are $|dT_{LR1,SRbf2}-dR_{1,2}|=0$, $|dT_{LR1,SRbf2}-dR_{2,3}|=0$, and $|dT_{LR1,SRbf2}-dR_{3,4}|=\lambda$, and thus, (Condition 1) is not satisfied.

(Condition 2)

In FIG. 15, the element spacings between receive antennas Rx are $dR_{1,2}=2.5\lambda$, $dR_{2,3}=2.5\lambda$, and $dR_{3,4}=1.5\lambda$, and are wider than aperture length $A_{SR}$ between the SR antennas arranged at minimum transmit antenna spacing $D_{TxMIN}=\lambda/2$. For example, in FIG. 15, $A_{SR}=|dT_{LR1,SR3}-dT_{LR1,SR1}|=\lambda$, and each of $dR_{1,2}$, $dR_{2,3}$, and $dR_{3,4}$ is wider than aperture length $A_{SR}$ between the SR antennas ($dR_{1,2}$, $dR_{2,3}$, $dR_{3,4}>A_{SR}$), and, (Condition 2) is thus satisfied.

Note that, although the arrangement of three SR antennas Tx #2 to Tx #4 (SR3) has been described with reference to FIG. 15, the arrangement is not limited to this, and four or more SR antennas may be arranged. In addition, in FIG. 15, three SR antennas Tx #2 (SR1), Tx #3 (SR2), and Tx #4 (SR3) are arranged at minimum transmit antenna spacings $D_{TxMIN}$ and with aperture length $A_{SR}=2D_{TxMIN}$ between the SR antennas, but the present disclosure is not limited thereto, and when $N_{SR}$ SR antennas ($N_{SR}$ is 2 or above) are arranged side by side at minimum transmit antenna spacing $D_{TxMIN}$, aperture length $A_{SR}$ between the SR antennas may be $(N_{SR}-1)D_{TxMIN}$.

Figure 16:
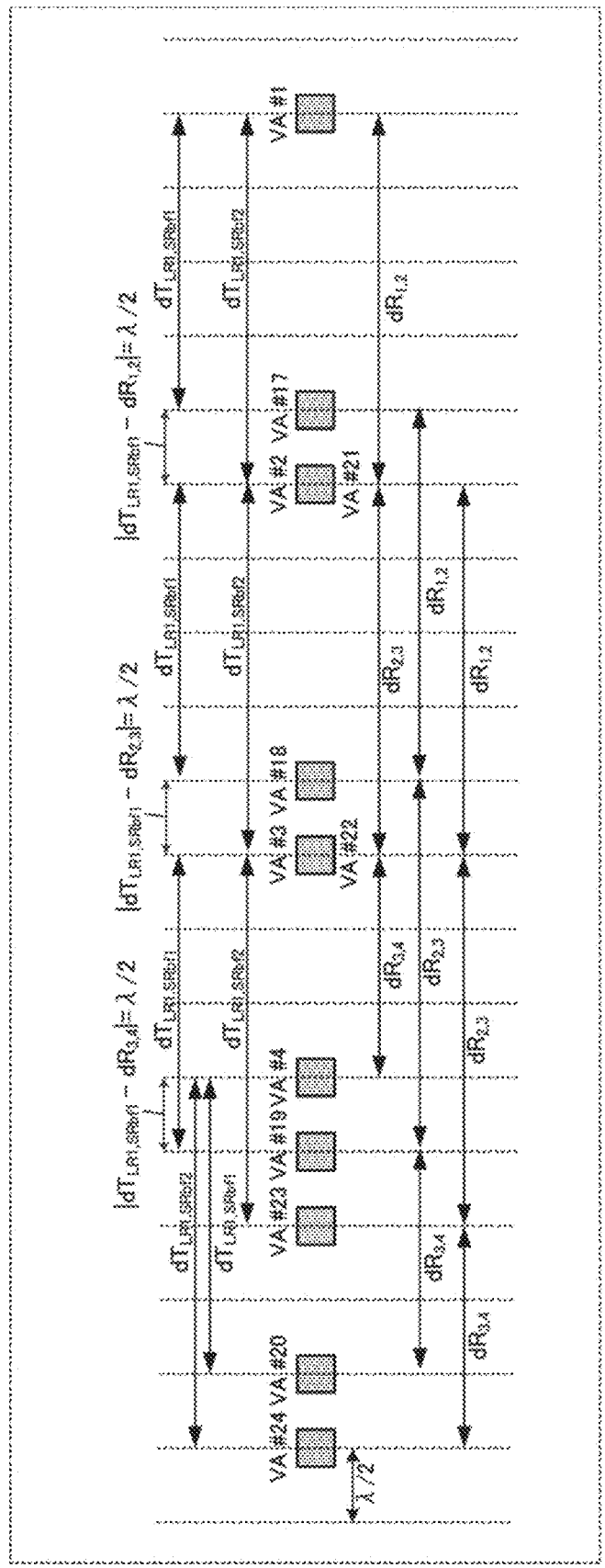
FIG. 16 illustrates an example of a virtual receive antenna arrangement according to arrangement example 4.

FIG. 16 illustrate an arrangement example of an LR virtual receive array obtained by the antenna arrangement illustrated in FIG. 15.

Here, the arrangement of the virtual receive array may be expressed by Expression 32, for example, based on the positions of transmit antennas 106 constituting the transmit array antenna (e.g., the positions of the feeding points) and the positions of receive antennas 202 constituting the receive array antenna (e.g., the positions of the feeding points).

Further, in the arrangement of the virtual receive array illustrated in FIG. 16, VA #17 to VA #20 indicate an arrangement of virtual receive antennas that is obtained in a case where SR antennas $SR_{bf1}$ for beam synthesis are regarded as new transmit antenna Tx #5 and the phase center of the SR antenna group for beam synthesis (the phase center of $SR_{bf1}$) is regarded as the position coordinates of antenna Tx #5 in Expression 32. In other words, VA #17 to VA #20 are configured based on Tx #5 and Rx #1 to Rx #4.

Likewise, in the arrangement of the virtual receive array illustrated in FIG. 16, VA #21 to VA #24 indicate an arrangement of virtual receive antennas that is obtained in a case where SR antennas $SR_{bf2}$ for beam synthesis are regarded as new transmit antenna Tx #6 and the phase center of the SR antenna group for beam synthesis (the phase center of $SR_{bf2}$) is regarded as the position coordinates of antenna Tx #6 in Expression 32. In other words, VA #21 to VA #24 are configured based on Tx #6 and Rx #1 to Rx #4. Note that the arrangements of VA #3 and VA #22 overlap each other in FIG. 16. The arrangements of VA #2 and VA #21 also overlap each other.

(Arrangement of Virtual Receive Antennas Used for Direction Estimation for LR Mode (LR-DOA))

Virtual receive antennas used for LR-DOA are configured based on the SR antenna groups for beam synthesis, the LR antenna, and the receive antennas. For example, virtual receive antennas VA #1 to VA #4, VA #17 to VA #20, and VA #21 to VA #24 illustrated in FIG. 16 are configured based on SR antennas $SR_{bf1}$ (or Tx #5) for beam synthesis, SR antennas $SR_{bf2}$ (or Tx #6) for beam synthesis, the LR antenna (e.g., Tx #1), and four receive antennas Rx #1 to Rx #4 in FIG. 15.

For example, when above-mentioned (Condition 1) is satisfied for at least one pair of SR antennas for beam synthesis, the arrangement of the virtual receive antennas illustrated in FIG. 16 includes virtual receive antennas the spacing between which is DA (DA=0.5λ in the case of FIG. 16). For example, the element spacing between VA #2 and VA #17 illustrated in FIG. 16 is $|dT_{LR1,SRbf1} - dR_{1,2}|$=DA=0.5λ, the element spacing between VA #3 and VA #18 is $|dT_{LR1,SRbf1} - dR_{2,3}|$=DA=0.5λ, and the element spacing between VA #4 and VA #19 is $|dT_{LR1,SRbf1} - dR_{3,4}|$=DA=0.5λ.

For example, in LR-DOA, when (Condition 1) that "at least one absolute value of the difference between, on the one hand, the spacing between the phase center of the SR antenna group ($SR_{bf1}$ or $SR_{bf2}$) for beam synthesis and the LR antenna and, on the other hand, the spacing between the receive antennas is DA=0.5λ to 0.8λ" is satisfied, radar apparatus 10 can suppress the generation of grating lobes in the range of from ±10 degrees to ±90 degrees, for example. Further, for example, radar apparatus 10 can suppress generation of grating lobes within the viewing angle by setting DA depending on the expected viewing angle in LR-DOA.

In addition, radar apparatus 10 transmits radar transmission signals using the LR antenna and a plurality of SR antennas (e.g., SR antennas for beam synthesis) in the LR mode. Thus, for example, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Radar apparatus 10 can thus improve the reception quality (e.g., SNR) during the direction estimation to increase the detection distance, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

The virtual receive antennas used for SR-DOA are configured based on the SR antennas and the receive antennas, for example. For example, virtual receive antennas VA #5 to VA #16 (not illustrated) are configured based on SR antennas Tx #2 (SR1), Tx #3 (SR2), and Tx #4 (SR3) and four receive antennas Rx #1 to Rx #4 in FIG. 15.

For example, when above-mentioned (Condition 2) is satisfied, the arrangement of the virtual receive antennas includes virtual receive antennas the spacing between which is $D_{TxMIN}$. In addition, in radar apparatus 10, when (Condition 2) is satisfied, there is no overlap between the virtual receive antennas in the virtual receive antenna arrangement for the SR mode and the aperture length in the virtual receive array can thus be extended.

Therefore, in SR-DOA, when (Condition 2) that "the element spacing between receive antennas Rx is wider than aperture length $A_{SR}$ of the antenna group whose antennas are arranged at transmit antenna spacing $D_{TxMIN}$, where transmit antenna spacing $D_{TxMIN}$ is 0.5λ to 0.8λ" is satisfied, radar apparatus 10 can suppress the generation of grating lobes, for example, in the range of ±10 degrees to ±90 degrees. Further, since the virtual receive antennas are arranged without overlap in the virtual receive antenna arrangement for SR mode, it is possible to expand the aperture length in the virtual receive array and to improve the angular resolution in radar apparatus 10.

(Arrangement of Virtual Receive Antennas Used in SR-DOA within Viewing Angle in LR Mode)

In SR-DOA, within the viewing angle in the LR mode, the virtual receive antennas may be configured, for example, based on the transmit antennas including the SR antennas and, additionally, the LR antenna. For example, virtual receive antennas VA #1 to VA #16 (partly not illustrated) are configured based on SR antennas Tx #2 (SR1), Tx #3 (SR2), and Tx #4 (SR3), LR antenna Tx #1 (LR1), and four receive antennas Rx #1 to Rx #4 in FIG. 15.

Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 4, radar apparatus 10 satisfies aforementioned (Condition 1) and (Condition 2), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Arrangement example 4 has been described above.

Note that above arrangement examples 1 to 4 have been described in relation to the case where the number of SR antennas used for beam synthesis is two, but the present disclosure is not limited to this case, and beam synthesis may be performed using three or more SR antennas, for example.

Note also that, arrangement examples 1 to 4 have been described in relation to the arrangement example in which all the SR antennas are used for beam synthesis, but the present disclosure is not limited to this example, and for example, an SR antenna which is not used for beam synthesis may be included. In other words, a plurality of SR antennas that radar apparatus 10 includes may partly be used for beam synthesis.

Figure 17:
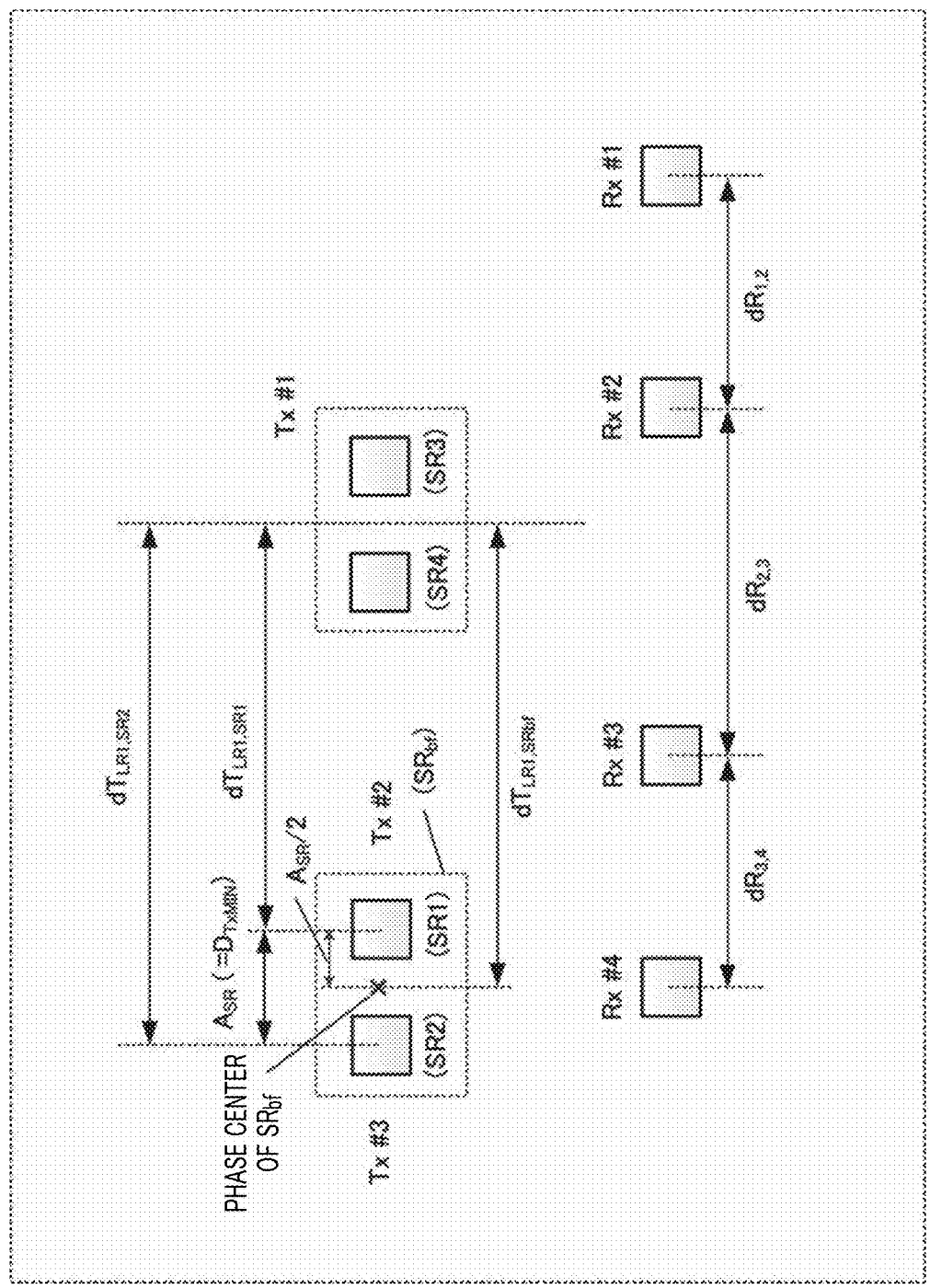
FIG. 17 illustrates another example of the antenna arrangement according to arrangement example 2.

Further, arrangement examples 1 to 4 have been described in relation to the case where the LR antenna of an element size different from that of the SR antennas (e.g., FIG. 6) is used, but the present disclosure is not limited thereto, and radar apparatus 10 may use a plurality of SR antennas instead of the LR antenna, for example. For example, FIG. 17 illustrates an example in which Tx #1 is configured using a plurality of SR antennas (e.g., SR3 and SR4) instead of the LR antenna in arrangement example 2 (FIG. 8). In FIG. 17, for example, radar apparatus 10 may perform array transmission (or beamforming transmission) using a plurality of SR antennas (e.g., SR3 and SR4) in transmission from Tx #1. In other words, in the LR mode, radar apparatus 10 may, for example, use Tx #1 and SR antennas $SR_{bf}$ for beam synthesis, and in the SR mode, may, for example, use SR1, SR2, SR3, and SR4. Note that $N_{CM} < N_{Tx}$ in the case of FIG. 17.

Arrangement Example 5

Arrangement examples 1 to 4 have been described in which the SR antennas used for beam synthesis are arranged in the horizontal direction. Arrangement example 5 will be described in relation to an example in which SR antennas used for beam synthesis are arranged, for example, in a direction oblique to the horizontal direction.

Figure 18:
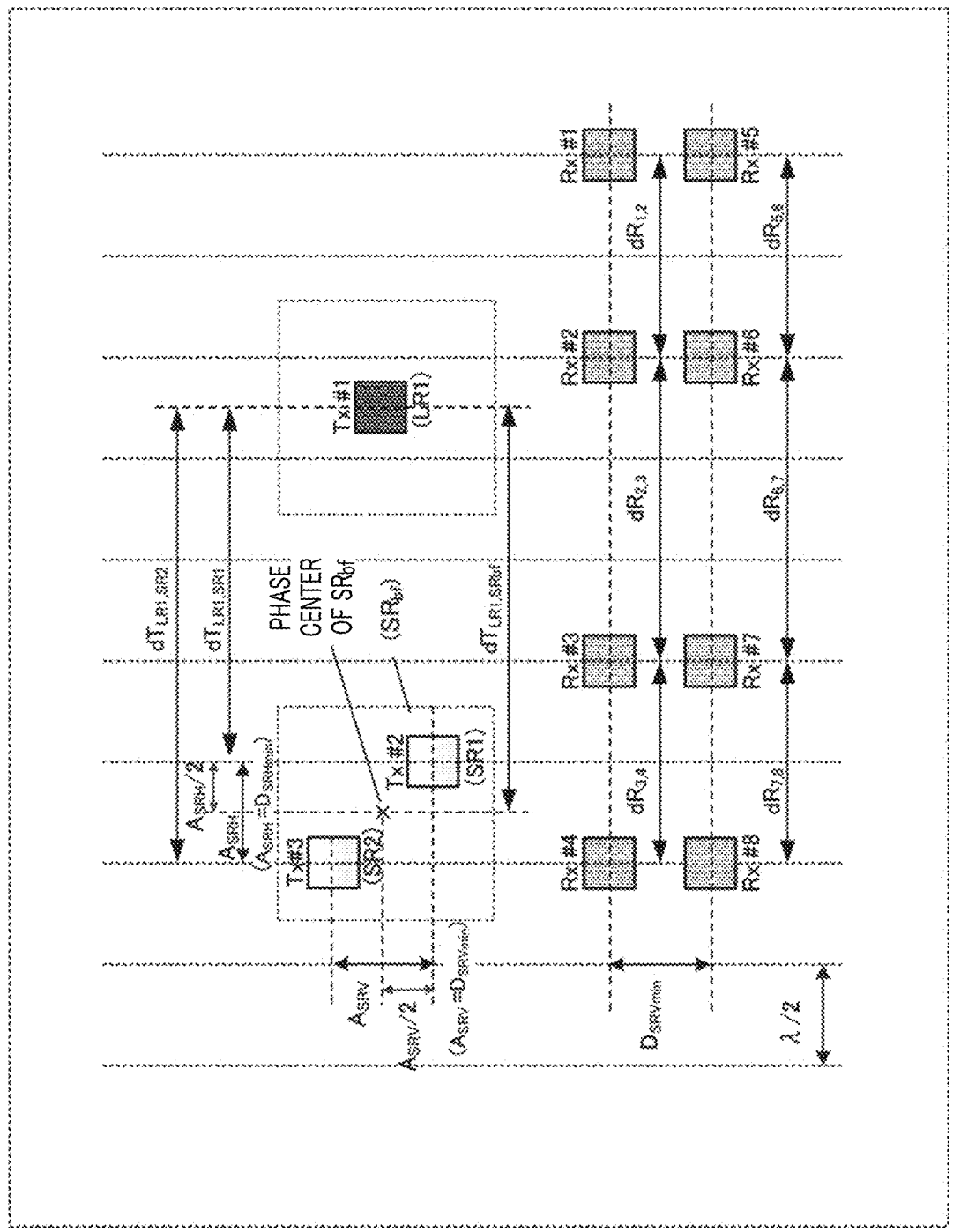
FIG. 18 illustrates an example of an antenna arrangement according to arrangement example 5.

FIG. 18 illustrates an arrangement example (for example, a MIMO antenna arrangement example) of transmit antennas 106 (referred to as Tx, for example) and receive antennas 202 (referred to as Rx, for example) according to arrangement example 5.

In the example illustrated in FIG. 18, number $N_{Tx}$ of transmit antennas is three (e.g., Tx #1, Tx #2, and Tx #3), and the number of receive antennas Na is eight (e.g., Rx #1 to Rx #8).

In FIG. 18, the number of first transmit antennas 106-1 for the LR mode (e.g., LR antennas) is $N_{T1}=1$, and the number of second transmit antennas 106-2 for the SR mode (e.g., SR antennas) is $N_{T2}=2$. In FIG. 18, "LR1" denotes the LR antenna, "SR1" and "SR2" denote the SR antennas.

The MIMO antenna arrangement illustrated in FIG. 18 satisfies, for example, (Condition 1). The MIMO antenna arrangement illustrated in FIG. 18 satisfies following (Condition 3) instead of (Condition 2), for example.

(Condition 3)

With respect to minimum horizontal spacing $D_{SRHmin}$ between the SR antennas arranged in a direction oblique to the horizontal direction and minimum vertical spacing $D_{SRVmin}$ between the SR antennas arranged in the direction oblique to the horizontal direction, the antennas are arranged such that the element spacing between receive antennas Rx in the horizontal direction is wider than horizontal aperture length $A_{SRH}$ between the SR antennas arranged side by side at minimum horizontal spacing $D_{SRHmin}$ between the SR antennas, and the element spacing between receive antennas Rx in the vertical direction is minimum vertical spacing $D_{SRVmin}$ between the SR antennas.

Here, $D_{SRHmin}$ may be about 0.5λ to 0.8λ, and $D_{SRVmin}$ may be about 0.5λ to 0.8λ.

In an antenna arrangement satisfying above (Condition 3), a virtual receive antenna arrangement used, for example, for the direction estimation for the SR mode (SR-DOA) includes at least one horizontal spacing of $D_{SRHmin}$ and at least one vertical spacing of $D_{SRVmin}$ between virtual receive antennas. In addition, in the antenna arrangement satisfying (Condition 3), there is no overlap between the virtual receive antennas in the horizontal direction and the vertical direction, for example, in the SR virtual receive antenna arrangement, so that the aperture length between the virtual receive antennas can be extended.

For example, $D_{SRHmin}$ may be about 0.5λ to 0.8λ. It is thus possible to suppress the generation of grating lobes in the range of from ±10 degrees to ±90 degrees in the horizontal direction. Similarly, $D_{SRVmin}$ may be about 0.5λ to 0.8λ, for example. It is thus possible for radar apparatus 10 to suppress the generation of grating lobes in the range of from ±10 degrees to ±90 degrees in the vertical direction.

For example, in the horizontal direction of the antenna arrangement illustrated in FIG. 18, (Condition 1) is satisfied as described below.

By way of example, $dT_{LR1,SR1}=1.75λ$ and $dT_{LR1,SR2}$ is 2.25λ in the horizontal direction in FIG. 18. In this instance, since the phase center with respect to, for example, Tx #2 (SR1) and Tx #3 (SR2) (e.g., the phase center of $SR_{bf}$) in the horizontal direction is the midpoint between Tx #2 (SR1) and Tx #3 (SR2) in FIG. 18, $dT_{LR1,SRbf}=2λ$.

Further, in FIG. 18, the phase center with respect to, for example, Tx #2 (SR1) and Tx #3 (SR2) (e.g., the phase center of $SR_{bf}$) in the vertical direction is the midpoint of vertical aperture length $A_{SRV}$ between the SR antennas arranged at minimum spacing $D_{SRVmin}$, and the midpoint may coincide with the vertical position of the LR antenna (Tx #1 (LR1) illustrated in FIG. 18).

Further, in the horizontal direction of the antenna arrangement illustrated in FIG. 18, $dR_{1,2}=λ$, $dR_{2,3}=1.5λ$, $dR_{3,4}=λ$, $dR_{5,6}=λ$, $dR_{6,7}=1.5λ$, and $dR_{7,8}=λ$.

Thus, in FIG. 18, $|dT_{LR1,SRbf}-dR_{1,2}|=λ$, $|dT_{LR1,SRbf}-dR_{2,3}|=λ/2$, $|dT_{LR1,SRbf}-dR_{3,4}|=λ$, $|dT_{LR1,SRbf}-dR_{5,6}|=λ$, $|dT_{LR1,SRbf}-dR_{6,7}|=λ/2$, and $|dT_{LR1,SRbf}-dR_{7,8}|=λ$. Here, λ represents the wavelength of the carrier frequency of the radar transmission signal. When a chirp signal is used as the radar transmission signal, λ is the wavelength of the center frequency in the frequency sweep band of the chirp signal.

Accordingly, in the horizontal antenna arrangement illustrated in FIG. 18, in the direction estimation for the LR mode (LR-DOA), the absolute values of the differences between, on the one hand, spacing $dT_{LR1,SRbf}$ between the phase center of SR antennas $SR_{bf}$ for beam synthesis using Tx #2 (SR1) and Tx #3 (SR2) and LR antenna Tx #1 (LR1) and, on the other hand, receive antenna spacings $dR_{2,3}$ and $dR_{6,7}$ are $|dT_{LR1,SRbf}-dR_{2,3}|$ and $|dT_{LR1,SRbf}-dR_{6,7}|=λ/2$, and thus, (Condition 1) in the case of DA=λ2 is satisfied.

Further, for example, the antenna arrangement illustrated in FIG. 18 satisfies (Condition 3) as described below.

For example, in FIG. 18, SR antennas Tx #2 (SR1) and Tx #3 (SR2) are arranged in the direction oblique to the horizontal direction. In other words, SR antennas Tx #2 (SR1) and Tx #3 (SR2) may be arranged at positions where the SR antennas do not overlap each other in both of the horizontal direction and the vertical direction. In FIG. 18, minimum horizontal spacing $D_{SRHmin}$ between SR antennas Tx #2 (SR1) and Tx #3 (SR2) is λ/2, and minimum vertical spacing $D_{SRVmin}$ between SR antennas Tx #2 (SR1) and Tx #3 (SR2) is λ/2, for example.

Note that, although two SR antennas Tx #2 (SR1) and Tx #3 (SR2) are arranged in the direction oblique to the horizontal direction in FIG. 18, the present disclosure is not limited to this, and three or more SR antennas may be arranged. Further, although two SR antennas are arranged in the direction oblique to the horizontal direction at minimum horizontal spacing $D_{SRHmin}$ with horizontal aperture length $A_{SRH}=D_{SRHmin}$ in FIG. 18, the present disclosure is not limited to this, and for example, when three SR antennas are arranged side by side in a direction oblique to the horizontal direction at minimum horizontal spacing $D_{SRHmin}$, horizontal aperture length $A_{SRH}$ may be $2D_{SRHmin}$. For example, when $N_{SR}$ ($N_{SR}$ is 2 or more) SR antennas are arranged side by side in a direction oblique to the horizontal direction at minimum horizontal spacing $D_{SRHmin}$, horizontal aperture length $A_{SRH}$ may be $(N_{SR}-1)D_{SRHmin}$.

In FIG. 18, the receive antennas are arranged such that the spacings (e.g., $dR_{1,2}=\lambda$, $dR_{2,3}=1.5\lambda$, $dR_{3,4}=\lambda$, $dR_{5,6}=\lambda$, $dR_{6,7}=1.5\lambda$, $dR_{7,8}=\lambda$) between adjacent elements (in other words, receive antennas) of receive antennas Rx, for example, in the horizontal direction are wider than aperture length $A_{SRH}=\lambda/2$ between SR antennas Tx #2 (SR1) and Tx #3 (SR2) among a plurality of SR antennas which are arranged side by side at minimum horizontal spacing $D_{SRHmin}=\lambda/2$ (e.g., $dR_{1,2}$, $dR_{2,3}$, $dR_{3,4}$, $dR_{5,6}$, $dR_{6,7}$, and $dR_{7,8}>A_{SRH}$).

Further, in FIG. 18, the adjacent elements (in other words, receive antennas) of receive antennas Rx, for example, in the vertical direction are arranged at minimum vertical spacing $D_{SRVmin}$ between SR antennas=$\lambda/2$. As illustrated in FIG. 18, vertical element spacings $dR_{1,5}$, $dR_{2,6}$, $dR_{3,7}$, and $dR_{4,8}$ between receive antennas Rx are minimum spacing $D_{SRVmin}=\lambda/2$.

Thus, the antenna arrangement illustrated in FIG. 18 satisfies (Condition 3).

Note that, although FIG. 18 illustrates the arrangement in which two elements of SR antennas arranged in the direction oblique to the horizontal direction are used as the SR antennas used for beam synthesis, the arrangement is not limited thereto, and radar apparatus 10 may use three or more elements of SR antennas.

Here, the LR antenna may, for example, yield a higher gain by narrower antenna directivity than the directivity of the SR antennas. Therefore, for example, as illustrated in FIGS. 6A and 6B, width $W_{LR}$ of the LR antenna may be greater than width $W_{SR}$ of the SR antennas. For example, when radar apparatus 10 performs transmission beam synthesis using two SR antennas, radar apparatus 10 can form the same directivity between the LR antenna and the two SR antennas by using the LR antenna for which $W_{LR} \approx 2W_{SR}$ holds true as illustrated in FIGS. 6A and 6B.

Likewise, radar apparatus 10 may perform transmission beam synthesis using three SR antennas, for example. In this instance, it is possible to form the directivity the same between the LR antenna and the three SR antennas, for example, by using the LR antenna and the SR antennas for which $W_{LR} \approx 3W_{SR}$ holds true.

Likewise, radar apparatus 10 may, for example, perform transmission beam synthesis using Nsr SR antennas. In this instance, it is possible to form the directivity the same between the LR antenna and the Nsr SR antennas, for example, by using the LR antenna and the SR antennas for which $W_{LR} \approx Nsr \times W_{SR}$ holds true.

Further, the arrangement of the transmit antennas constituting the transmit array antenna may be an arrangement in which the antennas do not overlap in the vertical direction, for example, as illustrated in FIG. 18. With this arrangement, the vertical size of the antennas constituting the transmit array antenna may be any size, for example. For example, considering that the LR antenna and the SR antenna are used in combination in SR-DOA and LR-DOA, height $H_{LR}$ of the LR antenna and height $H_{SR}$ of the SR antennas may be approximately the same as each other ($H_{LR} \approx H_{SR}$).

Figures 19A, 19B, 19C:
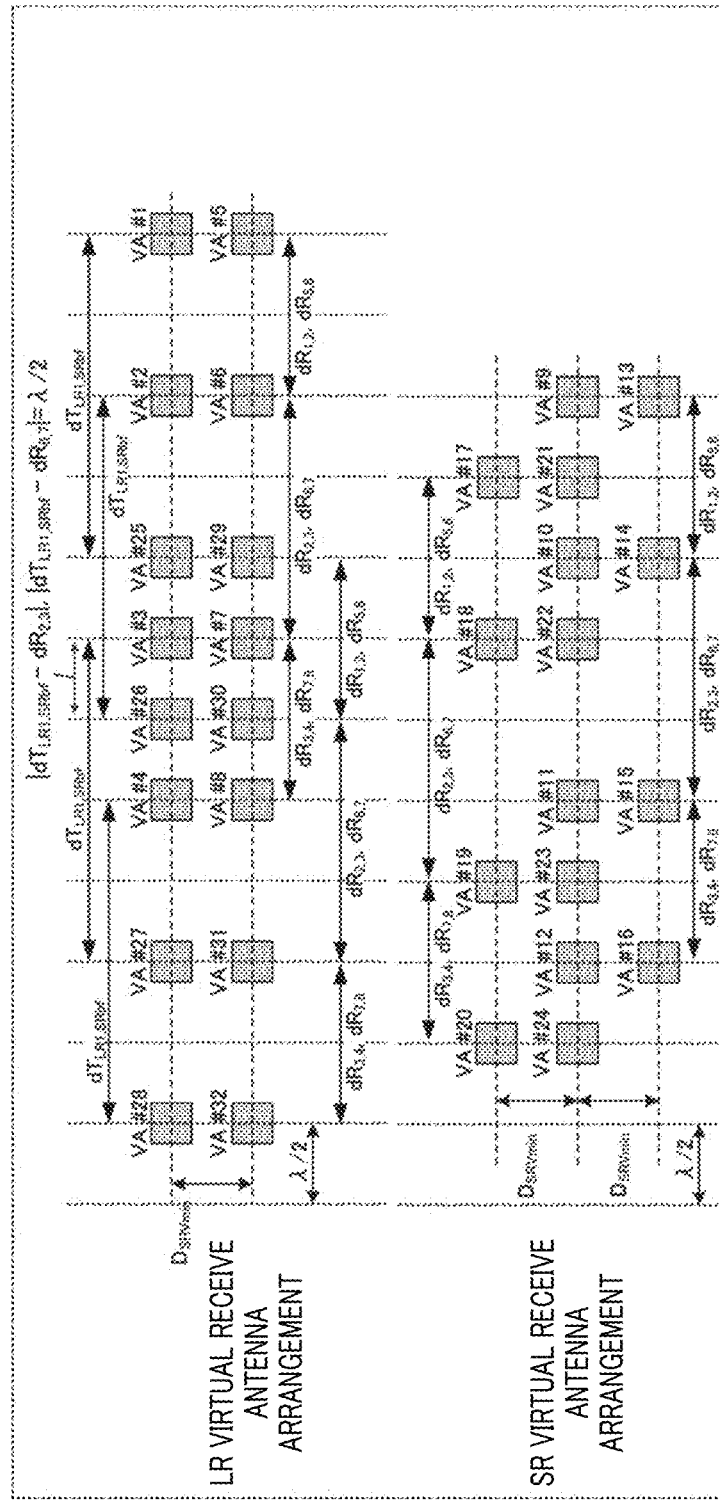
FIGS. 19A, 19B, and 19C illustrate examples of a virtual receive antenna arrangement according to arrangement example 5.

FIGS. 19A, 19B, and 19C illustrate arrangement examples of a virtual receive array obtained by the antenna arrangement illustrated in FIG. 18.

Here, the arrangement of the virtual receive array may be expressed by Expression 32, for example, based on the positions of transmit antennas 106 constituting the transmit array antenna (e.g., the positions of the feeding points) and the positions of receive antennas 202 constituting the receive array antenna (e.g., the positions of the feeding points).

Further, in arrangements of the virtual receive array obtainable by the antenna arrangement illustrated in FIG. 18, VA #25 to VA #32 indicate an arrangement of virtual receive antennas that is obtainable in a case where the SR antennas for beam synthesis (e.g., $SR_{bf}$) are regarded as new transmit antenna "Tx #4" and the phase center of the SR antenna group for beam synthesis (the phase center of $SR_{bf}$) is regarded as the position coordinates of antenna Tx #4 in Expression 32. In other words, VA #25 to VA #32 are configured based on Tx #4 and Rx #1 to Rx #8.

(Arrangement of Virtual Receive Antennas Used for Direction Estimation for LR Mode (LR-DOA))

FIG. 19A illustrates an arrangement of the virtual receive antennas used for LR-DOA.

Virtual receive antennas used for LR-DOA are configured based on the SR antennas for beam synthesis, the LR antenna, and the receive antennas. For example, the virtual receive antennas (VA #1 to VA #8 and VA #25 to VA #32) illustrated in FIG. 19A are configured based on the SR antennas for beam synthesis (e.g., $SR_{bf}$ or Tx #4), the LR antenna (e.g., Tx #1), and eight receive antennas Rx #1 to Rx #8 illustrated in FIG. 18.

For example, when aforementioned (Condition 1) is satisfied in the horizontal antenna arrangement illustrated in FIG. 18, the arrangement of the virtual receive antennas illustrated in FIG. 19A includes virtual receive antennas the horizontal spacing between which is DA (e.g., DA=$\lambda/2$). For example, the element spacing between VA #3 and VA #26 illustrated in FIG. 19A is $|dT_{LR1,SRbf}-dR_{2,3}|=DA=0.5\lambda$, and the element spacing between VA #7 and VA #30 is $|dT_{LR1,SRbf}-dR_{6,7}|=DA=0.5\lambda$.

For example, in LR-DOA, when (Condition 1) that "at least one absolute value of the difference between, on the one hand, the spacing between the phase center of the SR antenna group ($SR_{bf}$) for beam synthesis and the LR antenna and, on the other hand, the spacing between the receive antennas is DA=$0.5\lambda$ to $0.8\lambda$" is satisfied, radar apparatus 10 can suppress the generation of grating lobes in the range of from ±10 degrees to ±90 degrees. Further, for example, radar apparatus 10 can suppress generation of grating lobes within the viewing angle by setting DA based on the expected viewing angle in LR-DOA.

In addition, radar apparatus 10 transmits radar transmission signals using the LR antenna and a plurality of SR antennas (e.g., SR antennas for beam synthesis) in the LR mode. Thus, for example, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Radar apparatus 10 can thus improve the reception quality (e.g., SNR) during the direction estimation to increase the detection distance, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

FIG. 19B illustrates an arrangement of virtual receive antennas used for SR-DOA.

The virtual receive antennas used for SR-DOA are configured based on the SR antennas and the receive antennas, for example. For example, the virtual receive antennas (VA #9 to VA #24) illustrated in FIG. 19B are configured based on SR antennas Tx #2 (SR1) and Tx #3 (SR2) and eight receive antennas Rx #1 to Rx #8 illustrated in FIG. 18.

For example, when above (Condition 3) is satisfied, the arrangement of the virtual receive antennas illustrated in FIG. 19B includes virtual receive antennas the horizontal spacing between which is $D_{SRHmin}$, and includes virtual receive antennas the vertical spacing between which is $D_{SRVmin}$. For example, each of the element spacings between VA #9 and VA #21, VA #10 and VA #22, VA #11 and VA #23, and VA #12 and VA #24 illustrated in FIG. 19B is $D_{SRHmin}$. For example, each of the element spacings of VA #9 and VA #13, VA #17 and VA #21, VA #10 and VA #14, and VA #18 and VA #22 illustrated in FIG. 19B is $D_{SRVmin}$.

In addition, in radar apparatus 10, when (Condition 3) is satisfied, there is no overlap between the virtual receive antennas in the virtual receive antenna arrangement for the SR mode illustrated in FIG. 19B and the aperture length in the virtual receive array can thus be extended.

Therefore, in SR-DOA, radar apparatus 10 can suppress the generation of grating lobes in the range of from ±10 degrees to ±90 degrees in the horizontal direction by "setting transmit antenna spacing $D_{SRHmin}$, to about 0.5λ to 0.8κ," for example. Further, in SR-DOA, radar apparatus 10 can suppress the generation of grating lobes in the range of from ±10 degrees to ±90 degrees in the vertical direction by "setting transmit antenna spacing $D_{SRVmin}$ to about 0.5λ to 0.8λ," for example. In addition, for example, radar apparatus 10 can suppress the generation of grating lobes within the viewing angle by setting $D_{SRHmin}$ and $D_{SRVmin}$ based on the viewing angle expected in SR-DOA. Further, since there is no overlap between the virtual receive antennas in the SR virtual antenna arrangement and the aperture length in the virtual receive array can be enlarged, radar apparatus 10 can improve the angular resolution.

(Arrangement of Virtual Receive Antennas Used in SR-DOA within Viewing Angle in LR Mode)

FIG. 19C illustrates an arrangement of virtual receive antennas used for SR-DOA within the viewing angle (FOV) in the LR mode.

In SR-DOA, within the viewing angle in the LR mode, the virtual receive antennas may be configured, for example, based on the transmit antennas including the SR antennas and, additionally, the LR antenna. For example, the virtual receive antennas (VA #1 to VA #24) illustrated in FIG. 19C are configured based on SR antennas Tx #2 (SR1) and Tx #3 (SR2), LR antenna Tx #1 (LR1), and eight receive antennas Rx #1 to Rx #8 illustrated in FIG. 18.

As is understood, in the SR mode, radar apparatus 10 transmits the radar transmission signals using the LR antenna and a plurality of SR antennas within the viewing angle in the LR mode. Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 5, radar apparatus 10 satisfies above-mentioned (Condition 1) and (Condition 3), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Further, according to arrangement example 5, the virtual receive antennas used for LR-DOA (e.g., FIG. 19A) and the virtual receive antennas used for SR-DOA (e.g., FIGS. 19B and 19C) include virtual receive antennas arranged horizontally and vertically differently from one another. It is thus possible for radar apparatus 10 to apply not only the horizontal direction estimation but also a direction estimation technique in two dimensions including the horizontal and vertical directions, for example. It is thus possible for radar apparatus 10 to detect the azimuth and elevation-angle directions of the target, for example, and to detect the height information of the target, for example.

Next, examples of a direction estimation result (computer simulation result) obtained when the antenna arrangement according to arrangement example 5 is applied will be described.

Figures 20A, 20B, 20C:
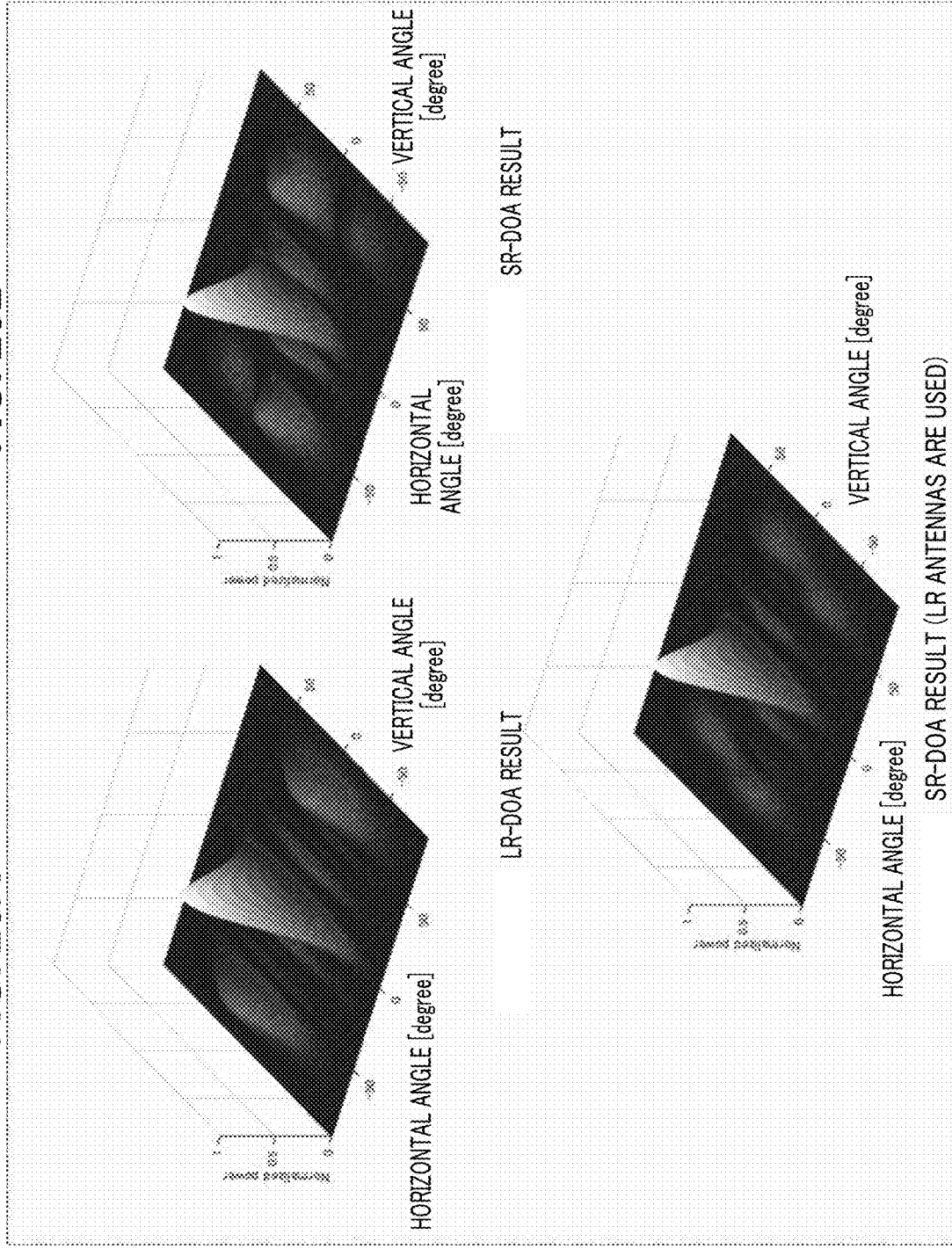
FIGS. 20A, 20B, and 20C illustrate examples of a direction estimation result according to arrangement example 5.

FIGS. 20A, 20B, and 20C illustrate examples of a direction estimation result (computer simulation result) obtained when the MIMO antenna arrangement of arrangement example 5 (for example, FIG. 18) is used and when the beamformer method is used as the direction-of-arrival estimation algorithm in direction estimator 214. FIGS. 20A, 20B, and 20C illustrate the examples of the direction estimation result, for example, in the case of DA=λ/2 and $D_{SRVmin} = D_{SRHmin} = \lambda/2$.

Note that, the directivity of each antenna element alone is not considered in FIGS. 20A, 20B, and 20C. Further, FIGS. 20A, 20B, and 20C illustrate examples of plotted outputs of the direction-of-arrival estimation evaluation function value within the range of ±90 degrees in the horizontal direction and within the range of ±90 degrees in the vertical direction, in which the true values of the target are an angle of 0 degrees in the horizontal direction and an angle of 0 degrees in the vertical direction.

FIG. 20A illustrates an example of the direction estimation result (LR-DOA) obtained in the LR virtual receive antenna arrangement (e.g., FIG. 19A) using the beamformer method. Note that, regarding the directivity direction resulting from the beam synthesis using the SR antennas, directivity at 0 degrees in the horizontal direction and at 0 degrees in the vertical direction was formed.

Further, FIG. 20B illustrates an example of the direction estimation result (SR-DOA) obtained in the SR virtual receive antenna arrangement (e.g., FIG. 19B) using the beamformer method.

FIG. 20C illustrates an example of the direction estimation result (SR-DOA within LR FOV) obtained in the SR virtual receive antenna arrangement within the viewing field in the LR mode (e.g., FIG. 19C) using the beamformer method.

From the results in the direction estimator illustrated respectively in FIGS. 20A, 20B, and 20C, it can be confirmed that the maximum peaks were obtained at the target true values (here, horizontal 0 degrees and vertical 0 degrees) and direction estimator 214 of radar apparatus 10 correctly estimated the target direction.

Further, $DA=\lambda/2$ and $D_{SRVmin}=D_{SRHmin}=\lambda/2$ in the MIMO antenna arrangement illustrated in FIG. 18, for example. Accordingly, as can be confirmed by the direction estimation results illustrated in FIGS. 20A, 20B, and 20C, radar apparatus 10 suppresses grating lobes within the ranges of ±90 degrees in the horizontal and vertical directions.

Further, for example, as illustrated in FIGS. 20A and 20B, it can be confirmed that the LR virtual receive antenna arrangement (e.g., FIG. 19A) has, because of its greater horizontal aperture length between the virtual receive antennas, a narrower and sharper peak in the target direction (e.g., the main lobe) than the SR virtual receive antenna arrangement (e.g., FIG. 19B), leading to higher horizontal angular resolution of radar apparatus 10. Further, it can be confirmed that the SR virtual receive antenna arrangement (e.g., FIG. 19B) has, because of its greater vertical aperture length between the virtual receive antennas, a narrower and sharper peak in the target direction (e.g., the main lobe) than the LR virtual receive antenna arrangement (e.g., FIG. 19A), leading to higher vertical angular resolution of radar apparatus 10.

Further, for example, FIG. 20C illustrates the direction estimation result obtained on the assumption that the direction of the horizontal 0 degrees and the vertical 0 degrees is within the viewing angle in the LR mode. Thus, as illustrated in FIGS. 20C and 20B, it can be confirmed that the virtual receive antenna arrangement including the LR antenna (e.g., FIG. 19C) has, because of its greater aperture length between the virtual receive antennas, a horizontally and vertically narrower and sharper peak in the target direction (e.g., the main lobe) than the SR virtual receive antenna arrangement (e.g., FIG. 19B), and accordingly has higher horizontal and vertical angular resolution.

Further, the number of virtual receive antennas is greater in the SR virtual receive antenna arrangement within the viewing angle in the LR mode (e.g., FIG. 19C) than in the LR virtual receive antenna arrangement (e.g., FIG. 19A). Thus, for example, as illustrated in FIGS. 20A and 20C, it can be confirmed that the peak levels of pseudo peaks occurring in directions different from the target direction (e.g., referred to as side lobes) are reduced more in the SR virtual receive antenna arrangement within the viewing angle in the LR mode than in the LR virtual receive antenna arrangement. When the peak levels of the pseudo peaks (e.g., side lobes) are reduced more, radar apparatus 10 can improve detection performance for a weaker target, for example.

Arrangement Example 6

Arrangement examples 1 to 4 have been described in which the SR antennas used for beam synthesis are arranged in the horizontal direction. Arrangement example 6 will be described in relation to an example in which the SR antennas used for beam synthesis are arranged, for example, at horizontally and vertically different positions (e.g., in a grid shape).

Figure 21:
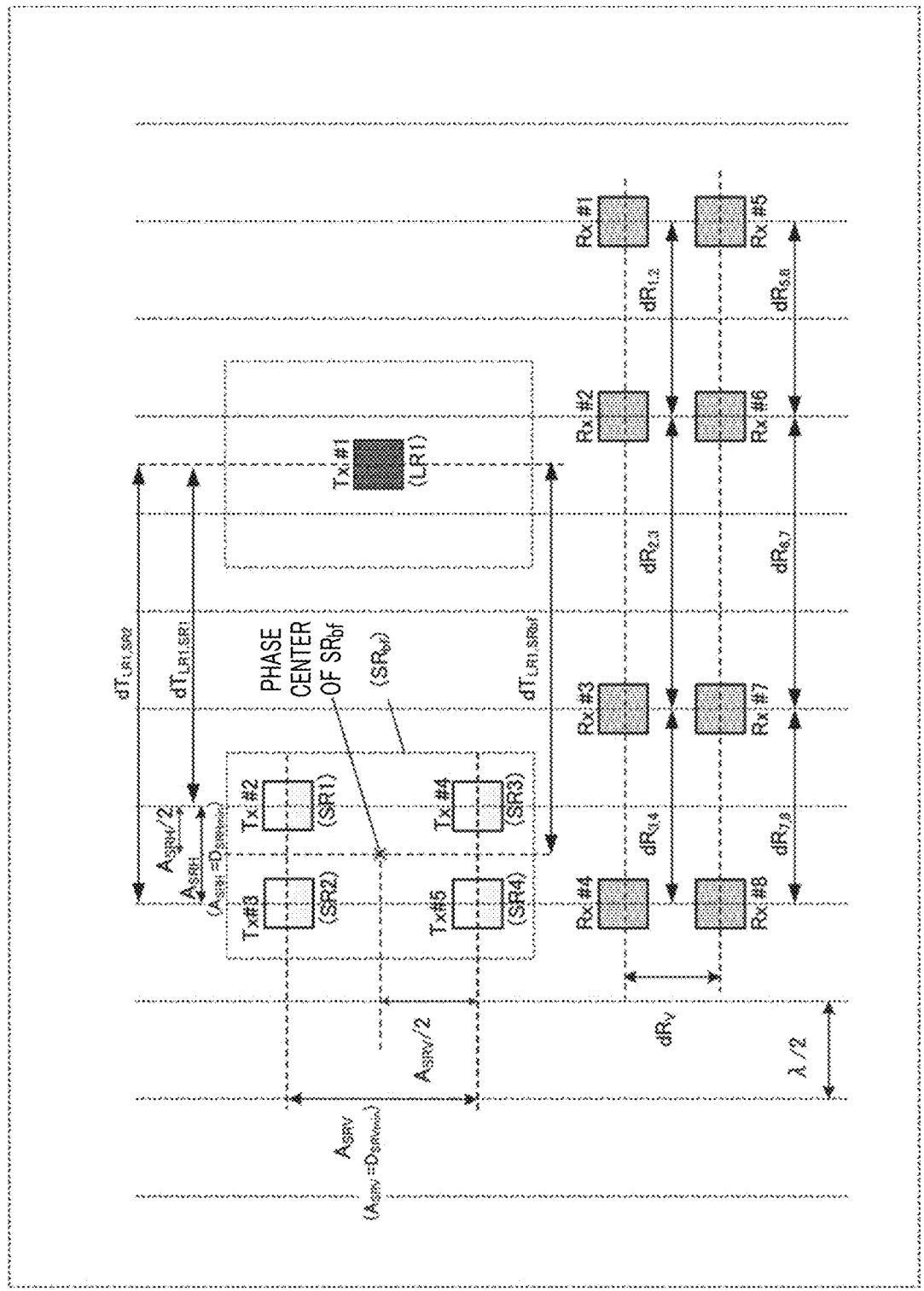
FIG. 21 illustrates an example of an antenna arrangement according to arrangement example 6.

FIG. 21 illustrates an arrangement example (for example, a MIMO antenna arrangement example) of transmit antennas 106 (referred to as Tx, for example) and receive antennas 202 (referred to as Rx, for example) according to arrangement example 6.

In the example illustrated in FIG. 21, number $N_{Tx}$ of transmit antennas is five (e.g., Tx #1 to Tx #5), and the number of receive antennas Na is eight (e.g., Rx #1 to Rx #8).

In FIG. 21, the number of first transmit antennas 106-1 for the LR mode (e.g., LR antennas) is $N_{T1}=1$, and the number of second transmit antennas 106-2 for the SR mode (e.g., SR antennas) is $N_{T2}=4$. In FIG. 21, "LR1" denotes the LR antenna, "SR1," "SR2," "SR3," and "SR4" denote the SR antennas.

The MIMO antenna arrangement illustrated in FIG. 21 satisfies, for example, (Condition 1). The MIMO antenna arrangement illustrated in FIG. 21 also satisfies below-described (Condition 4) instead of (Condition 2) and (Condition 3), for example.

(Condition 4)

With respect to minimum horizontal spacing $D_{SRHmin}$ between the SR antennas arranged in the horizontal direction and minimum vertical spacing $D_{SRVmin}$ between the SR antennas arranged in the vertical direction, the element spacing between receive antennas Rx in the horizontal direction is wider than horizontal aperture length $A_{SRH}$ between the SR antennas arranged side by side at minimum horizontal spacing $D_{SRHmin}$ between the SR antennas, and as for the element spacing between receive antennas Rx in the vertical direction, at least one absolute value of the difference between minimum vertical spacing $D_{SRVmin}$ between the SR antennas and the vertical element spacing between receive antennas Rx is about $DB=0.5\lambda$ to $0.8\lambda$ (in other words, a defined value based on the wavelength of the radar transmission signal).

Here, $D_{SRHmin}$ may be about $0.5\lambda$ to $0.8\lambda$. Note that, in arrangement example 6, the SR antenna elements may be designed in expectation of narrowing the directivity in the vertical direction, for example. For example, $D_{SRVmin}$ may be $\lambda$ or greater taking into consideration an increase in the element size in the vertical direction as illustrated in FIGS. 6A and 6B.

In an antenna arrangement satisfying above (Condition 4), a virtual receive antenna arrangement used, for example, for the direction estimation for the SR mode (SR-DOA) includes at least one horizontal spacing of $D_{SRHmin}$ and at least one vertical spacing of DB between virtual receive antennas. In addition, in the antenna arrangement satisfying (Condition 4), there is no overlap between the virtual receive antennas in the horizontal direction and the vertical direction, for example, in the SR virtual receive antenna arrangement, so that the aperture length between the virtual receive antennas can be extended.

Further, $D_{SRHmin}$ may be about $0.5\lambda$ to $0.8\lambda$. This allows radar apparatus 10 to suppress the generation of grating lobes in the range of from ±10 degrees to ±90 degrees in the horizontal direction. Further, DB may be about $0.5\lambda$ to $0.8\lambda$. This allows radar apparatus 10 to suppress the generation of grating lobes in the range of from ±10 degrees to ±90 degrees in the vertical direction.

For example, in the horizontal direction of the antenna arrangement illustrated in FIG. 21, (Condition 1) is satisfied as described below.

By way of example, $dT_{LR1,SR1}=1.75\lambda$ and $dT_{LR1,SR2}$ is $2.25\lambda$ in the horizontal direction in FIG. 21. In this instance, since the phase center with respect to, for example, Tx #2 (SR1) to Tx #5 (SR4) (e.g., the phase center of $SR_{bf}$) in the horizontal direction is the midpoint between Tx #2 (SR1) and Tx #3 (SR2) in FIG. 21, $dT_{LR1,SRbf}=2\lambda$.

In the vertical direction in FIG. 21, the phase center with respect to, for example, Tx #2 (SR1) to Tx #5 (SR4) (e.g., the phase center of $SR_{bf}$) in the vertical direction is the midpoint of vertical aperture length $A_{SRV}$ between the SR antennas arranged at minimum spacing $D_{SRVmin}$, and the midpoint may coincide with the vertical position of the LR antenna (Tx #1 (LR1) illustrated in FIG. 21).

Further, in the horizontal direction of the antenna arrangement illustrated in FIG. 21, $dR_{1,2}=\lambda$, $dR_{2,3}=1.5\lambda$, $dR_{3,4}=\lambda$, $dR_{5,6}=\lambda$, $dR_{6,7}=1.5\lambda$, and $dR_{7,8}=\lambda$.

Thus, in FIG. 21, $|dT_{LR1,SRbf}-dR_{1,2}|=\lambda$, $|dT_{LR1,SRbf}-dR_{2,3}|=\lambda/2$, $|dT_{LR1,SRbf}-dR_{3,4}|=\lambda$, $|dT_{LR1,SRbf}-dR_{5,6}|=\lambda$, $|dT_{LR1,SRbf}-dR_{6,7}|=\lambda/2$, and $|dT_{LR1,SRbf}-dR_{7,8}|=\lambda$. Here, $\lambda$ represents the wavelength of the carrier frequency of the radar transmission signal. When a chirp signal is used as the radar transmission signal, $\lambda$ is the wavelength of the center frequency in the frequency sweep band of the chirp signal.

Accordingly, in the horizontal antenna arrangement illustrated in FIG. 21, in the direction estimation for the LR mode (LR-DOA), the absolute values $|dT_{LR1,SRbf}-dR_{2,3}|$ and $|dT_{LR1,SRbf}-dR_{6,7}|$ of the differences between, on the one hand, spacing $dT_{LR1,SRbf}$ between the phase center of SR antennas $SR_{bf}$ for beam synthesis using Tx #2 (SR1) to Tx #5 (SR4) and LR antenna Tx #1 (LR1) and, on the other hand, receive antenna spacings $dR_{2,3}$, and $dR_{6,7}$ are $\lambda/2$, and thus, (Condition 1) in the case of $DA=\lambda/2$ is satisfied.

Further, for example, the antenna arrangement illustrated in FIG. 21 satisfies (Condition 4) as described below.

For example, in FIG. 21, minimum horizontal spacing $D_{SRHmin}$ between SR antennas Tx #2 (SR1) and Tx #3 (SR2) (or Tx #4 (SR3) and Tx #5 (SR4)) arranged in the horizontal direction is 22, and minimum vertical spacing $D_{SRVmin}$ between SR antennas Tx #2 (SR1) and Tx #4 (SR3) (or Tx #3 (SR2) and Tx #5 (SR4)) arranged in the vertical direction is $\lambda$.

In FIG. 21, the receive antennas are arranged such that the spacings (e.g., $dR_{1,2}=\lambda$, $dR_{2,3}=1.5\lambda$, $dR_{3,4}=\lambda$, $dR_{5,6}=\lambda$, $dR_{6,7}=1.5\lambda$, $dR_{7,8}=\lambda$) between adjacent elements (in other words, receive antennas) of receive antennas Rx, for example, in the horizontal direction are wider than horizontal aperture length $A_{SRH}=\lambda/2$ between SR antennas Tx #2 (SR1) and Tx #3 (SR2) among a plurality of SR antennas which are arranged side by side at minimum horizontal spacing $D_{SRHmin}=\lambda/2$ (e.g., $dR_{1,2}$, $dR_{2,3}$, $dR_{3,4}$, $dR_{5,6}$, $dR_{6,7}$, and $dR_{7,8} > A_{SRH}$).

Further, in FIG. 21, at least one absolute value (e.g., $|D_{SRVmin}-dR_V|=DB=\lambda/2$) of the difference between minimum vertical spacing $D_{SRVmin}=\lambda$ between the SR antennas and the vertical element spacing (e.g., $dR_{1,5}=\lambda/2$, $dR_{2,6}=\lambda/2$, $dR_{3,7}=\lambda/2$, $dR_{4,8}=\lambda/2$) between receive antennas Rx is about $0.5\lambda$ to $0.8\lambda$, for example, in the vertical direction.

Thus, the antenna arrangement illustrated in FIG. 21 satisfies (Condition 4).

Note that, although FIG. 21 illustrates the arrangement in which two elements of SR antennas arranged in the horizontal direction are used as the SR antennas used for beam synthesis, the arrangement is not limited thereto, and radar apparatus 10 may use three or more elements of SR antennas. Likewise, although FIG. 21 illustrates the arrangement in which two elements of SR antennas arranged in the vertical direction are used as the SR antennas used for beam synthesis, the arrangement is not limited thereto, and radar apparatus 10 may use three or more elements of SR antennas.

Note that, SR antennas Tx #2 (SR1) and Tx #3 (SR2) are arranged in the horizontal direction at minimum horizontal spacing $D_{SRHmin}=\lambda/2$ and with horizontal aperture length $A_{SRH}=D_{SRHmin}$ in FIG. 21, but the arrangement is not limited to this, and for example, when $N_{SR}$ SR antennas ($N_{SR}$ is 2 or more) are arranged in the horizontal direction at minimum horizontal spacing $D_{SRHmin}$, horizontal aperture length $A_{SRH}$ may be $(N_{SR}-1)D_{SRHmin}$.

Here, the LR antenna may, for example, yield a higher gain by narrower antenna directivity than the directivity of the SR antennas. Thus, for example, as illustrated in FIGS. 22A and 22B, width $W_{LR}$ of the LR antenna may be greater than width $W_{SR}$ of the SR antennas. In addition, for example, as illustrated in FIGS. 22A and 22B, height $H_{LR}$ of the LR antenna may be greater than height $H_{SR}$ of the SR antennas.

For example, when radar apparatus 10 performs transmission beam synthesis using two SR antennas in the horizontal direction, radar apparatus 10 can form the same directivity between the LR antenna and the two SR antennas by using the LR antenna for which $W_{LR} \approx 2W_{SR}$ holds true as illustrated in FIGS. 22A and 22B. Likewise, radar apparatus 10 may, for example, perform transmission beam synthesis using three SR antennas in the horizontal direction. In this instance, it is possible to form the directivity the same between the LR antenna and the three SR antennas, for example, by using the LR antenna and the SR antennas for which $W_{LR} \approx 3W_{SR}$ holds true. Likewise, radar apparatus 10 may, for example, perform transmission beam synthesis using Nsrh SR antennas in the horizontal direction. In this instance, it is possible to form the directivity the same between the LR antenna and the Nsrh SR antennas, for example, by using the LR antenna and the SR antennas for which $W_{LR} \approx Nsrh \times W_{SR}$ holds true.

Further, for example, when radar apparatus 10 performs transmission beam synthesis using two SR antennas in the vertical direction, the same directivity between the LR antenna and the two SR antennas can be formed by using the LR antenna for which $H_{LR} \approx 2H_{SR}$ holds true as illustrated in FIGS. 22A and 22B. Likewise, radar apparatus 10 may, for example, perform transmission beam synthesis using three SR antennas in the vertical direction. In this instance, it is possible to form the directivity the same between the LR antenna and the three SR antennas, for example, by using the LR antenna and the SR antennas for which $H_{LR} \approx 3H_{SR}$ holds true. Likewise, radar apparatus 10 may, for example, perform transmission beam synthesis using Nsrv SR antennas in the vertical direction. In this instance, it is possible to form the directivity the same between the LR antenna and the Nsrv SR antennas, for example, by using the LR antenna and the SR antennas for which $H_{LR} \approx Nsrv \times H_{SR}$ holds true.

By way of example, in the case where transmission beam synthesis is performed using two SR antennas in the horizontal direction and transmission beam synthesis is performed using two SR antennas in the vertical direction as illustrated in FIG. 21 (in other words, in the case where a total of four SR antennas is used), the LR antenna and the SR antennas for which $W_{LR} \approx 2W_{SR}$ and $H_{LR} \approx 2H_{SR}$ hold true as illustrated in FIGS. 22A and 22B may be used. With this configuration, the LR antenna can form the same directivity as the four SR antennas, for example.

FIGS. 23A, 23B, and 23C illustrate arrangement examples of a virtual receive array obtained by the antenna arrangement illustrated in FIG. 21.

Here, the arrangement of the virtual receive array may be expressed by Expression 32, for example, based on the positions of transmit antennas 106 constituting the transmit array antenna (e.g., the positions of the feeding points) and the positions of receive antennas 202 constituting the receive array antenna (e.g., the positions of the feeding points).

Further, in the arrangements of the virtual receive array illustrated in FIGS. 23A, 23B, and 23C, VA #41 to VA #48 indicate an arrangement of virtual receive antennas that is obtained in a case where SR antennas for beam synthesis (e.g., $SR_{bf}$) are regarded as new transmit antenna Tx #6 and the phase center of the SR antenna group for beam synthesis (the phase center of $SR_{bf}$) is regarded as the position coordinates of antenna Tx #6 in Expression 32. In other words, VA #41 to VA #48 are configured based on Tx #6 and Rx #1 to Rx #8.

(Arrangement of Virtual Receive Antennas Used for Direction Estimation for LR Mode (LR-DOA))

FIG. 23A illustrates an arrangement of the virtual receive antennas used for LR-DOA.

Virtual receive antennas used for LR-DOA are configured based on the SR antennas for beam synthesis, the LR antenna, and the receive antennas. For example, the virtual receive antennas (VA #1 to VA #8 and VA #41 to VA #48) illustrated in FIG. 23A are configured based on the SR antennas for beam synthesis (e.g., $SR_{bf}$ or Tx #6), the LR antenna (e.g., Tx #1), and eight receive antennas Rx #1 to Rx #8 illustrated in FIG. 21.

For example, when aforementioned (Condition 1) is satisfied in the horizontal antenna arrangement illustrated in FIG. 21, the arrangement of the virtual receive antennas illustrated in FIG. 23A includes virtual receive antennas the horizontal spacing between which is DA (e.g., DA=λ/2). For example, the element spacing between VA #3 and VA #42 illustrated in FIG. 23A is $|dT_{LR1,SRbf}-dR_{2,3}|$=DA=0.5λ, and the element spacing between VA #7 and VA #46 is $|dT_{LR1,SRbf}-dR_{6,7}|$=DA=0.5λ.

For example, in LR-DOA, when (Condition 1) that "at least one absolute value of the difference between, on the one hand, the spacing between the phase center of the SR antenna group ($SR_{bf}$) for beam synthesis and the LR antenna and, on the other hand, the spacing between the receive antennas is DA=0.5λ to 0.8λ" is satisfied, radar apparatus 10 can suppress the generation of grating lobes in the range of from ±10 degrees to ±90 degrees in the horizontal direction. Further, for example, radar apparatus 10 can suppress generation of grating lobes within the viewing angle in the horizontal direction by setting DA based on the expected viewing angle in LR-DOA.

In addition, radar apparatus 10 transmits radar transmission signals using the LR antenna and a plurality of SR antennas (e.g., SR antennas for beam synthesis) in the LR mode. Thus, for example, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Radar apparatus 10 can thus improve the reception quality (e.g., SNR) during the direction estimation to increase the detection distance, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

FIG. 23B illustrates an arrangement of virtual receive antennas used for SR-DOA.

The virtual receive antennas used for SR-DOA are configured based on the SR antennas and the receive antennas, for example. For example, the virtual receive antennas (VA #9 to VA #40) illustrated in FIG. 23B are configured based on SR antennas Tx #2 (SR1), Tx #3 (SR2), Tx #4 (SR3), Tx #5 (SR4), and eight receive antennas Rx #1 to Rx #8 illustrated in FIG. 21.

For example, when above (Condition 4) is satisfied, the arrangement of the virtual receive antennas illustrated in FIG. 23B includes virtual receive antennas the horizontal spacing between which is $D_{SRHmin}$, and includes virtual receive antennas the vertical spacing between which is DB (e.g., DB=λ/2). For example, each of the element spacings between VA #9 and VA #17, VA #13 and VA #21, VA #25 and VA #33, and VA #29 and VA #37 illustrated in FIG. 23B is $D_{SRH,min}$. For example, the element spacing between VA #13 and VA #25 illustrated in FIG. 23B is $|D_{SRVmin}-dR_V|$=DB=0.5λ. Likewise, the element spacings between VA #21 and VA #33, VA #14 and VA #26, VA #22 and VA #34, VA #15 and VA #27, VA #23 and VA #35, VA #16 and VA #28, and VA #24 and VA #36 are $|D_{SRVmin}-dR_V|$=DB=0.5λ.

In addition, in radar apparatus 10, when aforementioned (Condition 4) is satisfied, there is no overlap between the virtual receive antennas in the virtual receive antenna arrangement for the SR mode illustrated in FIG. 23B and the aperture length in the virtual receive array can thus be extended.

Therefore, in SR-DOA, radar apparatus 10 can suppress the generation of grating lobes in the range of from ±10 degrees to ±90 degrees in the horizontal direction by "setting transmit antenna spacing $D_{SRHmin}$ to about 0.5λ to 0.8λ," for example. Further, in SR-DOA, radar apparatus 10 can suppress the generation of grating lobes in the range of from ±10 degrees to ±90 degrees in the vertical direction by "setting transmit antenna spacing DB to about 0.5λ to 0.8λ," for example. In addition, for example, radar apparatus 10 can suppress the generation of grating lobes within the viewing angle by setting $D_{SRHmin}$ and DB based on the viewing angle expected in SR-DOA. Further, since there is no overlap between the virtual receive antennas in the SR virtual antenna arrangement and the aperture length in the virtual receive array can be enlarged, radar apparatus 10 can improve the angular resolution.

(Arrangement of Virtual Receive Antennas Used in SR-DOA within Viewing Angle in LR Mode)

FIG. 23C illustrates an arrangement of virtual receive antennas used for SR-DOA within the viewing angle (FOV) in the LR mode.

In SR-DOA, within the viewing angle in the LR mode, the virtual receive antennas may be configured, for example, based on the transmit antennas including the SR antennas and, additionally, the LR antenna. For example, the virtual receive antennas (VA #1 to VA #40) illustrated in FIG. 23C are configured based on SR antennas Tx #2 (SR1) to Tx #5 (SR4), LR antenna Tx #1 (LR1), and eight receive antennas Rx #1 to Rx #8 illustrated in FIG. 21.

As is understood, in the SR mode, radar apparatus 10 transmits the radar transmission signals using the LR antenna and a plurality of SR antennas within the viewing angle in the LR mode. Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 6, radar apparatus 10 satisfies above-mentioned (Condition 1) and (Condition 4), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Further, according to arrangement example 6, the virtual receive antennas used for LR-DOA (e.g., FIG. 23A) and the virtual receive antennas used for SR-DOA (e.g., FIGS. 23B and 23C) include virtual receive antennas arranged horizontally and vertically differently from one another. It is thus possible for radar apparatus 10 to apply not only the horizontal direction estimation but also a direction estimation technique in two dimensions including the horizontal and vertical directions, for example. It is thus possible for radar apparatus 10 to detect the azimuth and elevation-angle directions of the target, for example, and to detect the height information of the target, for example.

Next, examples of a direction estimation result (computer simulation result) obtained when the antenna arrangement according to arrangement example 6 is applied will be described.

FIGS. 24A, 24B, and 24C illustrate examples of a direction estimation result (computer simulation result) obtained when the MIMO antenna arrangement of arrangement example 6 (for example, FIG. 21) is used and when the beamformer method is used as the direction-of-arrival estimation algorithm in direction estimator 214. FIGS. 24A, 24B, and 24C illustrate the examples of the direction estimation result, for example, in the case of $DA=\lambda/2$, $DB=\lambda/2$, and $D_{SRHmin}=\lambda/2$.

Note that, the directivity of each antenna element alone is not considered in FIGS. 24A, 24B, and 24C. Further, FIGS. 24A, 24B, and 24C illustrate examples of plotted outputs of the direction-of-arrival estimation evaluation function value within the range of ±90 degrees in the horizontal direction and within the range of ±90 degrees in the vertical direction, in which the true values of the target are an angle of 0 degrees in the horizontal direction and an angle of 0 degrees in the vertical direction.

FIG. 24A illustrates an example of the direction estimation result (LR-DOA) obtained in the LR virtual receive antenna arrangement (e.g., FIG. 23A) using the beamformer method. Note that, regarding the directivity direction resulting from the beam synthesis using the SR antennas, directivity at 0 degrees in the horizontal direction and at 0 degrees in the vertical direction was formed.

Further, FIG. 24B illustrates an example of the direction estimation result (SR-DOA) obtained in the SR virtual receive antenna arrangement (e.g., FIG. 23B) using the beamformer method.

FIG. 24C illustrates an example of the direction estimation result (SR-DOA within LR FOV) obtained in the SR virtual receive antenna arrangement within the viewing field in the LR mode (e.g., FIG. 23C) using the beamformer method.

From the results in the direction estimator illustrated respectively in FIGS. 24A, 24B, and 24C, it can be confirmed that the maximum peaks were obtained at the target true values (here, horizontal 0 degrees and vertical 0 degrees) and direction estimator 214 correctly estimated the target direction.

Further, $DA=\lambda/2$, $DB=\lambda/2$, and $D_{SRHmin}=\lambda/2$ in the MIMO antenna arrangements illustrated in FIGS. 23A, 23B, and 23C, for example. Accordingly, as can be confirmed by the direction estimation results illustrated in FIGS. 24A, 24B, and 24C, radar apparatus 10 suppresses grating lobes within ±90 degrees in the horizontal and vertical directions.

Further, for example, as illustrated in FIGS. 24A and 24B, it can be confirmed that the LR virtual receive antenna arrangement (e.g., FIG. 23A) has, because of its greater horizontal aperture length between the virtual receive antennas, a narrower and sharper peak in the target direction (e.g., the main lobe) than the SR virtual receive antenna arrangement (e.g., FIG. 23B), leading to higher horizontal angular resolution of radar apparatus 10. Further, it can be confirmed that the SR virtual receive antenna arrangement (e.g., FIG. 23B) has, because of its greater vertical aperture length between the virtual receive antennas, a narrower and sharper peak in the target direction (e.g., the main lobe) than the LR virtual receive antenna arrangement (e.g., FIG. 23A), leading to higher vertical angular resolution of radar apparatus 10.

Further, for example, FIG. 24C illustrates the direction estimation result obtained on the assumption that the direction of the horizontal 0 degrees and the vertical 0 degrees is within the viewing angle in the LR mode. Thus, as illustrated in FIGS. 24C and 24B, it can be confirmed that the virtual receive antenna arrangement including the LR antenna (e.g., FIG. 23C) has, because of its greater aperture length between the virtual receive antennas, a horizontally and vertically narrower and sharper peak in the target direction (e.g., the main lobe) than the SR virtual receive antenna arrangement (e.g., FIG. 23B), leading to higher horizontal and vertical angular resolution of radar apparatus 10.

Further, the number of virtual receive antennas is greater in the SR virtual receive antenna arrangement within the viewing angle in the LR mode (e.g., FIG. 23C) than in the LR virtual receive antenna arrangement (e.g., FIG. 23A). Thus, for example, as illustrated in FIGS. 24A and 24C, it can be confirmed that the peak levels of pseudo peaks occurring in directions different from the target direction (e.g., referred to as side lobes) are reduced more in the SR virtual receive antenna arrangement within the viewing angle in the LR mode than in the LR virtual receive antenna arrangement. When the peak levels of the pseudo peaks (e.g., side lobes) are reduced more, radar apparatus 10 can improve detection performance for a weaker target, for example.

Arrangement Example 7

Arrangement example 6 has been described in which the receive antennas are also arranged in a grid shape, but the arrangement of the receive antennas is not limited thereto. In arrangement example 7, the arrangement of the receive antennas is different from arrangement example 6.

Figure 25:
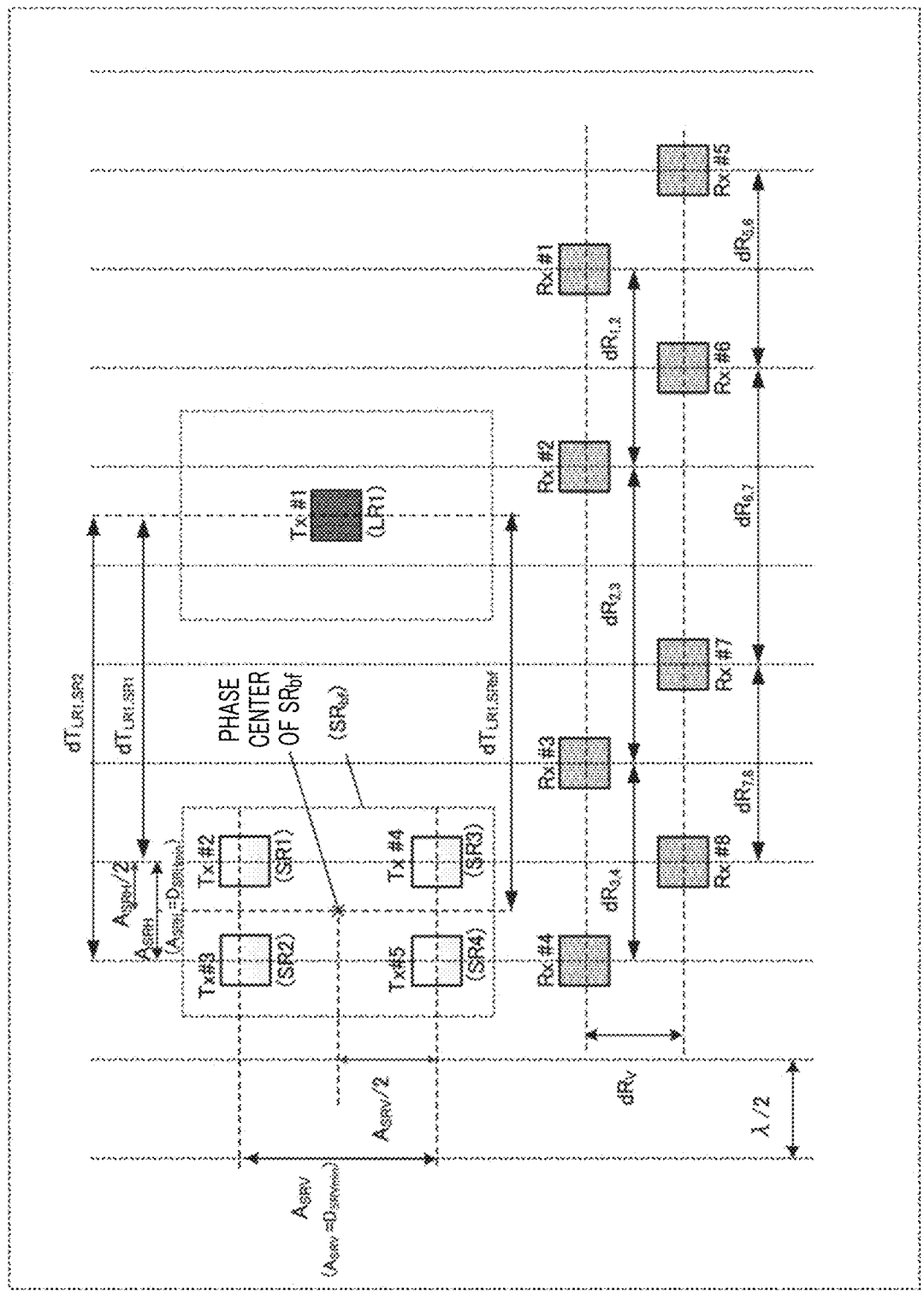
FIG. 25 illustrates an example of an antenna arrangement according to arrangement example 7.

FIG. 25 illustrates an arrangement example (for example, a MIO antenna arrangement example) of transmit antennas 106 (referred to as Tx, for example) and receive antennas 202 (referred to as Rx, for example) according to arrangement example 7.

In the example illustrated in FIG. 25, number $N_{Tx}$ of transmit antennas is five (e.g., Tx #1 to Tx #5), and the number of receive antennas Na is eight (e.g., Rx #1 to Rx #8).

In FIG. 25, the number of first transmit antennas 106-1 for the LR mode (e.g., LR antennas) is $N_{T1}=1$, and the number of second transmit antennas 106-2 for the SR mode (e.g., SR antennas) is $N_{T2}=4$. In FIG. 25, "LR1" denotes the LR antenna, "SR1," "SR2," "SR3," and "SR4" denote the SR antennas.

In arrangement example 7, for example, regarding receive antennas Rx #1 to Rx #8, the vertical spacings (e.g., $dR_V$) between receive antennas Rx #1 to Rx #4 and receive antennas Rx #5 to Rx #8 are the same as in arrangement example 6 (e.g., FIG. 21) as illustrated in FIG. 25. On the other hand, as illustrated in FIG. 25, arrangement example 7 is different from arrangement example 6 in that receive antennas Rx #5 to Rx #8 are arranged so as to be horizontally shifted from receive antennas Rx #1 to Rx #4 by a spacing of an integer multiple of minimum horizontal spacing $D_{SRHmin}$ between the SR antennas (in FIG. 25, $\lambda/2$ that is a multiple by a factor of 1).

In other words, in arrangement example 7, receive antennas Rx #1 to Rx #4 and receive antennas Rx #5 to Rx #8 are arranged so as not to overlap one another in the horizontal direction, for example, as illustrated in FIG. 25. With this arrangement, radar apparatus 10 can, for example, use receive antennas Rx having any antenna element size in the vertical direction, and accordingly, can improve the gain of the receive antennas by narrowing the directivity in the vertical direction by the receive antenna elements.

The MIMO antenna arrangement illustrated in FIG. 25 satisfies (Condition 1) and (Condition 4), for example.

In an antenna arrangement satisfying above (Condition 4), a virtual receive antenna arrangement used, for example, for the direction estimation for the SR mode (SR-DOA) includes at least one horizontal spacing of $D_{SRHmin}$ and at least one vertical spacing of DB (e.g., DB=$\lambda/2$) between virtual receive antennas. In addition, in the antenna arrangement satisfying (Condition 4), there is no overlap between the virtual receive antennas in the horizontal direction and the vertical direction, for example, in the SR virtual receive antenna arrangement, so that the aperture length between the virtual receive antennas can be extended.

Further, $D_{SRHmin}$ may be about $0.5\lambda$ to $0.8\lambda$. This allows radar apparatus 10 to suppress the generation of grating lobes in the range of from ±10 degrees to ±90 degrees in the horizontal direction. Further, DB may be about $0.5\lambda$ to $0.8\lambda$. This allows radar apparatus 10 to suppress the generation of grating lobes in the range of from ±10 degrees to +90 degrees in the vertical direction.

For example, in the horizontal direction of the antenna arrangement illustrated in FIG. 25, (Condition 1) is satisfied as described below.

By way of example, $dT_{LR1,SR1}=1.75\lambda$ and $dT_{LR1,SR2}$ is $2.25\lambda$ in the horizontal direction in FIG. 25. Since the phase center with respect to, for example, Tx #2 (SR1) to Tx #5 (SR4) (e.g., the phase center of $SR_{bf}$) in the horizontal direction is the midpoint between Tx #2 (SR1) and Tx #3 (SR2) in FIG. 25, $dT_{LR1,SRbf}=2\lambda$.

In the vertical direction in FIG. 25, the phase center with respect to, for example, Tx #2 (SR1) to Tx #5 (SR4) (e.g., the phase center of $SR_{bf}$) in the vertical direction is the midpoint of vertical aperture length $A_{SRV}$ between the SR antennas arranged at minimum spacing $D_{SRVmin}$, and the midpoint may coincide with the vertical position of the LR antenna (Tx #1 (LR1) illustrated in FIG. 25).

Further, in the horizontal direction of the antenna arrangement illustrated in FIG. 25, $dR_{1,2}=\lambda$, $dR_{2,3}=1.5\lambda$, $dR_{3,4}=\lambda$, $dR_{5,6}=\lambda$, $dR_{6,7}=1.5\lambda$, and $dR_{7,8}=\lambda$.

Thus, in FIG. 25, $|dT_{LR1,SRbf}-dR_{1,2}|=\lambda$, $|dT_{LR1,SRbf}-dR_{2,3}|=\lambda/2$, $|dT_{LR1,SRbf}-dR_{3,4}|=\lambda$, $|dT_{LR1,SRbf}-dR_{5,6}|=\lambda$, $|dT_{LR1,SRbf}-dR_{6,7}|=\lambda/2$, and $|dT_{LR1,SRbf}-dR_{7,8}|=\lambda$. Here, $\lambda$ represents the wavelength of the carrier frequency of the radar transmission signal. When a chirp signal is used as the radar transmission signal, $\lambda$ is the wavelength of the center frequency in the frequency sweep band of the chirp signal.

Accordingly, in the horizontal antenna arrangement illustrated in FIG. 25, in the direction estimation for the LR mode (LR-DOA), the absolute values $|dT_{LR1,SRbf}-dR_{2,3}|$ and $|dT_{LR1,SRbf}-dR_{6,7}|$ of the differences between, on the one hand, spacing $dT_{LR1,SRbf}$ between the phase center of SR antennas for beam synthesis (e.g., $SR_{bf}$) using Tx #2 (SR1) to Tx #5 (SR4) and LR antenna Tx #1 (LR1) and, on the other hand, receive antenna spacings $dR_{2,3}$, and $dR_{6,7}$ are $\lambda/2$, and thus, (Condition 1) in the case of DA=$\lambda/2$ is satisfied.

Further, for example, the antenna arrangement illustrated in FIG. 25 satisfies (Condition 4) as described below.

For example, in FIG. 25, minimum horizontal spacing $D_{SRHmin}$ between SR antennas Tx #2 (SR1) and Tx #3 (SR2) (or Tx #4 (SR3) and Tx #5 (SR4)) arranged in the horizontal direction is $\lambda/2$, and minimum vertical spacing $D_{SRVmin}$ between SR antennas Tx #2 (SR1) and Tx #4 (SR3) (or Tx #3 (SR2) and Tx #5 (SR4)) arranged in the vertical direction is $\lambda$.

In FIG. 25, the receive antennas are arranged such that the element spacings (e.g., $dR_{1,2}=\lambda$, $dR_{2,3}=1.5\lambda$, $dR_{3,4}=\lambda$, $dR_{5,6}=\lambda$, $dR_{6,7}=1.5\lambda$, $dR_{7,8}=\lambda$) between receive antennas Rx, for example, in the horizontal direction are wider than horizontal aperture length $A_{SRH}=\lambda/2$ between SR antennas Tx #2 (SR1) and Tx #3 (SR2) among a plurality of SR antennas which are arranged side by side at minimum horizontal spacing $D_{SRHmin}=\lambda/2$ (e.g., $dR_{1,2}$, $dR_{2,3}$, $dR_{3,4}$, $dR_{5,6}$, $dR_{6,7}$, and $dR_{7,8} > A_{SRH}$).

Further, in FIG. 25, at least one absolute value (e.g., $|D_{SRVmin}-dR_V|=DB=\lambda/2$) of the difference between, on the one hand, minimum vertical spacing $D_{SRVmin}=\lambda$ between the SR antennas and, on the other hand, the vertical element spacing (e.g., $dR_{1,5}=\lambda/2$, $dR_{2,6}=\lambda/2$, $dR_{3,7}=\lambda/2$, $dR_{4,8}=\lambda/2$) between receive antennas Rx is about $0.5\lambda$ to $0.8\lambda$, for example, in the vertical direction.

Thus, the antenna arrangement illustrated in FIG. 25 satisfies (Condition 4).

Note that, the description with reference to FIG. 25 has been given in which all of the element spacings between receive antennas Rx in the vertical direction are $dR_V$, but the present disclosure is not limited thereto. For example, the element spacings between receive antennas Rx in the vertical direction may be different from one another, and the element spacings in the vertical direction may include at least one element spacing of about DB=$0.5\lambda$ to $0.8\lambda$.

Note also that, although FIG. 25 illustrates the arrangement in which two elements of SR antennas arranged in the horizontal direction are used as the SR antennas used for beam synthesis, the arrangement is not limited thereto, and radar apparatus 10 may use three or more elements of SR antennas. Likewise, although FIG. 25 illustrates the arrangement in which two elements of SR antennas arranged in the vertical direction are used as the SR antennas used for beam synthesis, the arrangement is not limited thereto, and radar apparatus 10 may use three or more elements of SR antennas.

Note that, SR antennas Tx #2 (SR1) and Tx #3 (SR2) are arranged in the horizontal direction at minimum horizontal spacing $D_{SRHmin}=\lambda/2$ and with horizontal aperture length $A_{SRH}=D_{SRHmin}$ in FIG. 25, but the arrangement is not limited to this, and for example, when $N_{SR}$ SR antennas ($N_{SR}$ is 2 or more) are arranged in the horizontal direction at minimum horizontal spacing $D_{SRHmin}$, horizontal aperture length $A_{SRH}$ may be $(N_{SR}-1)D_{SRHmin}$.

Here, the LR antenna may, for example, yield a higher gain by narrower antenna directivity than the directivity of the SR antennas. Thus, for example, as illustrated in FIGS. 22A and 22B, width $W_{LR}$ of the LR antenna may be greater than width $W_{SR}$ of the SR antennas. In addition, for example, as illustrated in FIGS. 22A and 22B, height $H_{LR}$ of the LR antenna may be greater than height $H_{SR}$ of the SR antennas.

By way of example, in the case where transmission beam synthesis is performed using two SR antennas in the horizontal direction and transmission beam synthesis is performed using two SR antennas in the vertical direction as illustrated in FIG. 25 (in other words, in the case where a total of four SR antennas is used), the LR antenna and the SR antennas for which $W_{LR}\approx 2W_{SR}$ and $H_{LR}\approx 2H_{SR}$ hold true as illustrated in FIGS. 22A and 22B may be used. With this configuration, the LR antenna can form the same directivity as the four SR antennas, for example.

FIGS. 26A, 26B, and 26C illustrate arrangement examples of a virtual receive array obtained by the antenna arrangement illustrated in FIG. 25.

Here, the arrangement of the virtual receive array may be expressed by Expression 32, for example, based on the positions of transmit antennas 106 constituting the transmit array antenna (e.g., the positions of the feeding points) and the positions of receive antennas 202 constituting the receive array antenna (e.g., the positions of the feeding points).

Further, in the arrangements of the virtual receive array illustrated in FIGS. 26A, 26B, and 26C, VA #41 to VA #48 indicate an arrangement of virtual receive antennas that is obtained in a case where SR antennas for beam synthesis (e.g., $SR_{bf}$) are regarded as new transmit antenna Tx #6 and the phase center of the SR antenna group for beam synthesis (the phase center of $SR_{bf}$) is regarded as the position coordinates of antenna Tx #6 in Expression 32. In other words, VA #41 to VA #48 are configured based on Tx #6 and Rx #1 to Rx #8.

(Arrangement of Virtual Receive Antennas Used for Direction Estimation for LR Mode (LR-DOA))

FIG. 26A illustrates an arrangement of the virtual receive antennas used for LR-DOA.

Virtual receive antennas used for LR-DOA are configured based on the SR antennas for beam synthesis, the LR antenna, and the receive antennas. For example, the virtual receive antennas (VA #1 to VA #8 and VA #41 to VA #48) illustrated in FIG. 26A are configured based on the SR antennas for beam synthesis (e.g., $SR_{bf}$ or Tx #6), the LR antenna (e.g., Tx #1), and eight receive antennas Rx #1 to Rx #8 illustrated in FIG. 25.

For example, when aforementioned (Condition 1) is satisfied in the horizontal antenna arrangement illustrated in FIG. 25, the arrangement of the virtual receive antennas illustrated in FIG. 26A includes virtual receive antennas the horizontal spacing between which is DA (e.g., $DA=\lambda/2$). For example, the element spacing between VA #3 and VA #42 illustrated in FIG. 26A is $|dT_{LR1,SRbf}-dR_{2,3}|=DA=0.5\lambda$, and the element spacing between VA #7 and VA #46 is $|dT_{LR1,SRbf}-dR_{6,7}|=DA=0.5\lambda$.

For example, in LR-DOA, when (Condition 1) that "at least one absolute value of the difference between, on the one hand, the spacing between the phase center of the SR antenna group ($SR_{bf}$) for beam synthesis and the LR antenna and, on the other hand, the spacing between the receive antennas is $DA=0.5\lambda$ to $0.8\lambda$" is satisfied, radar apparatus 10 can suppress the generation of grating lobes in the range of from ±10 degrees to ±90 degrees, for example, in the horizontal direction. Further, for example, radar apparatus 10 can suppress generation of grating lobes within the viewing angle in the horizontal direction by setting DA based on the expected viewing angle in LR-DOA.

In addition, radar apparatus 10 transmits radar transmission signals using the LR antenna and a plurality of SR antennas (e.g., SR antennas for beam synthesis) in the LR mode. Thus, for example, in LR-DOA, radar apparatus 10 may use a reception signal corresponding to the radar transmission signal transmitted from the LR antenna and, in addition, a reception signal corresponding to the radar transmission signal resulting from beam synthesis performed using the SR antennas. Accordingly, in radar apparatus 10, the number of virtual receive antennas can increase, and the array gain can increase. Radar apparatus 10 can thus improve the reception quality (e.g., SNR) during the direction estimation to increase the detection distance, for example. Further, in radar apparatus 10, an increase in the number of virtual receive antennas can result in an increase in the aperture length between the virtual receive antennas, and thus in improvement in the angular resolution, for example.

(Arrangement of Virtual Receive Antennas Used for Direction Estimation for SR Mode (SR-DOA))

FIG. 26B illustrates an arrangement of virtual receive antennas used for SR-DOA.

The virtual receive antennas used for SR-DOA are configured based on the SR antennas and the receive antennas, for example. For example, the virtual receive antennas (VA #9 to VA #40) illustrated in FIG. 26B are configured on SR antennas Tx #2 (SR1), Tx #3 (SR2), Tx #4 (SR3), Tx #5 (SR4), and eight receive antennas Rx #1 to Rx #8 illustrated in FIG. 25.

For example, when above (Condition 4) is satisfied, the arrangement of the virtual receive antennas illustrated in FIG. 26B includes virtual receive antennas the horizontal spacing between which is $D_{SRHmin}$, and includes virtual receive antennas the vertical spacing between which is DB (e.g., $DB=\lambda/2$). For example, each of the element spacings between VA #9 and VA #17, VA #13 and VA #21, VA #25 and VA #33, and VA #29 and VA #37 illustrated in FIG. 26B is $D_{SRH,min}$. For example, the element spacing between VA #21 and VA #25 illustrated in FIG. 26B is $|D_{SRVmin}-dR_V|=DB=0.5\lambda$. Likewise, the element spacings between VA #14 and VA #33, VA #22 and VA #26, VA #23 and VA #27, VA #16 and VA #35, and VA #24 and VA #28 are $|D_{SRVmin}-dR_V|=DB=0.5\lambda$.

In addition, in radar apparatus 10, when aforementioned (Condition 4) is satisfied, there is no overlap between the virtual receive antennas in the virtual receive antenna arrangement for the SR mode illustrated in FIG. 26B and the aperture length in the virtual receive array can thus be extended.

Therefore, in SR-DOA, radar apparatus 10 can suppress the generation of grating lobes in the range of from ±10 degrees to ±90 degrees in the horizontal direction by "setting transmit antenna spacing $D_{SRHmin}$ to about $0.5\lambda$ to $0.8\lambda$," for example. Further, in SR-DOA, radar apparatus 10 can suppress the generation of grating lobes in the range of from ±10 degrees to ±90 degrees in the vertical direction by "setting transmit antenna spacing DB to about $0.5\lambda$ to $0.8\lambda$," for example. In addition, for example, radar apparatus 10 can suppress the generation of grating lobes within the viewing angle by setting $D_{SRHmin}$ and DB based on the viewing angle expected in SR-DOA. Further, since there is no overlap between the virtual receive antennas in the SR virtual antenna arrangement and the aperture length in the virtual receive array can be enlarged, radar apparatus 10 can improve the angular resolution.

(Arrangement of Virtual Receive Antennas Used in SR-DOA within Viewing Angle in LR Mode)

FIG. 26C illustrates an arrangement of virtual receive antennas used for SR-DOA within the viewing angle (FOV) in the LR mode.

In SR-DOA, within the viewing angle in the LR mode, the virtual receive antennas may be configured, for example, based on the transmit antennas including the SR antennas and, additionally, the LR antenna. For example, the virtual receive antennas (VA #1 to VA #40) illustrated in FIG. 26C are configured based on SR antennas Tx #2 (SR1) to Tx #5 (SR4), LR antenna Tx #1 (LR1), and eight receive antennas Rx #1 to Rx #8 illustrated in FIG. 25.

As is understood, in the SR mode, radar apparatus 10 transmits the radar transmission signals using the LR antenna and a plurality of SR antennas within the viewing angle in the LR mode. Thus, for example, in SR-DOA (e.g., within the viewing angle in the LR mode), radar apparatus 10 may use a reception signal corresponding to the radar transmission signal transmitted from the SR antennas and, in addition, a reception signal corresponding to the radar transmission signal transmitted from the LR antenna. Accordingly, in radar apparatus 10, the number of virtual receive antennas can increase, and the array gain can increase. Therefore, in radar apparatus 10, the reception quality (e.g., received SNR) during the direction estimation can be improved, and the detection distance can be increased, for example. Further, in radar apparatus 10, an increase in the number of virtual receive antennas can result in an increase in the aperture length between the virtual receive antennas, and thus in improvement in the angular resolution.

As described above, according to arrangement example 7, radar apparatus 10 satisfies above-mentioned (Condition 1) and (Condition 4), for example, to be capable of suppressing the generation of grating lobes within the viewing angle in both of LR-DOA and SR-DOA, reducing the angular ambiguity in angular measurement processing, and improving the target detection performance. Further, radar apparatus 10 can improve the array gain and the angular resolution during the angular measurement processing in both of the SR mode and the LR mode, and thus improve the target detection performance, for example.

Further, according to arrangement example 7, the virtual receive antennas used for LR-DOA (e.g., FIG. 26A) and the virtual receive antennas used for SR-DOA (e.g., FIGS. 26B and 26C) include virtual receive antennas arranged horizontally and vertically differently from one another. It is thus possible for radar apparatus 10 to apply not only the horizontal direction estimation but also a direction estimation technique in two dimensions including the horizontal and vertical directions, for example. It is thus possible for radar apparatus 10 to detect the azimuth and elevation-angle directions of the target, for example, and to detect the height information of the target, for example.

Next, examples of a direction estimation result (computer simulation result) obtained when the antenna arrangement according to arrangement example 7 is applied will be described.

FIGS. 27A, 27B, and 27C illustrate examples of a direction estimation result (computer simulation result) obtained when the MIMO antenna arrangement of arrangement example 7 (for example, FIG. 25) is used and when the beamformer method is used as the direction-of-arrival estimation algorithm in direction estimator 214. FIGS. 27A, 27B, and 27C illustrate the examples of the direction estimation result, for example, in the case of $DA=\lambda/2$, $DB=\lambda/2$, and $D_{SRHmin}=\lambda/2$.

Note that, the directivity of each antenna element alone is not considered in FIGS. 27A, 27B, and 27C. Further, FIGS. 27A, 27B, and 27C illustrate examples of plotted outputs of the direction-of-arrival estimation evaluation function value within the range of ±90 degrees in the horizontal direction and within the range of ±90 degrees in the vertical direction, in which the true values of the target are an angle of 0 degrees in the horizontal direction and an angle of 0 degrees in the vertical direction.

FIG. 27A illustrates an example of the direction estimation result (LR-DOA) obtained in the LR virtual receive antenna arrangement (e.g., FIG. 26A) using the beamformer method. Note that, regarding the directivity direction resulting from the beam synthesis using the SR antennas, directivity at 0 degrees in the horizontal direction and at 0 degrees in the vertical direction was formed.

Further, FIG. 27B illustrates an example of the direction estimation result (SR-DOA) obtained in the SR virtual receive antenna arrangement (e.g., FIG. 26B) using the beamformer method.

FIG. 27C illustrates an example of the direction estimation result (SR-DOA within LR FOV) obtained in the SR virtual receive antenna arrangement within the viewing field in the LR mode (e.g., FIG. 26C) using the beamformer method.

From the results in the direction estimator illustrated respectively in FIGS. 27A, 27B, and 27C, it can be confirmed that the maximum peaks were obtained at the target true values (here, horizontal 0 degrees and vertical 0 degrees) and direction estimator 214 correctly estimated the target direction.

Further, DA=12, $DB=\lambda/2$, and $D_{SRHmin}=\lambda/2$ in the MIO antenna arrangement illustrated in FIG. 25, for example. Accordingly, as can be confirmed by the direction estimation results illustrated in FIGS. 27A, 27B, and 27C, radar apparatus 10 suppresses grating lobes within ±90 degrees in the horizontal and vertical directions.

Further, for example, as illustrated in FIGS. 27A and 27B, it can be confirmed that the LR virtual receive antenna arrangement (e.g., FIG. 26A) has, because of its greater horizontal aperture length between the virtual receive antennas, a narrower and sharper peak in the target direction (e.g., the main lobe) than the SR virtual receive antenna arrangement (e.g., FIG. 26B), leading to higher horizontal angular resolution of radar apparatus 10. Further, it can be confirmed that the SR virtual receive antenna arrangement (e.g., FIG. 26B) has, because of its greater vertical aperture length between the virtual receive antennas, a narrower and sharper peak in the target direction (e.g., the main lobe) than the LR virtual receive antenna arrangement (e.g., FIG. 26A), leading to higher vertical angular resolution of radar apparatus 10.

Further, for example, FIG. 27C illustrates the direction estimation result obtained on the assumption that the direction of the horizontal 0 degrees and the vertical 0 degrees is within the viewing angle in the LR mode. Thus, as illustrated in FIGS. 27C and 27B, it can be confirmed that the virtual receive antenna arrangement including the LR antenna (e.g., FIG. 26C) has, because of its greater aperture length between the virtual receive antennas, a horizontally and vertically narrower and sharper peak in the target direction (e.g., the main lobe) than the SR virtual receive antenna arrangement (e.g., FIG. 26B), leading to higher horizontal and vertical angular resolution of radar apparatus 10.

Further, the number of virtual receive antennas is greater in the SR virtual receive antenna arrangement within the viewing angle in the LR mode (e.g., FIG. 26C) than in the LR virtual receive antenna arrangement (e.g., FIG. 26A). Thus, for example, as illustrated in FIGS. 27A and 27C, it can be confirmed that the peak levels of pseudo peaks occurring in directions different from the target direction (e.g., referred to as side lobes) are reduced more in the SR virtual receive antenna arrangement within the viewing angle in the LR mode than in the LR virtual receive antenna arrangement. When the peak levels of the pseudo peaks (e.g., side lobes) are reduced more, radar apparatus 10 can improve detection performance for a weaker target, for example.

The embodiments according to an exemplary embodiment of the present disclosure have been described above.

Note that, the number of MIMO antennas (for example, the number of transmit antennas and the number of receive antennas) is not limited to the number of antennas illustrated in above-described arrangement examples 1 to 7. For example, the configuration of the MIMO antennas may include an antenna arrangement of at least one of arrangement examples 1 to 7. For example, the configuration of the MIMO antennas may include an antenna arrangement satisfying above-described (Condition 1) or an antenna arrangement satisfying (Condition 1) and at least one of (Condition 2) to (Condition 4). In other words, radar apparatus 10 may include, for example, a further antenna (not illustrated) in addition to the antennas illustrated in each of the arrangement examples.

Further, first transmit antennas 106-1 and second transmit antennas 106-2 may, for example, be transmit antennas having the same level of directional characteristics or transmit antennas having different directional characteristics. For example, first transmit antennas 106-1 used for transmitting a first radar transmission wave may, for example, be antennas having a directive gain increased by narrower directivity than the directivity of second transmit antennas 106-2 in order to make it possible to detect an object at a greater distance by the first radar transmission wave than by a second radar transmission wave. It is thus possible for radar apparatus 10 to detect a target at a far distance in the directivity direction of first transmit antennas 106-1 by the first radar transmission wave with better reception quality (e.g., SNR), so as to improve the target detection performance.

In addition, by way of example, the viewing angles formed by first transmit antennas 106-1 and second transmit antennas 106-2 may at least partly overlap with each other in the present embodiment.

Further, a plurality of receive antennas 202 may, for example, be receive antennas having the same level of directional characteristics or receive antennas having different directional characteristics in the embodiments described above. For example, in radar apparatus 10, two types of receive antennas having respective different directional characteristics among the plurality of receive antennas 202 are called first receive antennas and second receive antennas, respectively. For example, the first receive antennas may be antennas having a directive gain increased by narrower directivity than the directivity of the second receive antennas. With this configuration of the receive antennas, radar apparatus 10 can detect an object at a far distance, for example, by the first radar transmission wave. It is thus possible for radar apparatus 10 to detect, among reception signals that are reflected waves of the first radar transmission wave, a reception signal received in the directivity direction of the first receive antennas, that is, the target at a far distance with a better reception quality (e.g., SNR) than in the case of the second receive antennas, so as to improve the target detection performance.

In addition, in the above-described embodiments, antennas used for first transmit antennas 106-1 used for transmission of the first radar transmission wave may be those which have a directive gain increased by narrower directivity than the directivity of second transmit antennas 106-2. Further, antennas used for the first receive antennas of a plurality of receive antennas 202 may be those which have a directive gain increased by narrower directivity in the directivity direction of the first transmit antennas than the directivity of the second receive antennas. Thus, since the directivity direction of the first receive antennas overlaps with the directivity direction of the first transmit antennas, radar apparatus 10 can detect, among the reception signals that are reflected waves of the first radar transmission wave, a reception signal received at the first receive antennas, that is, the target at a far distance with better reception quality (e.g., SNR) by improvement of the directive gain of the transmit and receive antennas, so as to improve the target detection performance.

Further, in the embodiments described above, the direction estimation for the LR mode uses the SR antennas for beam synthesis (SR1 and SR2) and LR antenna (LR1), and the direction estimation for the SR mode uses the SR antennas (SR1 and SR2), but does not use the LR antenna (LR1), for example, in MIMO antenna arrangement of FIG. 5. Here, in the direction estimation for the SR mode, radar apparatus 10 can set the potential of the LR antenna (LR1) to floating or ground potential, or stop the power supply to an amplifier (not illustrated in FIGS. 1 and 4) connected to the LR antenna (LR1).

In the radar apparatus according to an exemplary embodiment of the present disclosure, the radar transmitter and the radar receiver may be individually arranged in physically separate locations. Further, in the radar receiver according to an exemplary embodiment of the present disclosure, the direction estimator and the other components may be individually arranged in physically separate locations.

The radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC).

Each functional section may be formed as an individual chip, or some or all of them may be formed into a single chip.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The expression "section" used in the above-described embodiments may be replaced with another expression such as "circuit (circuitry)," "device," "unit," or "module."

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

<Summary of the Disclosure>

A radar apparatus according to an exemplary embodiment of the present disclosure includes: transmission circuitry, which, in operation, transmits a transmission signal using a plurality of transmit antennas; and reception circuitry, which, in operation, receives a reflected wave signal using a plurality of receive antennas that is the transmission signal reflected by an object, in which the plurality of transmit antennas include at least one first transmit antenna and a plurality of second transmit antennas, and, in a first direction, an absolute value of a difference between, on one hand, a spacing between the at least one first transmit antenna and a phase center of those of the plurality of second transmit antennas which are used for beam synthesis, and, on another hand, a spacing between adjacent receive antennas of the plurality of receive antennas is a defined value based on a wavelength of the plurality of transmission signals.

In an exemplary embodiment of the present disclosure, in the first direction, the spacing between the adjacent receive antennas of the plurality of receive antennas is wider than an aperture length between those of the plurality of second transmit antennas which are arranged side by side at a minimum spacing among spacings between the plurality of second transmit antennas in the first direction.

In an exemplary embodiment of the present disclosure, the plurality of second transmit antennas are arranged at positions where the plurality of second transmit antennas do not overlap with one another in both of the first direction and a second direction orthogonal to the first direction, in the first direction, the spacing between the adjacent receive antennas of the plurality of receive antennas is wider than an aperture length between those of the plurality of second transmit antennas which are arranged side by side at a minimum spacing among spacings between the plurality of second transmit antennas in the first direction, and, in the second direction, the adjacent receive antennas of the plurality of receive antennas are arranged at a minimum spacing among spacings between the plurality of second transmit antennas in the second direction.

In an exemplary embodiment of the present disclosure, the plurality of second transmit antennas are arranged at respective different positions in a plane formed by the first direction and a second direction orthogonal to the first direction, in the first direction, the spacing between the adjacent receive antennas of the plurality of receive antennas is wider than an aperture length between those of the plurality of second transmit antennas which are arranged side by side at a minimum spacing among spacings between the plurality of second transmit antennas in the first direction, and, in the second direction, an absolute value of a difference between, on one hand, a minimum spacing among spacings between the plurality of second transmit antennas in the second direction and, on another hand, the spacing between the adjacent receive antennas of the plurality of receive antennas is the defined value.

In an exemplary embodiment of the present disclosure, the plurality of receive antennas do not overlap with one another in the first direction.

In an exemplary embodiment of the present disclosure, the defined value is any value ranging from 0.5 times to 0.8 times the wavelength.

In an exemplary embodiment of the present disclosure, in a first mode for detection within a range including a first distance, the transmission circuitry transmits the transmission signal using both the at least one first transmit antenna and the plurality of second transmit antennas, and, in a second mode for detection within a range including a second distance shorter than the first distance, the transmission circuitry transmits the transmission signal using the plurality of second transmit antennas from among the at least one first transmit antenna and the plurality of second transmit antennas.

In an exemplary embodiment of the present disclosure, in a second mode for detection within a range including a second distance shorter than a first distance, the transmission circuit transmits the transmission signal using the at least one first transmit antenna and the plurality of second transmit antennas within a viewing angle in a first mode for detection within a range including the first distance.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-047722, filed on Mar. 18, 2020, the disclosure of which including the specification, drawings and abstract is incorporated herein by reference in its entirety.

INDUSTRIAL APPLICABILITY

The present disclosure is suitable as a radar apparatus for wide-angle range sensing.

REFERENCE SIGNS LIST 10, 10a Radar apparatus
100 Radar transmitter
101 Radar-transmission-signal generator
102 Modulation signal generator
103 VCO
104 Code generator
105 Phase rotator
106-1 First transmit antenna
106-2 Second transmit antenna
200, 200a Radar receiver
201 Antenna system processor
202 Receive antenna
203 Reception radio
204 Mixer
205 LPF
206 Signal processor
207 AD converter
208 Beat frequency analyzer
209 Output switcher
210 Doppler analyzer
211 CFAR section
212, 212a Aliasing determiner
213, 213a Code demultiplexer
214 Direction estimator
215 Phase corrector
300 Positioning output section

The invention claimed is:

1. A radar apparatus, comprising:
transmission circuitry, which, in operation, transmits each of a plurality of transmission signals using each of a plurality of transmit antennas; and
reception circuitry, which, in operation, receives each of a plurality of reflected wave signals using each of a plurality of receive antennas, the plurality of reflected wave signals being the plurality of transmission signals reflected by an object, wherein
the plurality of transmit antennas include at least one first transmit antenna and a plurality of second transmit antennas,
in a first direction, an absolute value of a difference between, a first spacing and a second spacing is a defined value based on a wavelength of the plurality of transmission signals, the first spacing being a spacing between the at least one first transmit antenna and a phase center of the plurality of second transmit antennas which are used for beam synthesis, the second spacing being a spacing between adjacent receive antennas of the plurality of receive antennas, and
in a second mode for detection within a range including a second distance shorter than a first distance, the transmission circuitry transmits the plurality of transmission signals using the at least one first transmit antenna and the plurality of second transmit antennas within a viewing angle of a first mode for detection within a range including the first distance.

2. The radar apparatus according to claim 1, wherein
in the first direction, the second spacing is wider than an aperture length between the plurality of second transmit antennas which are arranged side by side at a minimum spacing among spacings between the plurality of second transmit antennas in the first direction.

3. The radar apparatus according to claim 1, wherein
the defined value is a value ranging from 0.5 times to 0.8 times the wavelength.

4. The radar apparatus according to claim 1, wherein
in the first mode for detection within the range including the first distance, the transmission circuitry transmits the plurality of transmission signals using both the at least one first transmit antenna and the plurality of second transmit antennas.

5. A radar apparatus, comprising:
transmission circuitry, which, in operation, transmits each of a plurality of transmission signals using each of a plurality of transmit antennas; and
reception circuitry, which, in operation, receives each of a plurality of reflected wave signals using each of a plurality of receive antennas, the plurality of reflected wave signals being the plurality of transmission signals reflected by an object, wherein
the plurality of transmit antennas include at least one first transmit antenna and a plurality of second transmit antennas,
in a first direction, an absolute value of a difference between, a first spacing and a second spacing is a defined value based on a wavelength of the plurality of transmission signals, the first spacing being a spacing between the at least one first transmit antenna and a phase center of the plurality of second transmit antennas which are used for beam synthesis, the second spacing being a spacing between adjacent receive antennas of the plurality of receive antennas,
the plurality of second transmit antennas are arranged at positions where the plurality of second transmit antennas do not overlap in both of the first direction and a second direction orthogonal to the first direction,
in the first direction, the second spacing is wider than an aperture length between the plurality of second transmit antennas which are arranged side by side at a minimum spacing among spacings between the plurality of second transmit antennas in the first direction, and
in the second direction, the adjacent receive antennas of the plurality of receive antennas are arranged at a minimum spacing among spacings between the plurality of second transmit antennas in the second direction.

6. A radar apparatus, comprising:
transmission circuitry, which, in operation, transmits each of a plurality of transmission signals using each of a plurality of transmit antennas; and
reception circuitry, which, in operation, receives each of a plurality of reflected wave signals using each of a plurality of receive antennas, the plurality of reflected wave signals being the plurality of transmission signals reflected by an object, wherein
the plurality of transmit antennas include at least one first transmit antenna and a plurality of second transmit antennas,
in a first direction, an absolute value of a difference between, a first spacing and a second spacing is a defined value based on a wavelength of the plurality of transmission signals, the first spacing being a spacing between the at least one first transmit antenna and a phase center of the plurality of second transmit antennas which are used for beam synthesis, the second spacing being a spacing between adjacent receive antennas of the plurality of receive antennas, the plurality of second transmit antennas are arranged at respective different positions in a plane formed by the first direction and a second direction orthogonal to the first direction, in the first direction, the second spacing is wider than an aperture length between the plurality of second transmit antennas which are arranged side by side at a minimum spacing among spacings between the plurality of second transmit antennas in the first direction, and in the second direction, an absolute value of a difference between a third spacing and the second spacing is the defined value, the third spacing being a minimum spacing among spacings between the plurality of second transmit antennas in the second direction.

7. The radar apparatus according to claim 6, wherein the plurality of receive antennas do not overlap in the first direction.

* * * * *